(12) United States Patent
Chang et al.

(10) Patent No.: US 12,703,130 B2
(45) Date of Patent: Aug. 11, 2026

(54) FOAMED ARTICLES AND METHODS OF MAKING THE SAME

(71) Applicant: NIKE, Inc., Beaverton, OR (US)

(72) Inventors: Yihua Chang, Portland, OR (US); Lyle R. Hanson, Beaverton, OR (US); Petr Khlyabich, Beaverton, OR (US); Richard L. Watkins, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 155 days.

(21) Appl. No.: 18/828,902

(22) Filed: Sep. 9, 2024

(65) Prior Publication Data

US 2024/0424719 A1 Dec. 26, 2024

Related U.S. Application Data

(63) Continuation of application No. 17/647,019, filed on Jan. 5, 2022, now Pat. No. 12,083,717.
(Continued)

(51) Int. Cl.
*A43B 13/12* (2006.01)
*A43B 13/18* (2006.01)
(Continued)

(52) U.S. Cl.
CPC ............ *B29C 44/06* (2013.01); *A43B 13/127* (2013.01); *A43B 13/187* (2013.01); *A43B 13/20* (2013.01);
(Continued)

(58) Field of Classification Search
CPC ..... A43B 13/12; A43B 13/125; A43B 13/127; A43B 13/18; A43B 13/187; A43B 13/188;
(Continued)

(56) References Cited

U.S. PATENT DOCUMENTS 4,120,923 A 10/1978 Kloker et al.
5,952,065 A * 9/1999 Mitchell ................ B32B 33/00 428/424.2
(Continued)

FOREIGN PATENT DOCUMENTS

CN 105246956 A 1/2016
CN 108928086 A 12/2018
(Continued)

OTHER PUBLICATIONS

Overview of materials for Ethylene Vinyl Alcohol (EVOH) flyer, 3 pages.
(Continued)

*Primary Examiner* — Michael A Tolin
(74) *Attorney, Agent, or Firm* — SHOOK, HARDY & BACON L.L.P.

(57) ABSTRACT

Foamed articles including a foamed thermoplastic elastomeric material for articles of footwear. In one aspect, a method for making a foamed article comprises placing an article comprising a foamable material and carbon dioxide in a vessel, maintaining the vessel at a first pressure and first temperature at which the carbon dioxide is a liquid and carbon dioxide is soluble in the foamable material, optionally exposing the infused article to a second temperature and second pressure, and subjecting the article to a third pressure and third temperature at which the infused carbon dioxide phase transitions to a gas, thereby expanding the foamable material into a foamed material and forming the foamed article.

20 Claims, 24 Drawing Sheets

Related U.S. Application Data

(60) Provisional application No. 63/153,259, filed on Feb. 24, 2021.

(51) Int. Cl.

| | |
|---|---|
| ***A43B 13/20*** | (2006.01) |
| ***A43D 95/06*** | (2006.01) |
| ***B29C 44/06*** | (2006.01) |
| ***B29C 44/34*** | (2006.01) |
| ***B29C 65/00*** | (2006.01) |
| ***B32B 5/18*** | (2006.01) |
| ***B32B 5/20*** | (2006.01) |
| ***B32B 5/32*** | (2006.01) |
| ***B32B 27/06*** | (2006.01) |
| ***B32B 27/30*** | (2006.01) |
| ***B32B 38/00*** | (2006.01) |
| ***C08J 9/12*** | (2006.01) |

(52) U.S. Cl.

CPC .......... *A43D 95/06* (2013.01); *B29C 44/3403* (2013.01); *B29C 66/439* (2013.01); *B32B 5/18* (2013.01); *B32B 5/20* (2013.01); *B32B 5/32* (2013.01); *B32B 27/065* (2013.01); *B32B 27/306* (2013.01); *B32B 38/00* (2013.01); *C08J 9/122* (2013.01); *B32B 2038/0084* (2013.01); *B32B 2266/0278* (2013.01); *B32B 2437/00* (2013.01); *B32B 2437/02* (2013.01); *C08J 2201/032* (2013.01); *C08J 2203/06* (2013.01); *C08J 2375/04* (2013.01)

(58) Field of Classification Search

CPC ..... A43B 13/20; A43B 13/203; A43B 13/206; B29C 44/04; B29C 44/0484; B29C 44/06; B29C 44/065; B29C 44/3403; B29C 44/3453; B29C 44/348; B29C 44/5609; B29C 66/439; B29D 35/122; B29D 35/142; B29L 2031/00; B29L 2031/48; B29L 2031/50; B29L 2031/504; B29L 2031/52; B32B 5/18; B32B 5/20; B32B 5/32; B32B 27/065; B32B 27/306; B32B 27/40; B32B 2038/0084; B32B 2266/0278; B32B 2266/0292; B32B 2437/00; B32B 2437/02; C08J 9/122; C08J 2201/032; C08J 2203/06; C08J 2375/04

See application file for complete search history.

(56) References Cited

U.S. PATENT DOCUMENTS

| | | | |
|---|---|---|---|
| 6,461,725 | B1 | 10/2002 | Kanada et al. |
| 9,956,732 | B2 | 5/2018 | Murphy et al. |
| 11,685,816 | B2 | 6/2023 | Chang et al. |
| 11,987,915 | B2 | 5/2024 | Chang et al. |
| 2005/0031816 | A1 | 2/2005 | Chang et al. |
| 2009/0130420 | A1 | 5/2009 | Thiagarajan et al. |
| 2009/0148665 | A1 | 6/2009 | Thiagarajan et al. |
| 2010/0029793 | A1 | 2/2010 | Witt et al. |
| 2010/0222442 | A1 | 9/2010 | Prissok et al. |
| 2011/0305940 | A1 | 12/2011 | Usami et al. |
| 2013/0324629 | A1 | 12/2013 | Kanada et al. |
| 2014/0259329 | A1 | 9/2014 | Watkins et al. |
| 2014/0259753 | A1 | 9/2014 | Watkins et al. |
| 2014/0275306 | A1 | 9/2014 | Watkins et al. |
| 2016/0075113 | A1 | 3/2016 | Chang et al. |
| 2016/0108198 | A1 | 4/2016 | Watkins et al. |
| 2016/0137806 | A1 | 5/2016 | Kumar et al. |
| 2018/0213885 | A1 | 8/2018 | Darland |
| 2018/0237605 | A1 | 8/2018 | Chang et al. |
| 2018/0273718 | A1 | 9/2018 | Luo et al. |
| 2018/0290348 | A1 | 10/2018 | Su |
| 2019/0276650 | A1 | 9/2019 | Baghdadi |
| 2019/0308346 | A1 | 10/2019 | Farris et al. |
| 2020/0281314 | A1 | 9/2020 | Stockbridge et al. |
| 2020/0291199 | A1 | 9/2020 | Bi et al. |
| 2020/0390188 | A1 | 12/2020 | Cass |
| 2021/0138734 | A1 | 5/2021 | Maben et al. |
| 2021/0148017 | A1 | 5/2021 | Baranek et al. |
| 2022/0212377 | A1 | 7/2022 | Chang et al. |

FOREIGN PATENT DOCUMENTS

| | | | |
|---|---|---|---|
| EP | 1008637 | A2 | 6/2000 |
| EP | 1935621 | A1 | 6/2008 |
| EP | 3429386 | A1 | 1/2019 |
| JP | 11-170288 | A | 6/1999 |
| TW | I614293 | B | 2/2018 |
| WO | 00/18557 | A1 | 4/2000 |
| WO | 02/78824 | A1 | 10/2002 |
| WO | 2015/177571 | A1 | 11/2015 |
| WO | 2017/075131 | A1 | 5/2017 |
| WO | 2018/222968 | A1 | 12/2018 |
| WO | 2021/076599 | A1 | 4/2021 |

OTHER PUBLICATIONS

Shore (Durometer) Hardness Testing of Plastics, MatWeb Material Property Data, 3 pages.

* cited by examiner 134
130
144
132
142
146

A
130
132
134
144
146
A
142

FOAMED ARTICLES AND METHODS OF MAKING THE SAME

CROSS REFERENCE TO RELATED APPLICATIONS

This application is a Continuation of U.S. application Ser. No. 17/647,019, filed on Jan. 5, 2022, which claims the benefit of U.S. Provisional Application No. 63/153,259 filed on Feb. 24, 2021, both of which are incorporated herein by reference in their entirety.

TECHNICAL FIELD

The present disclosure is directed to foamed articles. More specifically, the present disclosure relates to foamed articles including a foamed thermoplastic elastomeric material, methods of making such foamed articles, and method for manufacturing articles of footwear including such foamed articles.

BACKGROUND

The design of athletic equipment and apparel as well as footwear involves a variety of factors from the aesthetic aspects, to the comfort and feel, to the performance and durability. While design and fashion may be rapidly changing, the demand for increasing performance in the market is unchanging. To balance these demands, designers employ a variety of materials and designs for the various components that make up athletic equipment and apparel as well as footwear.

BRIEF DESCRIPTION OF THE DRAWINGS

Further aspects of the present disclosure will be readily appreciated upon review of the detailed description, described below, when taken in conjunction with the accompanying drawings.

FIGS. 1A-1M illustrate various articles of footwear, apparel, and athletic equipment, including containers, electronic equipment, and vision wear, that are or comprise foamed articles in accordance with the present disclosure, while

DESCRIPTION

Figures 1A, 1B, 1C, 1D, 1E, 1F, 1G, 1H, 1I, 1J, 1K, 1L, 1M:
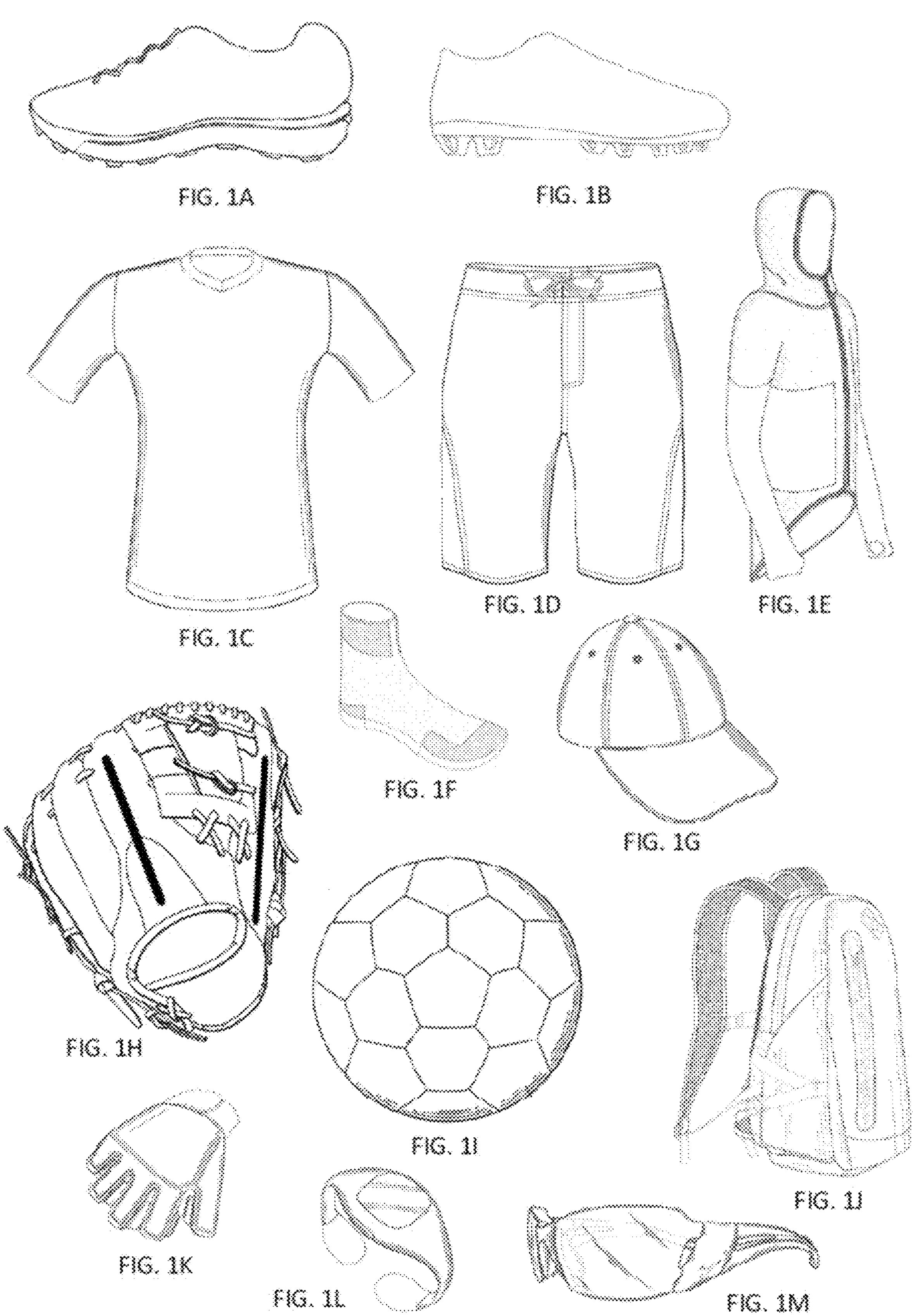

New foamed articles including a foamed thermoplastic elastomeric material and methods for making such foamed articles have been identified. The methods described herein include a step of infusing carbon dioxide into a solid foamable material of an article, i.e., a solid article. Following the infusing, the infused solid foamable material is foamed without thermally softening the solid foamable material by expanding the infused carbon dioxide, e.g., by phase transitioning the infused carbon dioxide to carbon dioxide gas, which in turn expands the solid foamable material into a foamed material into a foam, e.g., a foam having a multi-cellular foam structure. In this way, the solid foamable material is physically foamed without being melted in the process. The foamed articles described herein include one or more foamed materials which are physically foamed materials. It has been found that these physically foamed materials, which comprise a thermoplastic elastomeric material as described herein have a low density, a uniform multi-cellular foam structure, and/or other beneficial properties making the foamed materials suitable for use in many mass-produced consumer products, including articles of apparel, footwear, and sporting equipment. FIGS. 1A-1M illustrate various articles of footwear, apparel, and athletic equipment, including containers, electronic equipment, and vision wear, that are or comprise foamed articles in accordance with the present disclosure, while FIGS. 1N-1Y illustrate additional details regarding different types of footwear.

It has also been found that the multi-step foaming processes described herein can be easily adapted for use with conventional materials and manufacturing lines, as they use simpler, less expensive and more energy-efficient equipment and processes than other physical foaming processes. For example, maintaining the carbon dioxide as a liquid and holding the solid foamable material in the liquid carbon dioxide requires maintaining less extreme temperatures and pressures (and thus requires less expensive, more energy-efficient equipment) than using supercritical carbon dioxide to infuse the solid foamable material. In many aspects, the step of expanding the solid foamable material into the foamed material can be conducted at or near atmospheric pressure and at relatively low temperatures well below the melting temperature of the foamable material, and so can be conducted using simple, inexpensive heating methods and equipment, making the overall foaming process efficient and cost-effective. Additionally, the present disclosure can be applied to a wide range of solid foamable materials, and to articles have a number of different geometries, including but not limited to sheets of solid foamable material(s). Further, by using articles comprising two or more types of solid foamable materials, articles comprising two or more portion or regions of solid foamable material, and articles comprising a combination of one or more solid foamable material and one or more solid non-foamable material, and/or by varying the processing conditions, the processes for foaming solid articles described herein can be adapted to selectively foam portions or regions of an article without the need for additional tooling or equipment.

Using a foamed thermoplastic elastomeric material in the foamed articles disclosed herein can reduce the weight or density of the articles as compared to articles without foamed materials, i.e., articles comprising only solid materials. Additionally or alternatively, by using a foamed material in place of an unfoamed material, the total amount of material needed to provide the same volume is reduced, reducing material costs and making the foamed article more sustainable as compared to a comparable article without foamed material. Furthermore, by using a foamed thermoplastic elastomeric material, alone or in combination with one or more additional thermoplastic material, to form the foamed article, components of the foamed article or the entire foamed article can comprise recycled thermoplastic materials, and, in turn, the components or the entire foamed article can be recycled themselves. In some aspect, by controlling the foaming conditions and, optionally, controlling the optional stabilization process, the overall volume of the foamed article may be increased within a predicted or pre-determined range. The increase in volume can be relatively small, for example, an increase in volume of less than 10 percent, or less than 5 percent, as compared to the total volume of the article prior to undergoing the foaming process Alternatively, the increase in volume can be relatively large, for example, an increase in volume of greater than 20 percent, or greater than 40 percent as compared to the total volume of the article prior to undergoing the foaming process.

In some aspects, the foamed material of the foamed article is a stabilized foam material which has undergone a stabilization process. In some aspects, the foamed article includes layers or regions of foamed material adjacent to layers or regions of solid (i.e., unfoamed) material. In some aspects, the foamed article can be a cushioning element, such as a fluid-filled bladder. In some aspects, the thermoplastic elastomeric material can comprise one or more thermoplastic polyurethanes. In some aspects, in addition to the thermoplastic elastomeric material, the foamed article can further include a second material, such as a second thermoplastic material, including a second thermoplastic material which does not foam during the foaming process.

In one aspect, the present disclosure is directed to a method for making a foamed article. The foaming process as disclosed herein is a multi-step process which includes first infusing a solid foamable material with carbon dioxide, and then exposing the infused article to conditions which cause the carbon dioxide infused in the solid foamable material to undergo a phase change, which expands and foams the solid foamable material into a foamed material. Optionally, prior to the foaming step, the infused article can be exposed to and held (e.g., stored) at a pressure and temperature at which the infused carbon dioxide remains infused in the article, allowing the infused article to be foamed at a later time. Alternatively, the infused article can be exposed to and held conditions at which a portion of the infused carbon dioxide diffuses out of it, for a duration of time to allow diffusion of carbon dioxide out of a selected portion of the infused article. In this manner, infused carbon dioxide can be removed from selected regions or portions of the article prior to foaming, which results in only selected regions or portions of the article foaming when exposed to the foaming conditions. Optionally, after undergoing foaming, the foamed article can be stabilized to release residual carbon dioxide and/or to release residual stress in the article.

In another aspect, the present disclosure is directed to a foamed article. The foamed article comprises or consists essentially of a foamed material, wherein the foamed material is a physically-expanded foam formed of a thermoplastic elastomeric material comprising one or more first thermoplastic elastomers. The foamed material is the product of infusing carbon dioxide into a solid foamable comprising the thermoplastic elastomeric material, and producing a phase change causing the infused carbon dioxide to expand, thereby foaming the solid foamable material into the foamed material without thermally softening the solid foamable material. Optionally, the foamed article can comprise additional foamed materials, or additional unfoamed materials. Optionally, the foamed article can be a stabilized foam article, from which residual carbon dioxide has been removed, or from which residual stresses created during the foaming process have been reduced or removed.

In one aspect, disclosed herein is method for making a foamed article, the method comprising: placing an article and carbon dioxide in a vessel, wherein the article comprises a solid foamable material which is a thermoplastic elastomeric material comprising one or more first thermoplastic elastomers; after the placing, maintaining the vessel at a first pressure and first temperature, wherein the first pressure and first temperature are a pressure and temperature at which the carbon dioxide is a liquid and the liquid carbon dioxide is soluble in the solid foamable material, and wherein the maintaining includes holding the article and the liquid carbon dioxide in the vessel for a duration of time sufficient for at least a portion of the liquid carbon dioxide to infuse into the solid foamable material of the article; following the maintaining and holding, optionally exposing the infused article to a second pressure and second temperature at which the carbon dioxide remains infused within at least a portion of the solid foamable material; following the maintaining and holding and the optional exposing, subjecting the article to a third pressure and third temperature at which the carbon dioxide infused in the solid foamable material phase transitions to a gas, thereby expanding the solid foamable material into a foamed material and forming the foamed article; wherein the article comprises a first sheet and a second sheet, wherein a first side of the first sheet faces a second side of the second sheet, and wherein the first sheet and the second sheet are bonded together to form an internal cavity in a space between the first side of the first sheet and the second side of the second sheet, wherein the bond extends around at least a portion of a perimeter of the internal cavity, optionally wherein the bond is contiguous around only one or more portions of the perimeter of the internal cavity, and includes one or more apertures capable of admitting a fluid to the internal cavity, forming an open cavity; or wherein the bond is contiguous around an entire perimeter of the internal cavity, forming a sealed bladder capable of retaining a fluid in the internal cavity at a pressure above or below atmospheric pressure. Also disclosed are foamed articles manufactured according to the disclosed methods.

A list of exemplary aspects (i.e., aspects 1-332) are provided in the parent application, U.S. application Ser. No. 17/647,019, that support and are supported by the disclosure provided herein. The entirety of U.S. application Ser. No. 17/647,019 is incorporated by reference herein, inclusive of aspects 1-323.

Method for Making a Foamed Article

In one aspect, provided herein is a method for making a foamed article. The method comprises placing an article and carbon dioxide in a vessel, wherein the article comprises a solid foamable material, and wherein the foamable material is a thermoplastic elastomeric material comprising one or more thermoplastic elastomers. After the placing, the method further comprises maintaining the vessel at a first pressure and first temperature, wherein the first pressure and first temperature are a pressure and temperature at which the carbon dioxide is a liquid and the liquid carbon dioxide is soluble in the solid foamable material, and wherein the maintaining includes holding the article and the liquid carbon dioxide in the vessel for a duration of time sufficient for at least a portion of the liquid carbon dioxide to infuse into the solid foamable material of the article. As used herein "infuse" and "infused" carbon dioxide are understood to mean carbon dioxide, which is solubilized in, contained in, or otherwise absorbed and/or taken up in the solid foamable material. In some aspects, following the maintaining and holding, the method optionally comprises exposing the article to a second pressure and second temperature at which the carbon dioxide remains infused within at least a portion of the solid foamable material. In any of these aspects, following the maintaining and holding and the optional exposing of the article, the method comprises subjecting the article to a third pressure and a third temperature at which the carbon dioxide infused in the solid foamable material phase transitions to a gas, thereby expanding the solid foamable material into a foamed material and forming the foamed article. The foamed material has a multi-cellular foam structure. In one aspect, the foamed material has a multi-cellular closed-cell structure. In another aspect, the foamed material has a multi-cellular open-cell structure. In some aspects, subjecting the article to a third temperature and a third pressure and causing the carbon dioxide to phase transition to a gas also serves to cool the foamable material and/or the foamed material.

Placing in the vessel. In one aspect, the step of placing the carbon dioxide in the vessel comprises introducing carbon dioxide in the form of a solid, liquid, gas, or supercritical fluid into the vessel prior to the steps of maintaining and holding the carbon dioxide in the form of a liquid. In another aspect, introducing the carbon dioxide comprises charging the vessel with the carbon dioxide gas at a pressure and temperature condition that is a liquid/vapor equilibrium for carbon dioxide.

In one aspect, when the article is a sheet, the article can be configured as a roll optionally comprising a spacer or protective layer between adjacent portions of the foamed article. In some aspects, the article can be a layered sheet including one or more foamed layers. Further in this aspect, the step of placing comprises disposing the roll into the vessel and wherein the steps of subjecting and expanding comprise unrolling the article prior to or during the subjecting, or prior to or during the expanding. In some aspects, the step of placing further comprises disposing a porous spacer can be disposed between adjacent portions of the article prior to or during the placing, and wherein the steps of maintaining and holding comprise flowing the carbon dioxide through the porous spacer to the adjacent portions of the article. In other aspects, the article or sheet is not configured as a roll, but can be a sheet, a yarn or fibril, a fabric, a bladder, or any other foamable structure such as, for example, those disclosed herein.

In some aspects, the foamable article can be a foamable bladder, or a foamable component of a bladder. In other words, the foamable articles disclosed herein can be used to form bladders, or components of bladders, and these bladders or components of bladders can be foamed using the foaming process disclosed herein. In other aspects, the foamed article can be a foamed bladder or a foamed component of a bladder, where, either before, during or following formation of the bladder or the component of a bladder, the bladder or the component of the bladder is foamed using the foaming process disclosed herein.

Maintaining and holding at the first temperature and first pressure. After the step of placing the article and the carbon dioxide in the vessel, the article and carbon dioxide in the vessel are maintained at a first pressure and a first temperature. The first pressure and the first temperature are a pressure and a temperature at which the carbon dioxide is a liquid, and the liquid carbon dioxide is soluble in the solid foamable material. This step includes holding the article and the liquid carbon dioxide in the vessel for a duration of time sufficient for at least a portion of the liquid carbon dioxide to infuse into the solid foamable material. During this step, the liquid carbon dioxide contacts the article and infuses into one or more materials present in the article, including the solid foamable material. In order for the carbon dioxide to infuse into the solid foamable material of the article, the carbon dioxide in contact with the article must be present in a form that is soluble in and that will infuse into the solid foamable material. Once infused into the solid foamable material, the infused carbon dioxide also needs to be present in a phase that is capable of phase transitioning into a gas during the foaming process, and must also be present in a sufficient concentration in the solid foamable material to expend at least a portion of the solid foamable material in to a foam having a multi-cellular structure. Although solid carbon dioxide will expand directly from a solid to a gas under certain conditions, when solid carbon dioxide is placed in contact with the solid foamable materials disclosed herein, under most conditions, the solid carbon dioxide does not infuse into the solid foamable material at a rate or in sufficient concentrations to make it useful as a physical foaming agent for mass manufacturing. Although supercritical carbon dioxide can also phase transition and expand to a gas, and supercritical carbon dioxide typically is highly soluble in many polymeric materials, extreme temperatures and pressures are required to maintain carbon dioxide in a supercritical state, greatly increasing equipment and energy requirements for the process. However, liquid carbon dioxide has been found to be soluble in the solid foamable materials disclosed herein in sufficient concentrations to act as a physical foaming agent.

In one aspect, the method further comprises discharging any remaining carbon dioxide from the vessel after the steps of maintaining and holding, prior to the optional step of exposing, or prior to the steps of subjecting and expanding. Further in this aspect, discharging the carbon dioxide from the vessel comprises converting the liquid carbon dioxide to carbon dioxide gas prior to or during the discharging.

In one aspect, at the first pressure and first temperature, the carbon dioxide is soluble in the solid foamable material at a concentration of from about 1 weight percent to about 30 weight percent, optionally from about 5 weight percent to about 20 weight percent, from about 5 weight percent to about 10 weight percent, or from about 10 weight percent to about 20 weight percent.

In another aspect, the steps of maintaining and holding comprise maintaining the first pressure at from about 0.05 pounds per square inch (about 0.345 kilopascals) to about 6000 pounds per square inch (about 41,300 kilopascals). In another aspect, the first pressure is from about 15 pounds per square inch (103.4 kilopascals) to about 5500 pounds per square inch (37,900 kilopascals), optionally about 100 pounds per square inch (689.5 kilopascals) to about 5000 pounds per square inch (34,500 kilopascals), from about 500 pounds per square inch (3,450 kilopascals) to about 2000 pounds per square inch (about 13,790 kilopascals), or from about 1000 pounds per square inch (6895 kilopascals) to about 1500 pounds per square inch (10,300 kilopascals).

In yet another aspect, the steps of maintaining and holding can comprise maintaining the first temperature at from about −57 degrees Celsius to about 31 degrees Celsius, optionally from about −40 degrees Celsius to about 25 degrees Celsius, or from about −40 degrees Celsius to about 0 degrees Celsius. In one aspect, the steps of maintaining and holding comprise holding the article at the first pressure and the first temperature for a duration of from about 20 seconds to about 72 hours, optionally from about 20 seconds to about 24 hours, from about 1 minute to about 24 hours, or from about 1 minute to about 1 hour.

Optionally, in any of these aspects, during the performance of the maintaining and holding step and the subjecting and expanding step of the methods disclosed herein, the temperature of the foamable material is maintained at a temperature below a softening temperature of the foamable material. For example, the thermoplastic elastomeric material can be maintained at a temperature at least 10 degrees Celsius, or at least 20 degrees Celsius below the Vicat softening temperature of the foamable material. While it is possible to conduct additional processing steps on the foamed article which may thermally soften a portion or a region of the solid foamable material or the foamed material, in these aspects, these steps involving thermally softening the solid foamable material or melting the foamed material are conducted either before the maintaining an holding step, or after the subjecting and expanding step. The avoidance of thermally softening the foamable material can reduce or prevent thermal degradation of the foamable material.

In an aspect, the article comprises a solid first foamable material and a second material, wherein the second material is a second foamable material. Further in this aspect, the steps of maintaining and holding comprise holding the article and the liquid carbon dioxide in the vessel for a duration of time sufficient for at least a portion of the liquid carbon dioxide to infuse into the solid first foamable material but not into the solid second foamable material. Further in this aspect, the steps of subjecting and expanding comprise expanding the first foamable material into a first foamed material while maintaining the solid second foamable material as a substantially unfoamed second foamable material.

In an aspect, the foamable article can comprise a foamable region or foamable layer including the first foamable material. In some aspects, the foamable article further comprises a second region or layer comprising a second material (wherein the foamable region or foamable layer including the foamable material is a first foamable region or first foamable layer). The second material can be a second foamable material as disclosed herein, or can be a second unfoamable material. In another aspect, as disclosed herein, the foamed article can comprise a foamed region or foamed layer including the foamed material, and in some aspects, the foamed article can comprise a second foamed region or second foamed layer comprising a second foamable material, or can comprise a second unfoamed region or second unfoamed layer comprising a second unfoamed material.

In another aspect, the article comprises a solid first foamable material and further comprises an additional material, wherein the additional material is an additional foamable material. Further in this aspect, the steps of maintaining and holding include holding the article and the liquid carbon dioxide in the vessel for a duration of time sufficient for at least a portion of the liquid carbon dioxide to infuse into the solid first foamable material and into the solid additional foamable material. In another aspect, the method includes the optional step of exposing, and the exposing comprises exposing the article to a second pressure and second temperature at which the carbon dioxide remains infused within the solid additional foamable material but at which the carbon dioxide diffuses out of the solid first foamable material. Further in this aspect, the steps of subjecting and expanding comprise expanding the solid foamable material into a second foamed material while maintaining the solid first foamable material as a substantially unfoamed first foamable material.

Optional exposing to the second pressure and temperature. In some aspects, following the maintaining and holding, the method optionally comprises exposing the article to a second pressure and second temperature at which the carbon dioxide remains infused within at least a portion of the solid foamable material. In some aspects, this optional step can involve increasing or decreasing the temperature of the foamed article, for example, in order to bring the foamed article to a higher temperature or to a lower temperature. In other aspects, this optional step can involve increasing or decreasing the pressure under which the foamed article is held, for example, in order to expose the foamed article to a higher pressure or to a lower pressure. In yet other aspects, this optional step of exposing can comprise exposing the infused article to an increased or decreased pressure as compared to the first pressure, and/or to an increased or decreased temperature as compared to the first temperature. The optional step of exposing can comprise exposing the infused article to a second pressure and temperature under which the infused carbon dioxide substantially remains infused in the infused article. For example, the second pressure and temperature can be a pressure and a temperature under which little if any carbon dioxide diffuses out of the infused article, over the duration at which the infused article is exposed to the second pressure and/or temperature. In one aspect, the exposing can comprise storing the infused article in a conventional freezer under atmospheric pressure at a temperature at which the infused carbon dioxide has a low rate of diffusion out of the infused article. Alternatively, the optional step of exposing can comprise exposing the infused article to a second pressure and temperature under which an amount of infused carbon dioxide diffuses out of the infused article. For example, when the rate at which the carbon dioxide diffuses out of a thermoplastic material is known for a particular second pressure and temperature, the duration of time required for an amount of carbon dioxide to diffuse out of a particular portion of the infused article can be determined, and the infused article can be held at the second pressure and temperature for the determine duration of time, in order to reduce the concentration of carbon dioxide in a portion or region of the infused article. For example, the exposing step can be used to first create regions or portions of the infused article which will expand into a relatively more dense foam as compared to other regions or portions of the infused article, or which will remain substantially unfoamed during the foaming step, based on allowing some or all of the carbon dioxide to diffuse out of the first regions or portions. In this way, it has been found to be possible to achieve well-controlled variability in the extent to which an article is foamed, without the need for expensive, complicated equipment or tooling.

In one aspect, the optional step of exposing comprises exposing the article to the second pressure of from about 1 atmosphere (101 kilopascals) to about 85 atmospheres (8613 kilopascals), optionally from about 1 atmosphere (101 kilopascals) to about 40 atmospheres (4053 kilopascals), or from about 1 atmosphere (101 kilopascals) to about 20 atmospheres (2026.5 kilopascals).

In some aspects, the optional step of exposing comprises exposing the article to the second temperature of more than about 30 degrees Celsius below the softening point of the solid foamable material, optionally more than about 50 degrees Celsius below the softening point of the solid foamable material, or more than about 100 degrees below the softening point of the solid foamable material.

In any of these aspects, the optional step of exposing comprises exposing the article to the second pressure and second temperature for a duration of from about 30 minutes to about 4 weeks, optionally from about 1 hour to about 1 week, or from about 1 hour to about 24 hours.

In some aspects, the optional step of exposing can occur in the vessel. In other aspects, the optional step of exposing further comprises removing the carbon dioxide-infused article from the vessel prior to exposing the article to the optional second pressure and second temperature.

Subjecting to a third pressure and third temperature, expanding the solid foamable material. As stated above, the method comprises subjecting the article to a third pressure and a third temperature at which the carbon dioxide infused in the solid foamable material phase transitions to a gas, thereby expanding the solid foamable material into a foamed material and forming the foamed article. The third pressure can be a higher or lower pressure as compared to the first pressure or the optional second pressure, and the third temperature can be a higher or lower temperature as compared to the first temperature or the optional second pressure, so long as the third pressure and temperature are a condition under which the infused carbon dioxide present in the infused article phase transitions to a gas, and does so at a rate sufficient to expand at least a portion of the solid foamable material of the article. In many aspects, the third pressure can be a pressure at or near atmospheric pressure, and the third pressure can be at or near room temperature, or an elevated temperature which is below the softening temperature of the solid foamable material, i.e., conditions which can be achieved using inexpensive equipment and low energy consumption.

In one aspect, the steps of subjecting and expanding comprise subjecting the article to third pressure of from about 13 pounds per square inch (89.6 kilopascals) to about 16 pounds per square inch (110.3 kilopascals), optionally from about 13 pounds per square inch (kilopascals) to about 15 pounds per square inch (103.4 kilopascals), or from about 14 pounds per square inch (96.5 kilopascals) to about 15 pounds per square inch (103.4 kilopascals).

In some aspects, the steps of subjecting and expanding comprise subjecting the article to third temperature of from about 20 degrees Celsius to about 150 degrees Celsius, optionally from about 20 degrees Celsius to about 100 degrees Celsius, from about 25 degrees Celsius to about 70 degrees Celsius, from about 50 degrees Celsius to about 70 degrees Celsius, or is about 60 degrees Celsius.

In any of these aspects, the steps of subjecting and expanding comprise subjecting the article to the third pressure and third temperature for a duration of from about 2 seconds to about 5 minutes, optionally from about 5 seconds to about 2 minutes, or from about 30 seconds to about 1 minute.

In some aspects, the steps of subjecting and expanding can occur in the vessel. In other aspects, the step of subjecting further comprises removing the carbon dioxide-infused article from the vessel prior to subjecting the article to the third pressure and third temperature.

In one aspect, the step of subjecting the article to the third temperature and third pressure comprises introducing the article to a fluid bath, optionally wherein the fluid bath is a water bath. In some aspects, the fluid bath has a temperature of from about 20 degrees Celsius to about 90 degrees Celsius, optionally from about 40 degrees Celsius to about 80 degrees Celsius, or from about 50 degrees Celsius to about 70 degrees Celsius. In another aspect, during the subjecting, the article is held in the fluid bath for a duration of time of from about 15 seconds to about 5 minutes, optionally from about 30 seconds to about 3 minutes, or from about 1 minute to about 2 minutes.

In an alternative aspect, the step of subjecting comprises subjecting the article to a source of energy or heat, optionally wherein the source of energy or heat comprises steam, microwave energy, infrared (IR) energy, or radio frequency (RF) energy. Further in this aspect, the step of subjecting the article to the source of energy or heat increases the temperature of at least a portion of the foamable material of the article to a temperature of from about 60 degrees Celsius to about 150 degrees Celsius, optionally from about 70 degrees Celsius to about 100 degrees Celsius, or from about 75 degrees Celsius to about 90 degrees Celsius. In one aspect, the subjecting is for a duration of from about 2 seconds to about 5 minutes, optionally from about 15 seconds to about 3 minutes, or from about 1 minute to about 2 minutes.

In another aspect, the step of subjecting and expanding comprises expanding the foamable material into the foamed material until the foamed material has a density of from about 0.01 gram per cubic centimeter to about 3.0 grams per cubic centimeter, optionally of from about 0.01 gram per cubic centimeter to about 0.1 gram per cubic centimeter, from about 0.01 gram per cubic centimeter to about 0.05 grams per cubic centimeter, from about 0.01 gram per cubic centimeter to about 0.025 grams per cubic centimeter, from about 0.05 grams per cubic centimeter to about 0.1 gram per cubic centimeter, from about 0.1 gram per cubic centimeter to about 3.0 grams per cubic centimeter, from about 0.2 grams per cubic centimeter to about 2.0 grams per cubic centimeter, from about 0.3 grams per cubic centimeter to about 1.5 grams per cubic centimeter, from about 0.3 grams per cubic centimeter to about 1.2 grams per cubic centimeter, or from about 0.4 grams per cubic centimeter to about 1.0 grams per cubic centimeter.

In still another aspect, following the steps of subjecting and expanding, the foamed material has an expansion ratio of from about 3:1 to about 120:1 relative to the solid foamable material prior to the subjecting and expanding, optionally from about 3:1 to about 100:1, or from 3:1 to about 50:1, or from about 5:1 to about 10:1 relative to the thermoplastic elastomeric material in a non-foamed condition. In one aspect, during the expanding, at least a portion of the article comprising the solid foamable material expands in length, width, and height due to the expansion of the solid foamable material into the foamed material.

In one aspect, following the expanding, a size of the foamed article is greater in at least one dimension as compared to a size of the article before the placing, optionally wherein the foamed article is at least 5 percent larger, optionally at least 10 percent larger, at least 15 percent larger, or at least 20 percent larger in one or more of length, width, and height.

In some aspects, the article is a layered sheet and the steps of subjecting and expanding foam at least one layer of the sheet. Further in this aspect, following the subjecting and expanding, a thickness of the foamed layered sheet is at least 5 percent greater, optionally at least 10 percent greater, at least 15 percent greater, or at least 20 percent greater than a thickness of the layered sheet in its unfoamed state.

Optional exposing to fourth temperature and fourth pressure. In some aspects, the method further comprises the optional step of, following the subjecting and expanding, bringing the foamed article to a fourth temperature and fourth pressure, and holding the foamed article at or below the fourth temperature, the fourth pressure, or both, for a duration of time. This optional step can involve increasing or decreasing the temperature of the foamed article, for example, in order to bring the foamed article to room temperature. Similarly, in some aspects, this optional step can involve increasing or decreasing the pressure under which the foamed article is being held, for example, bringing the foamed article to atmospheric pressure and/or room temperature.

In one aspect, the optional step of bringing comprises bringing the foamed article to the fourth pressure of from about 0.03 atmospheres (3.04 kilopascals) to about 2 atmospheres (202.65 atmospheres), optionally from about 0.5 atmospheres (50.7 kilopascals) to about 1.5 atmospheres (152 kilopascals), or is about 1 atmosphere (101.3 kilopascals).

In another aspect, the optional step of bringing comprises bringing the foamed article to the fourth temperature of from about 30 degrees Celsius to about 70 degrees Celsius, optionally from about 40 degrees Celsius to about 60 degrees Celsius, or from about 45 degrees Celsius to about 55 degrees Celsius. In some aspects, in the optional step of bringing, the fourth temperature is at or below a glass transition temperature of the solid foamable material, or is from about 10 degrees Celsius less than to about 10 degrees Celsius greater than the glass transition temperature of the solid foamable material as measured by the Melting Temperature, Glass Transition Temperature, and Enthalpy of Melting Test Protocol. In one aspect, the glass transition temperature of the solid foamable material is less than 0 degrees Celsius, optionally less than −10 degrees Celsius, less than −20 degrees Celsius, less than −30 degrees Celsius, or less than −40 degrees Celsius.

In any of these aspects, optional step of bringing comprises bringing the foamed article to the fourth pressure and the fourth temperature for a duration of from about 15 minutes to about 1 hour, optionally from about 20 minutes to about 45 minutes, or from about 20 minutes to about 30 minutes.

Optional stabilizing at a fifth temperature and fifth pressure. In still other aspects, the method further comprises, following the subjecting and expanding or following the optional bringing, stabilizing the foamed article at a fifth pressure and fifth temperature. The fifth pressure and temperature can be a pressure and temperature at which the carbon dioxide diffuses out of the foamed material of the foamed article while maintaining the foamed material in a foam structure, thereby forming a stabilized foamed article. In some aspects, stabilizing comprises holding the foamed article at the fifth pressure and fifth temperature for a duration of time sufficient to remove substantially all of the carbon dioxide from the foamed material. The fifth pressure can be at or near atmospheric pressure, or can be at a pressure at which the rate at which air diffuses into the foam and/or the rate at which carbon dioxide diffuses out of the foam is greater than the rate(s) at atmospheric pressure. The fifth temperature can be at or near room temperature, or can be at a temperature at which the rate at which air diffuses into the foam and/or the rate at which carbon dioxide diffuses out of the foam is greater than the rate(s) at room temperature. Stabilizing the foamed article can also comprise releasing stresses in the foamed article, such as stresses in the foamed thermoplastic elastomeric material, or stresses in a solid material present in the foamed article. In such aspects, the fifth pressure and/or fifth temperature can be atmospheric pressure and/or room temperature, or can be a pressure and/or temperature at which stresses in the foamed article are released at faster rate(s) than at atmospheric pressure or room temperature. In one example, the stabilization can be conducted at atmospheric pressure and at a temperature above room temperature and at least 5 degrees Celsius below the softening temperature of the foamed material. The stabilization can be conducted using conventional heating equipment, such as a convection, microwave or infrared oven, or a heating tunnel. Stabilization can be particularly useful when the foamed material is present in the form of a sheet, and/or when the foamed article includes a layered structure including layers of foamed materials adjacent to layers of solid (unfoamed) materials, as it can release stresses in the solid materials which developed during the foaming process.

In one aspect, the optional step of stabilizing comprises stabilizing at the fifth pressure of about atmospheric pressure. In another aspect, the optional step of stabilizing comprises stabilizing at the fifth temperature of greater than the glass transition temperature of the foamed material as measured by the Melting Temperature, Glass Transition Temperature, and Enthalpy of Melting Test Protocol. Further in this aspect, the optional step of stabilizing comprises stabilizing at the fifth temperature of from about 30 degrees Celsius to about 70 degrees Celsius, optionally from about 40 degrees Celsius to about 60 degrees Celsius, or about 50 degrees Celsius. In one aspect, the optional step of stabilizing comprises stabilizing the foamed article at the fifth temperature for from about 15 minutes to about 60 minutes, optionally from about 30 minutes to about 45 minutes.

In one aspect, the optional step of stabilizing at the fifth pressure and the fifth temperature comprises placing the foamed article in an oven. In some aspects, stabilizing the foamed article at the fifth pressure and the fifth temperature releases stresses in the foamed article. In another aspect, stabilizing the foamed article at the fifth pressure and the fifth temperature removes substantially all of the residual carbon dioxide in the foamed article. In another aspect, if carbon dioxide gas remains in individual foam cells, stabilizing can remove the carbon dioxide gas. In a further aspect, if carbon dioxide remains infused in foamed or unfoamed materials, stabilizing can remove the infused carbon dioxide. In still another aspect, stresses may be introduced when foamable materials transition to foamed materials while remaining bonded to unfoamed materials; further in this aspect, stabilizing can release these stresses.

In some aspects, shrinkage of the foamed article may be a concern, or may be desirable. The step of stabilizing the foamed article at the fifth pressure and the fifth temperature can be used to reduce or control the level of shrinkage of the foamed article following the foaming. For example, the rate of shrinkage under particular conditions can be used determine the time, temperature, and pressure to obtain the desired level of shrinkage for the foam article. In an aspect, stabilizing can reduce or release stresses that would otherwise lead to an undesired level of shrinkage.

In any of these aspects, the method can include the step of stabilizing, and following the stabilizing, the stabilized foamed article is greater in at least one dimension as compared to a size of the article before the placing, optionally wherein the stabilized foamed article is at least 5 percent larger, at least 10 percent larger, at least 15 percent larger, or at least 20 percent larger in one or more of length, width, and height.

Further Processing of the Foamable Material and Foamed Materials and Articles. In an aspect, the foamable material can optionally be formed using a variety of processes. In one aspect, the solid foamable material can be formed using an extrusion process prior to the step of placing. In one aspect, the solid foamable material can be formed using an injection molding process prior to the step of placing. In another aspect, the solid foamable material can be formed using a thermal and/or vacuum forming process prior to the step of placing. In one aspect, the thermal and/or vacuum forming process can use pressure and/or thermal energy to conform the foamable material to the shape of a mold. In one aspect, the mold can include one or more curved surfaces. In another aspect, the mold can be an open mold or a closed mold. In some aspects, the mold can be configured to form a single surface of the foamable material or multiple surfaces of the foamable material. Alternatively or additionally, an additive manufacturing process such as extrusion, deposition printing, and/or selective sintering can be used to form and/or shape the foamable material prior to the step of placing.

In one aspect, the method further comprises thermoforming the foamed article, optionally wherein the foamed article is a stabilized foamed article. In some aspects, the formed article is a sheet, optionally a layered sheet, optionally wherein the layered sheet comprises at least one unfoamed cap layer, and optionally wherein the layered sheet comprises one or more formed inner layers and two unfoamed cap layers. In some aspects, the article can be a thermoformed article. In any of these aspects, the foamed article can be a component of an article of apparel, an article of footwear, or an article of sporting equipment.

Foaming Selected Layers of the Articles. In one aspect, the article comprises a first cap layer, one or more core layers, and, optionally, a second cap layer. In a further aspect, the step of maintaining and holding infuses the carbon dioxide into the first cap layer, or infuses the carbon dioxide into the first cap layer and at least one of the one or more core layers, or infuses the carbon dioxide into the first cap layer and into each of the one or more core layers, or infuses the carbon dioxide into the first cap layer, each of the one or more core layers, and the second cap layer.

In one aspect, the method includes the step of exposing, and the exposing releases substantially all of the infused carbon dioxide from the first cap layer while retaining infused carbon dioxide in at least one of the one or more core layers, or releases substantially all of the infused carbon dioxide from the first cap layer while retaining infused carbon dioxide in each of the one or more core layers, or releases substantially all of the infused carbon dioxide from the first cap layer while retaining infused carbon dioxide in each of the one or more core layers and in the second cap layer, or releases substantially all of the infused carbon dioxide from the first cap layer while retaining infused carbon dioxide in the second cap layer, optionally retaining infused carbon dioxide in at least one of the one or more core layers, or releases substantially all of the infused carbon dioxide from the first cap layer and each of the one or more core layers while retaining infused carbon dioxide in the second cap layer.

In one aspect, the article further comprises one or more structural layers, and the step of maintaining and holding infuses the carbon dioxide into the first cap layer, or infuses the carbon dioxide into the first cap layer and at least one of the one or more structural layers, or into the first cap layer, at least one of the one or more structural layers, or into the first cap layer, at least one of the one or more structural layers, and at least one of the one or more core layers, or infuses the carbon dioxide into the first cap layer, at least one of the one or more structural layers, and each of the one or more core layers, or infuses the carbon dioxide into the first cap layer, each of the one or more structural layers, each of the one or more core layers, and the second cap layer.

In still another aspect, the disclosed method includes the step of exposing and the exposing releases substantially all of the infused carbon dioxide from the first cap layer while retaining infused carbon dioxide in at least one of the one or more structural layers, or releases substantially all of the infused carbon dioxide from the first cap layer and from a first of the one or more structural layers while retaining infused carbon dioxide in a second of the one or more structural layers, or releases substantially all of the infused carbon dioxide from the first cap layer, from one or more of the at least one structural layers, and a first one of the one or more core layers while retaining infused carbon dioxide in a second one of the one or more core layers, in a second one of the one or more structural layers, and in the second cap layer, or releases substantially all of the infused carbon dioxide from the first cap layer, from at least a first one of the one or more structural layers, and form at least one of the one or more core layers while retaining infused carbon dioxide in at least one of the one or more core layers, in the second cap layer, and optionally in a second one of the one or more structural layers, or releases substantially all of the infused carbon dioxide from the first cap layer, each of the one or more structural layers, and each of the one or more core layers while retaining infused carbon dioxide in the second cap layer.

In any of these aspects, the article can further comprise one or more tie layers, and the step of maintaining and holding infuses the carbon dioxide into the first cap layer, into at least one of the one or more structural layers, and at least one of the one or more tie layers, or into the first cap layer, at least one of the one or more structural layers, at least one of the one or more tie layers, and at least one of the one or more core layers, or infuses the carbon dioxide into the first cap layer, at least one of the one or more structural layers, at least one of the one or more tie layers, and each of the one or more core layers, or infuses the carbon dioxide into the first cap layer, each of the one or more structural layers, each of the one or more tie layers, each of the one or more core layers, and the second cap layer.

In another aspect, the method can include the step of exposing, and the exposing releases substantially all of the infused carbon dioxide from the first cap layer and from a first of the one or more structural layers while retaining infused carbon dioxide in the one or more tie layers, or releases substantially all of the infused carbon dioxide from the first cap layer, from a first one of the one or more structural layers, a first one of the one or more tie layers and a first one of the one or more core layers while retaining infused carbon dioxide in a second one of the one or more core layers, in a second one of the one or more tie layers, in a second one of the one or more structural layers, and in the second cap layer.

In some aspects, the steps of subjecting and expanding do not expand and foam at least a portion of the tie material of at least one of the one or more tie layers, leaving at least one tie layer substantially unfoamed in the foamed article, optionally wherein the tie material of the at least one tie layer comprises or consists essentially of a barrier material as described below.

In one aspect, the steps of subjecting and expanding do not expand and foam substantially all of the tie material of each of the one or more tie layers, leaving each of the one or more tie layers substantially unfoamed in the foamed article, optionally wherein the tie material of each of the one or more tie layers comprises or consists essentially of a barrier material as described below.

Foaming Bladders. In one aspect, the foamable article comprises a first sheet and a second sheet and a second side of the first sheet faces a second side of the second sheet, and the first sheet and the second sheet are bonded together to form an internal cavity in a space between the second side of the first sheet and the second side of the second sheet, wherein the bond extends around at least a portion of a perimeter of the internal cavity, optionally wherein the bond is contiguous around only one or more portions of the perimeter of the internal cavity, and includes one or more apertures capable of admitting a fluid to the internal cavity, forming an open cavity, or wherein the bond is contiguous around an entire perimeter of the internal cavity, forming a sealed bladder capable of retaining a fluid in the internal cavity at a pressure above or below atmospheric pressure. In another aspect, a first side of the first sheet and/or a first side of the second sheet can be an outermost surface of the foamable articles.

In any of these aspects, the method can further comprise the step of closing the one or more apertures in the perimeter of the internal cavity, forming a sealed bladder, optionally wherein the step of closing comprises forming an adhesive bond or a thermal bond between the second side of the first sheet and the second side of the second sheet. In a further aspect, the method further comprises inflating the sealed bladder with a fluid.

In one aspect, the step of inflating occurs prior to the step of placing, or occurs after the steps of subjecting and expanding. In an alternative aspect, the method comprises the step of bringing, and the step of inflating occurs after the step of bringing. In an alternative aspect, the method comprises the step of stabilizing, and the step of inflating occurs after the step of stabilizing.

In another aspect, during the steps of subjecting and expanding, within the sealed bladder, the first side of the first sheet and second side of the second sheet remain unfoamed, optionally wherein one or more layers of the first sheet or the second sheet or both foam during the step of subjecting and expanding, optionally wherein the one or more foamed layers are positioned in the first film and in the second sheet at depths less than the depths of the one or more barrier layers.

In one aspect, the methods disclosed herein can be tuned and controlled to produce a desired level of expansion of the foamed articles (e.g., sheets, bladders, and the like). Further in this aspect, a single unfoamed article or material such as a single unfoamed component can be expanded in a controlled manner such that it can be expanded into two or more different sizes of foamed articles or components. In one exemplary aspect, a single size of unfoamed bladder as disclosed herein can be foamed and stabilized under different conditions to produce foamed airbags suitable for use as cushioning elements in two, three, or more different sizes of shoes.

Foamed Articles

In one aspect, disclosed herein is a foamed article comprising a foamed material that is a physically-expanded foam formed of a thermoplastic elastomeric material comprising one or more first thermoplastic elastomers. In another aspect, the foamed material is a product of placing an unfoamed article comprising a solid foamable material in liquid carbon dioxide, infusing the solid foamable material with the carbon dioxide, and expanding the infused solid foamable material by expanding the infused carbon dioxide without thermally softening the solid foamable material, for example by phase transitioning the infused carbon dioxide into a gas under conditions that do not soften the solid foamable material, thereby expanding the solid foamable material into the foamed material of the foamed article. In some aspects, the foamed article is a stabilized foamed article comprising the stabilized foamed material, wherein the stabilized foamed material is free or substantially free of infused carbon dioxide.

In another aspect, in the foamed articles described herein, the foamed material is a first foamed material, the foamed article comprises a second foamed material, the second foamed material is an additional material as disclosed herein, and the thermoplastic elastomeric material of the first foamed material is a recycled material, or the additional material of the second foamed material is a recycled material, or both the thermoplastic elastomeric material and the additional material are recycled materials.

In another aspect, when first pressure is from about 0.05 pounds per square inch (0.345 kilopascals) to about 6000 pounds per square inch (about 41,300 kilopascals), optionally about 15 pounds per square inch (103.4 kilopascals) to about 5500 pounds per square inch (37,900 kilopascals), about 100 pounds per square inch (689.5 kilopascals) to about 5000 pounds per square inch (34,500 kilopascals), from about 500 pounds per square inch (3,450 kilopascals) to about 2000 pounds per square inch (about 13,790 kilopascals), or from about 1000 pounds per square inch (6895 kilopascals) to about 1500 pounds per square inch (10,300 kilopascals) and the first temperature can be from about-57 degrees Celsius to about 31 degrees Celsius, optionally from about-40 degrees Celsius to about 25 degrees Celsius, or from about-40 degrees Celsius to about 0 degrees Celsius, the carbon dioxide is soluble in the foamed material or in the solid foamable material, or in both, at a concentration of from about 1 weight percent to about 30 weight percent, optionally from about 5 weight percent to about 20 weight percent, from about 5 weight percent to about 10 weight percent, or from about 10 weight percent to about 20 weight percent.

In one aspect, the foamed material of the foamed article is substantially opaque. In another aspect, the foamed material has a split-tear value of from about 2.5 kilograms per centimeter to about 3.0 kilograms per centimeter, optionally of from about 2.5 kilograms per centimeter to about 2.8 kilograms per centimeter, from about 2.5 kilograms per centimeter to about 2.75 kilograms per centimeter, or from about 2.75 kilograms per centimeter to about 3.0 kilograms per centimeter, as measured using the Split-Tear Test Protocol. In another example, the foamed article is formed having an Asker C hardness of from about 10 to about 50, or of from about 15 to about 50, from about 15 to about 45, from about 20 to 45, or from about 20 to about 40, as measured using the Asker C Hardness Test Protocol.

Layers of the Foamable Materials and Foamed Articles and Arrangement Thereof

Figure 8A:
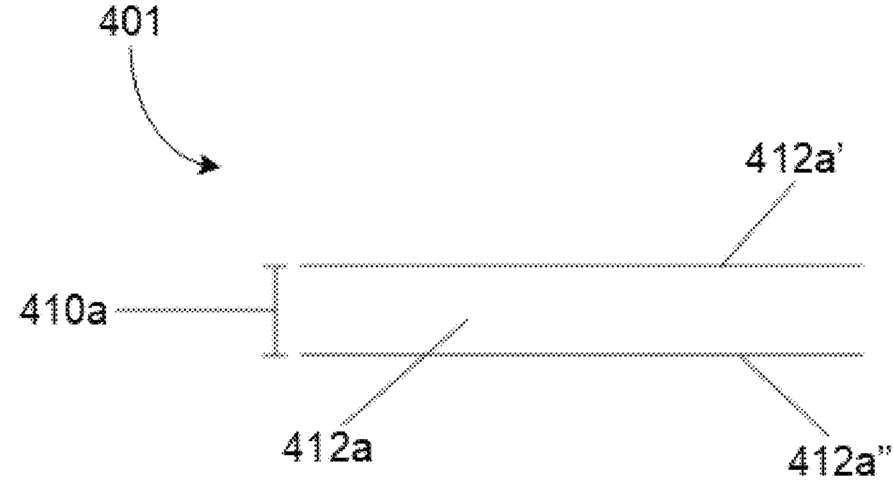
FIGS. 8A-8D illustrate various configurations of single-sided, foamable articles in accordance with an exemplary embodiment.

In one aspect, the articles disclosed herein, before undergoing a foaming process as disclosed herein, can comprise or consist essentially of a single layer of solid foamable material as illustrated, for example, in FIG. 8A. In this exemplary embodiment, article 401, before undergoing the foaming process, includes solid foamable material 412*a* having a first side 412*a*' and a second side 412*a*" and a thickness 410*a*. During the foaming process, at least a portion of the solid foamable material 412*a* of the single layer expands to have a foam structure, thereby increasing its volume. The increase in volume of the foamed material increases at least one dimension (length, width, or thickness) of the foamed article. In examples where the length and width of the article are significantly larger than its thickness, the change in volume following foaming will have a larger impact on its thickness. After undergoing the foaming process, in the foamed article, the thickness 410*a* of the single layer is increased as compared to its thickness before foaming.

Figure 8B:
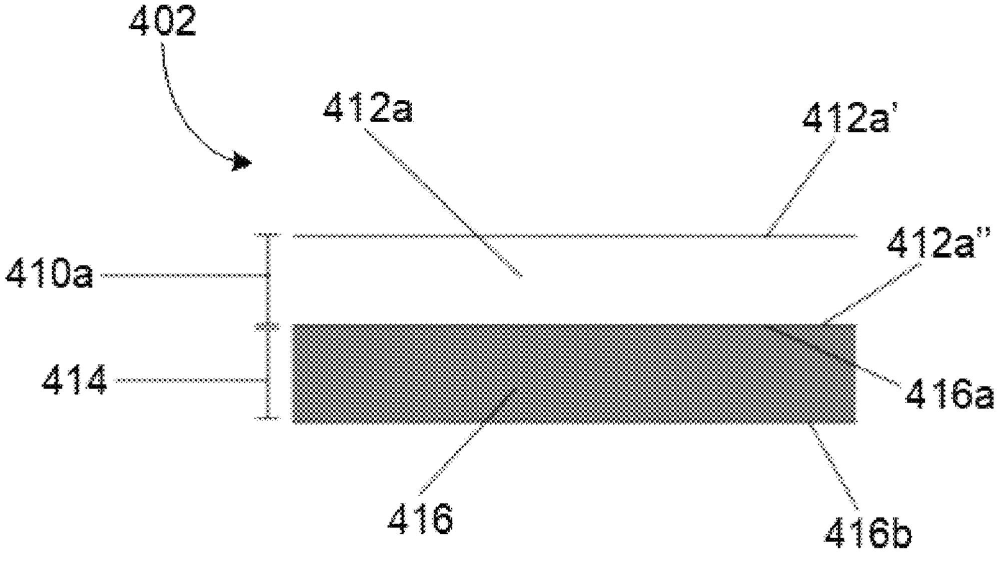

In another aspect, the articles disclosed herein, before undergoing a foaming process as disclosed herein, can comprise multiple layers, at least one of which comprises a solid foamable material according to the present disclosure, as illustrated, for example, in FIG. 8B. In this exemplary embodiment, the article 402 includes a cap layer 412*a* having thickness 410*a*, and a core layer 416 having a thickness 414.

In one such aspect in accordance with the example of FIG. 8B, the cap layer 412*a* can comprise or consist essentially of a first solid foamable material. In such an aspect, the core layer 416 can also comprise or consist essentially of a second solid foamable material, or can comprise or consist essentially of a barrier material. In either of these aspects, the cap layer 412*a* can have a first surface 412*a*' and a second surface 412*a*", and the core layer can have a first surface 416*a* and a second surface 416*b*. In some aspects, the second surface 412*a*" of the cap layer 412*a* and the first surface 416*a* of the core layer 416 can be adjacent to one another or otherwise in contact with one another. In some aspects, first surface 412*a*' of the cap layer 412*a* can optionally be an outer surface of article 402.

During the foaming process, at least a portion of the first solid foamable material of the cap layer 412*a* and, in instances wherein the core layer 416 comprises or consists essentially of a second solid foamable material, optionally at least a portion of the second solid foamable material of the core layer 416, expands to have a foam structure, thereby increasing its volume. The increase in volume of the foamed material increases at least one dimension (length, width, or thickness) of the foamed article. In examples where the length and width of the article are significantly larger than its thickness, and/or wherein the first and/or second solid foamable material is constrained in the length-wise and/or width-wise dimension, such as by being bonded to another material, the change in volume following foaming will have a larger impact on its thickness.

After undergoing the foaming process, in the foamed article, the thickness 410*a* of the cap layer 412*a* is increased as compared to before foaming. In aspects where the second layer 416 comprises a second foamable material, the second foamable material can also expand and foam, increasing the thickness 414 of the second layer 416 as compared to its thickness before foaming. Alternatively, the second layer 416 may not foam during the foaming process, and thus its thickness 414 will stay substantially the same before and after undergoing the foaming process. In one such aspect where the second layer 416 remains unfoamed, the second layer 416 comprises or consists essentially of a barrier material, and thus does not expand and foam during the foaming process. In an alternative such aspect where the second layer 416 remains unfoamed, the second layer 416 may comprise a second foamable material, but the second foamable material either is not infused with carbon dioxide during the maintaining and holding step, or infused carbon dioxide is diffused out of the second layer 416 prior to the subjecting and expanding step.

Structural Layers. In another aspect, the foamed article comprises a structural layer and the structural layer comprises or consists essentially of a structural material. In one aspect, the structural material can be an additional material as disclosed herein, optionally wherein the structural material comprises a blend of two or more additional materials, optionally wherein at least one of the two or more additional materials is a recycled material.

Figure 8C:
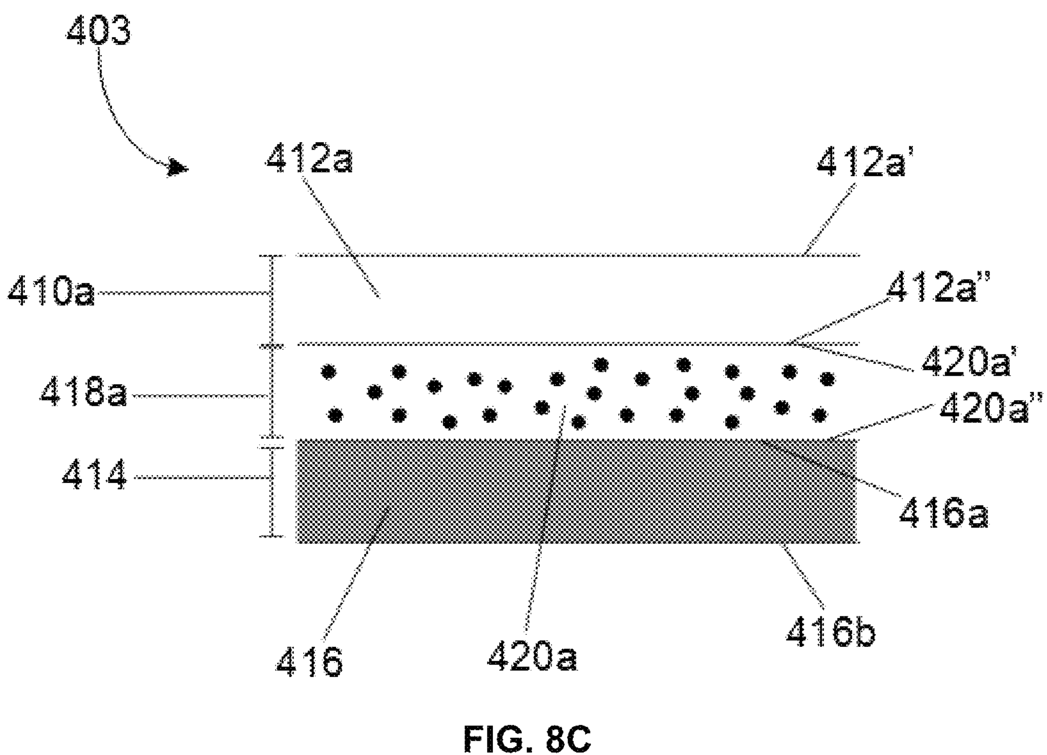

In another aspect, the articles disclosed herein, before undergoing a foaming process as disclosed herein, can comprise multiple layers, at least one of which comprises a solid foamable material according to the present disclosure, as illustrated, for example, in FIG. 8C. In this exemplary embodiment, the article 403 includes a cap layer 412*a* having thickness 410*a*, a structural layer 420*a* having a thickness 418*a*, and a core layer 416 having a thickness 414.

In one such aspect in accordance with the example of FIG. 8C, the cap layer 412*a* can comprise or consist essentially of a first solid foamable material. In such an aspect, the structural layer 420*a* can also comprise or consist essentially of a third solid foamable material, or can comprise or consist essentially of a barrier material. In such an aspect, the core layer 416 can comprise or consist essentially of a second solid foamable material, or can comprise or consist essentially of a barrier material. In any of these aspects, the cap layer 412*a* can have a first surface 412*a*' and a second surface 412*a*", the structural layer can have a first surface 420*a*' and a second surface 420*a*", and the core layer can have a first surface 416*a* and a second surface 416*b*. In some aspects, the second surface 412*a*" of the cap layer 412*a* and the first surface 420*a*' of the structural layer 420*a* can be adjacent to one another or otherwise in contact with another. In a further aspect, the second surface 420*a*" of the structural layer 420*a* and the first surface 416*a* of the core layer 416 can be adjacent to one another or otherwise in contact with one another. In some aspects, first surface 412*a*' of the cap layer 412*a* can optionally be an outer surface of article 403.

In an aspect, during the foaming process, at least a portion of the first solid foamable material of the cap layer 412*a* and, in instances, wherein the structural layer 420*a* comprises or consists essentially of a third solid foamable material and the core layer 416 comprises or consists essentially of a second solid foamable material, optionally at least a portion of the third solid foamable material of the structural layer 420*a* and/or at least a portion of the second solid foamable material of the core layer 416, expands to have a foam structure, thereby increasing its volume. The increase in volume of the foamed material increases at least one dimension (length, width, or thickness) of the foamed article. In examples where the length and width of the article are significantly larger than its thickness, and/or wherein the first, second, and/or third solid foamable material is constrained in the length-wise and/or width-wise dimension, such as by being bonded to another material, the change in volume following foaming will have a larger impact on its thickness.

After undergoing the foaming process, in the foamed article, thickness 410*a* of the cap layer 412*a* is increased as compared to before foaming. In aspects where the structural layer 420*a* comprises a third foamable material, the third foamable material can also expand and foam, increasing the thickness 418*a* of the structural layer 420*a* as compared to its thickness before foaming. Alternatively, the structural layer 420*a* may not foam during the foaming process, and thus its thickness 418*a* will stay substantially the same before and after undergoing the foaming process. In aspects where the core layer 416 comprises a second foamable material, the second foamable material can also expand and foam, increasing the thickness 414 of the core layer 416 as compared to its thickness before foaming. Alternatively, the core layer 416 may not foam during the foaming process, and thus its thickness 414 will stay substantially the same before and after undergoing the foaming process. In one such aspect where the structural layer 420*a* and/or the core layer 416 remains unfoamed, the structural layer 420*a* and/or the core layer 416 comprises or consists essentially of a barrier material, and thus does not expand and foam during the foaming process. In an alternative aspect such as where the structural layer 420*a* remains unfoamed, the structural layer 420*a* may comprise a third foamable material, but the third foamable material either is not infused with carbon dioxide during the maintaining and holding step, or infused carbon dioxide is diffused out of the structural layer 420*a* prior to the subjecting and expanding step. In another aspect such as when the core layer 416 remains unfoamed, the core layer 416 may comprise a second foamable material, but the second foamable material either is not infused with carbon dioxide during the maintaining and holding step, or infused carbon dioxide is diffused out of the core layer 416 prior to the subjecting and expanding step.

Tie Layers. In still another aspect, the foamed article comprises one or more tie layers, each of the one or more tie layers individually comprising or consisting essentially of a tie material, wherein each of the one or more tie layers or tie regions individually comprises or consists essentially of a tie material, wherein each of the one or more tie layers or tie regions increases a bond strength between two adjacent layers or regions, optionally wherein the tie material is a thermoplastic elastomeric material as disclosed herein and optionally wherein the thermoplastic elastomeric material is a recycled material as described herein.

Figure 8D:
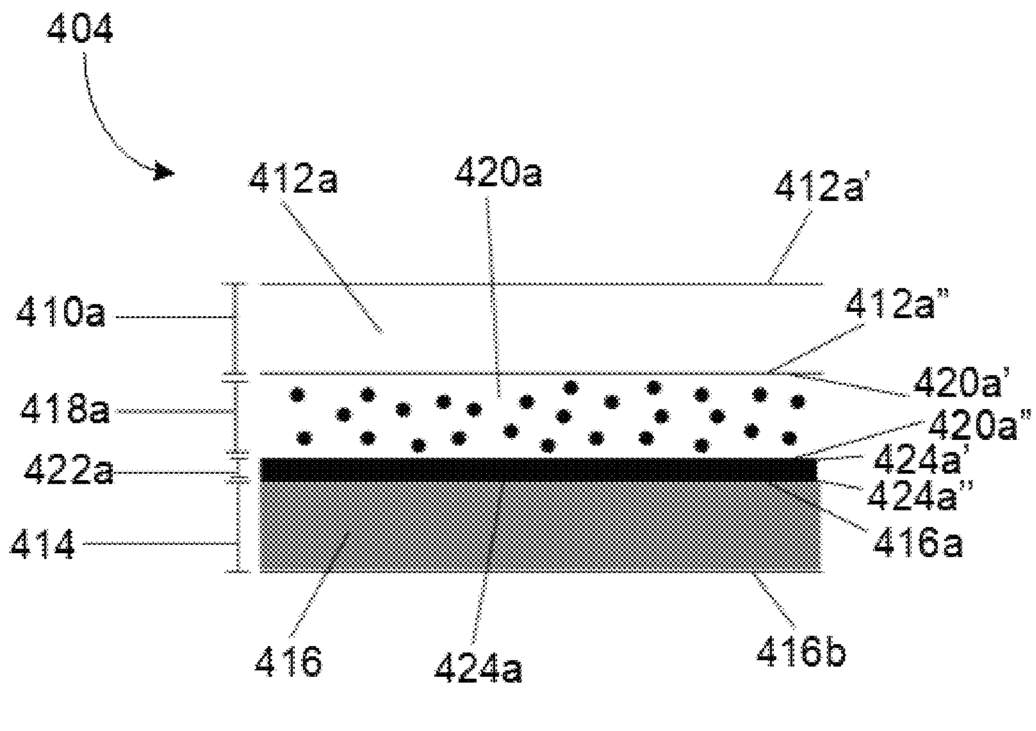

In another aspect, the articles disclosed herein, before undergoing a foaming process as disclosed herein can comprise multiple layers, at least one of which comprises a solid foamable material according to the present disclosure, as illustrated, for example, in FIG. 8D. In this exemplary embodiment, article 404 includes a cap layer 412*a* having thickness 410*a*, a structural layer 420*a* having a thickness 418*a*, a tic layer 424*a* having thickness 422*a*, and a core layer 416 having thickness 414.

In one such aspect in accordance with the example of FIG. 8D, the cap layer 412*a* can comprise or consist essentially of a first solid foamable material. In such an aspect, the structural layer 420*a* can also comprise or consist essentially of a third solid foamable material, or can comprise or consist essentially of a barrier material. In such an aspect, the tie layer 424*a* can also comprise or consist essentially of a fourth solid foamable material, or can comprise or consist essentially of a barrier material. In such an aspect, the core layer 416 can comprise or consist essentially of a second solid foamable material, or can comprise or consist essentially of a barrier material. In any of these aspects, the cap layer 412*a* can have a first surface 412*a*' and a second surface 412*a*", the structural layer can have a first surface 420*a*' and a second surface 420*a*", the tie layer 424*a* can have a first surface 424*a*' and a second surface 424*a*", and the core layer can have a first surface 416*a* and a second surface 416*b*. In some aspects, the second surface 412*a*" of the cap layer 412*a* and the first surface 420*a*' of the structural layer 420*a* can be adjacent to one another or otherwise in contact with one another. In a further aspect, the second surface 420*a*" of the structural layer 420*a* and the first surface 424*a*' of the tie layer 424*a* can be adjacent to one another or otherwise in contact with one another. In a still further aspect, the second surface 424*a*" of the tie layer 424*a* and the first surface 416*a* of the core layer can be adjacent to one another or otherwise in contact with one another. In some aspects, the first surface 412*a*' of the cap layer 412*a* can optionally be an outer surface of article 404.

In an aspect, during the foaming process, at least a portion of the first solid foamable material of the cap layer 412*a* and, in instances, wherein the structural layer 420*a* comprises or consists essentially of a third solid foamable material, the tie layer 424*a* comprises or consists essentially of a fourth solid foamable material, and/or the core layer 416 comprises or consists essentially of a second solid foamable material, optionally at least a portion of the third solid foamable material of the structural layer 420*a* and/or at least a portion of the fourth solid foamable material of the tie layer 424*a* and/or at least a portion of the second solid foamable material of the core layer 416 expands to have a foam structure, thereby increasing its volume. The increase in volume of the foamed material increases at least one dimension (length, width, or thickness) of the foamed article. In examples where the length and width of the article are significantly larger than its thickness, and/or wherein the first, second, third, and/or fourth solid foamable material is constrained in the length-wise and/or width-wise dimension, such as by being bonded to another material, the change in volume following foaming will have a larger impact on its thickness.

After undergoing the foaming process, in the foamed article, thickness 410*a* of the cap layer 412*a* is increased as compared to before foaming. In aspects where the structural layer 420*a* comprises a third foamable material, the third foamable material can also expand and foam, increasing the thickness 418*a* of the structural layer 420*a* as compared to its thickness before foaming. Alternatively, the structural layer 420*a* may not foam during the foaming process, and thus its thickness 418*a* will stay substantially the same before and after undergoing the foaming process. In aspects where the tie layer 424*a* comprises a fourth foamable material, the fourth foamable material can also expand and foam, increasing the thickness 422*a* of the tie layer 424*a* as compared to the thickness before foaming. Alternatively, the tie layer 424*a* may not foam during the foaming process, and thus its thickness 422*a* will stay substantially the same before and after undergoing the foaming process. In aspects where the core layer 416 comprises a second foamable material, the second foamable material can also expand and foam, increasing the thickness 414 of the core layer 416 as compared to the thickness before foaming. Alternatively, the core layer 416 may not foam during the foaming process, and thus its thickness 414 will stay substantially the same before and after undergoing the foaming process. In one such aspect where the structural layer 420*a* and/or the tie layer 424*a* and/or the core layer 416 remains unfoamed, the structural layer 420*a* and/or the tie layer 424*a* and/or the core layer 416 comprises or consists essentially of a barrier material, and thus does not expand and foam during the foaming process. In an alternative aspect, such as where the structural layer 420*a* remains unfoamed, the structural layer 420*a* may comprise a third foamable material, but the third foamable material either is not infused with the carbon dioxide during the maintaining and holding step, or infused carbon dioxide is diffused out of the second layer 420*a* prior to the subjecting and expanding step. In another aspect such as when the tic layer 424*a* remains unfoamed, the tie layer 424*a* may comprise a fourth foamable material, but the fourth foamable material either is not infused with carbon dioxide during the maintaining and holding step, or infused carbon dioxide is diffused out of the tie layer 424*a* prior to the subjecting and expanding step. In another aspect, such as when the core layer 416 remains unfoamed, the core layer 416 may comprise a second foamable material, but the second foamable material either is not infused with carbon dioxide during the maintaining and holding step, or infused carbon dioxide is diffused out of the core layer 416 prior to the subjecting and expanding step.

Two-Sided Articles. In some aspects, the articles disclosed herein can comprise multiple layers, at least one of which comprises a solid foamable material according to the present disclosure as illustrated, for example, in FIG. 9A. In this exemplary embodiment, the article 405 includes a two cap layers, 412*a* having a thickness 410*a* and 412*b* having a thickness 410 and a core layer 416 having a thickness 414. In one aspect, the article can be two-sided. Further in this aspect, a two-sided article can include a symmetrical arrangement of layers on both sides of core layer 416.

Figure 9A:
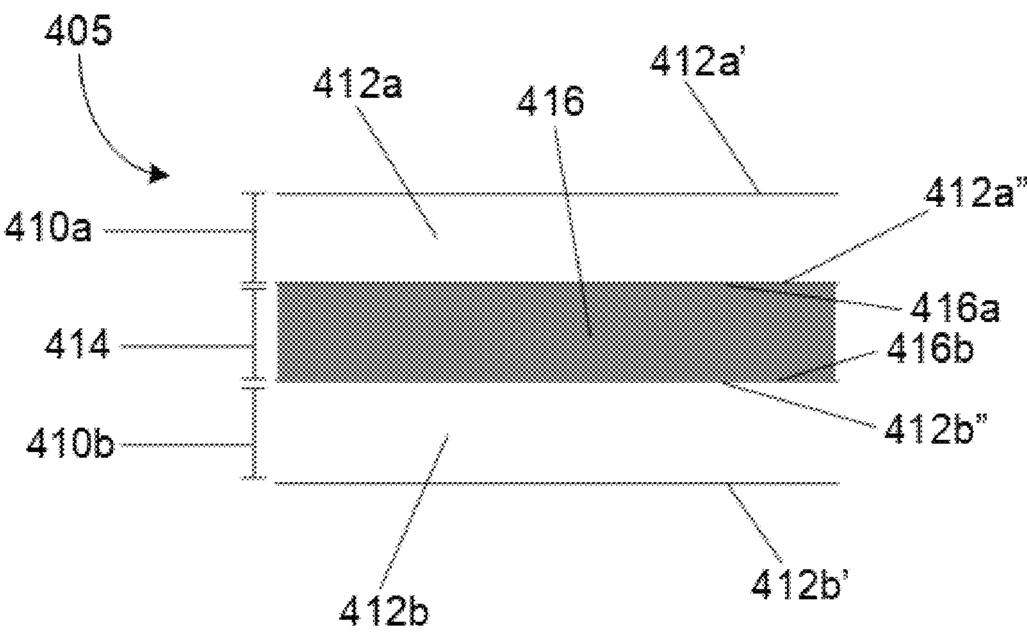
FIGS. 9A-9C illustrate various configurations of dual-sided, foamable articles in accordance with another exemplary embodiment.

In one such aspect in accordance with the example of FIG. 9A, cap layers 412*a* and 412*b* can comprise or consist essentially of a first solid foamable material. In such an aspect, the core layer 416 can comprise or consist essentially of a second solid foamable material, or can comprise or consist essentially of a barrier material.

In any of these aspects, the cap layer 412*a* can have a first surface 412*a*' and a second surface 412*a*", while the cap layer 412*b* can have a first surface 412*b*' and a second surface 412*b*". In another aspect, the core layer 416 can have a first surface 416*a* and a second surface 416*b*. In some aspects, the second surface 412*a*" of the cap layer 412*a* and the first surface 416*a* of the core layer 416 can be adjacent to one another or otherwise in contact with one another. In one aspect, the second surface 416*b* of the core layer 416 and the second surface and the second surface 412*b*" of the cap layer 412*b* can be adjacent to one another or otherwise in contact with one another. In some aspects, first surface 412*a*' of cap layer 412*a* and/or first surface 412*b*' of cap layer 412*b* can independently optionally be an outer surface of article 405.

In an aspect, during the foaming process, at least a portion of the first solid foamable material of the cap layer 412*a* and/or 412*b* and, in instances where the core layer 416 comprises or consists essentially of a second solid foamable material, optionally at least a portion of the second solid foamable material of core layer 416, expands to have a foam structure, thereby increasing its volume. The increase in volume of the foamed material increases at least one dimension (length, width, or thickness) of the foamed article. In examples where the length and width of the article are significantly larger than its thickness, and/or wherein the first, second, and/or third solid foamable material is constrained in the length-wise and/or width-wise dimension, such as by being bonded to another material, the change in volume following foaming will have a larger impact on its thickness.

After undergoing the foaming process, in the foamed article, thickness 410*a* of the cap layer 412*a* and/or thickness 410*b* of the cap layer 412*b* is increased as compared to before foaming. In aspects where the core layer 416 comprises a second foamable material, the second foamable material can also expand and foam, increasing the thickness 414 of the core layer 416 of the core layer 416 as compared to its thickness before foaming. Alternatively, the core layer 416 may not foam during the foaming process, and thus its thickness 414 will stay substantially the same before and after undergoing the foaming process.

In one aspect, when exemplary structure 405 forms one wall of a sealed chamber or bladder, surface 412*a*' is exposed on the outermost surface of the sealed chamber or bladder and at least a portion of cap layer 412*a* foams during the foaming process disclosed herein, while surface 412*b*' is situated on the inside surface of the sealed chamber or bladder and cap layer 412*b* may not foam during the foaming process disclosed herein.

Figure 9B:
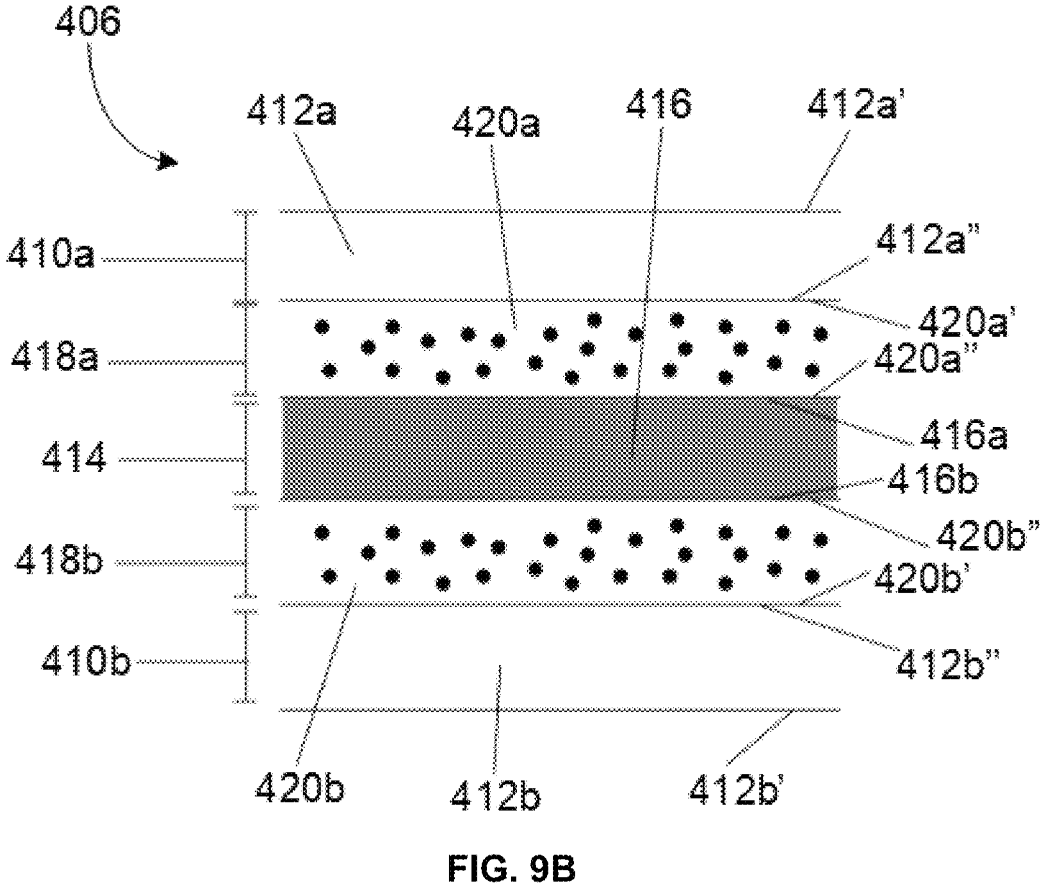

In some aspects, the articles disclosed herein can comprise multiple layers, at least one of which comprises a solid foamable material according to the present disclosure as illustrated, for example, in FIG. 9B. In this exemplary embodiment, the article 406 includes a two cap layers, 412*a* having a thickness 410*a* and 412*b* having a thickness 410*b*, two structural layers, 420*a* having a thickness 418*a* and 420*b* having a thickness 418*b*, and a core layer 416 having a thickness 414. In one aspect, the article can be two-sided. Further in this aspect, a two-sided article can include a symmetrical arrangement of layers on both sides of core layer 416.

In one such aspect in accordance with the example of FIG. 9B, cap layers 412*a* and 412*b* can comprise or consist essentially of a first solid foamable material. In such an aspect, structural layers 420*a* and 420*b* can also comprise or consist essentially of a third solid foamable material, or can comprise or consist essentially of a barrier material. In such an aspect, the core layer 416 can comprise or consist essentially of a second solid foamable material, or can comprise or consist essentially of a barrier material.

In any of these aspects, the cap layer 412*a* can have a first surface 412*a*' and a second surface 412*a*", while the cap layer 412*b* can have a first surface 412*b*' and a second surface 412*b*". In another aspect, the structural layer 420*a* can have a first surface 420*a*' and a second surface 420*a*", while the core layer 416 can have a first surface 420*b*' and a second surface 420*b*". In still another aspect, the core layer 416 can have a first surface 416*a* and a second surface 416*b*. In some aspects, the second surface 412*a*" of the cap layer 412*a* and the first surface 420*a*' of the structural layer 420*a* can be adjacent to one another or otherwise in contact with one another. In a further aspect, the second surface 420a" of the structural layer 420a and the first surface 416a of the core layer and the second surface 420a" of the structural layer 420a can be adjacent to one another or otherwise in contact with one another. In one aspect, the second surface 416b of the core layer 416 and the second surface 420b" of the structural layer 420b can be adjacent to one another or otherwise in contact with one another. In still another aspect, the first surface 420b' of the structural layer 420b and the second surface 412b" of the cap layer 412b can be adjacent to one another or otherwise in contact with one another. In some aspects, first surface 412a' of cap layer 412a and/or first surface 412b' of cap layer 412b can independently optionally be an outer surface of article 406.

In an aspect, during the foaming process, at least a portion of the first solid foamable material of the cap layer 412a and/or 412b and, in instances where the structural layer 420a and/or 420b comprises or consists essentially of a third solid foamable material, and/or where the core layer 416 comprises or consists essentially of a second solid foamable material, optionally at least a portion of the third solid foamable material of structural layer 420a and/or 420b, and/or at least a portion of the second solid foamable material of core layer 416, expands to have a foam structure, thereby increasing its volume. The increase in volume of the foamed material increases at least one dimension (length, width, or thickness) of the foamed article. In examples where the length and width of the article are significantly larger than its thickness, and/or wherein the first, second, and/or third solid foamable material is constrained in the length-wise and/or width-wise dimension, such as by being bonded to another material, the change in volume following foaming will have a larger impact on its thickness.

After undergoing the foaming process, in the foamed article, thickness 410a of the cap layer 412a and/or thickness 410b of the cap layer 412b is increased as compared to before foaming. In aspects where the structural layers 420a and 420b comprise a third foamable material, the third foamable material can also expand and foam, increasing the thickness 418a of the structural layer 420a and/or thickness 418b of the structural layer 420b as compared to their thickness before foaming. Alternatively, the structural layers 420a and/or 420b may not foam during the foaming process, and thus their thickness 418a and/or 418b will stay substantially the same before and after undergoing the foaming process. In aspects where the core layer 416 comprises a second foamable material, the second foamable material can also expand and foam, increasing the thickness 414 of the core layer 416 as compared to its thickness before foaming. Alternatively, the core layer 416 may not foam during the foaming process, and thus its thickness 414 will stay substantially the same before and after undergoing the foaming process.

In one aspect, when exemplary structure 406 forms one wall of a sealed chamber or bladder, surface 412a' is exposed on the outermost surface of the sealed chamber or bladder and at least a portion of cap layer 412a foams during the foaming process disclosed herein, while surface 412b' is situated on the inside surface of the sealed chamber or bladder and cap layer 412b may not foam during the foaming process disclosed herein. Further in this aspect, when structural layer 420a comprises or consists essentially of solid foamable material, at least a portion of structural layer 420a may foam during the foaming process disclosed herein, while structural layer 420b may not foam during the foaming process disclosed herein.

Figure 9C:
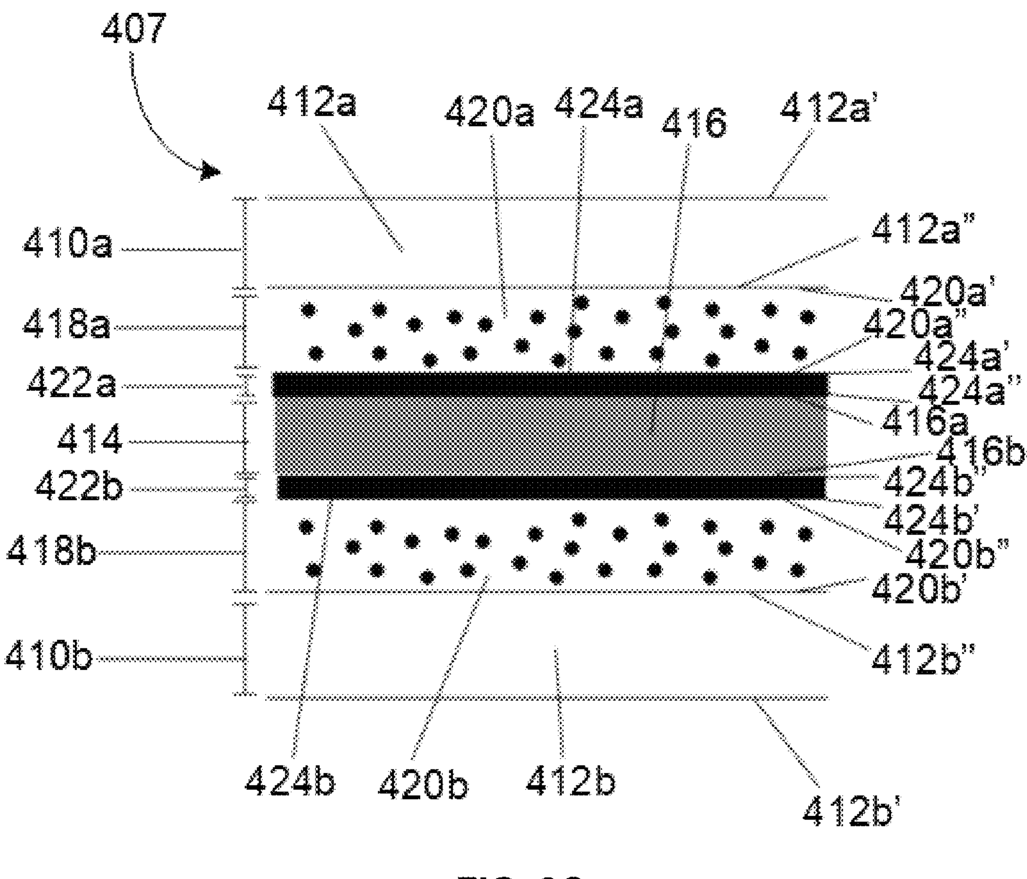

In some aspects, the articles disclosed herein can comprise multiple layers, at least one of which comprises a solid foamable material according to the present disclosure as illustrated, for example, in FIG. 9C. In this exemplary embodiment, the article 407 includes a two cap layers, 412a having a thickness 410a and 412b having a thickness 410b, two structural layers, 420a having a thickness 418a and 420b having a thickness 418b, two tie layers, 424a having a thickness 422a and 424b having a thickness 422b, and a core layer 416 having a thickness 414. In one aspect, the article can be two-sided. Further in this aspect, a two-sided article can include a symmetrical arrangement of layers on both sides of core layer 416

In one such aspect in accordance with the example of FIG. 9C, cap layers 412a and 412b can comprise or consist essentially of a first solid foamable material. In such an aspect, structural layers 420a and 420b can also comprise or consist essentially of a third solid foamable material, or can comprise or consist essentially of a barrier material. In such an aspect, the tic layers 424a and 424b can comprise or consist essentially of a fourth solid foamable material, or can comprise or consist essentially of a barrier material. In such an aspect, the core layer 416 can comprise or consist essentially of a second solid foamable material, or can comprise or consist essentially of a barrier material.

In any of these aspects, the cap layer 412a can have a first surface 412a' and a second surface 412a", while the cap layer 412b can have a first surface 412b' and a second surface 412b". In another aspect, the structural layer 420a can have a first surface 420a' and a second surface 420a", while the core layer 416 can have a first surface 420b' and a second surface 420b". In still another aspect, the tie layer 424a can have a first surface 424a' and a second surface 424a", while the tie layer 424b can have a first surface 424b' and a second surface 424b". In still another aspect, the core layer 416 can have a first surface 416a and a second surface 416b. In some aspects, the second surface 412a" of the cap layer 412a and the first surface 420a' of the structural layer 420a can be adjacent to one another or otherwise in contact with one another. In a further aspect, the second surface 420a" of the structural layer 420a and the first surface 424a' of the tie layer 424a can be adjacent to one another or otherwise in contact with one another. In a still further aspect, the first surface 416a of the core layer and the second surface 424a" of the tic layer 424a can be adjacent to one another or otherwise in contact with one another. In one aspect, the second surface 416b of the core layer 416 and the second surface 424b" of the tie layer 424b can be adjacent to one another or otherwise in contact with one another. In another aspect, the first surface 424b' of the tie layer 424b and the second surface 420b" of the structural layer 420b can be adjacent to one another or otherwise in contact with one another. In still another aspect, the first surface 420b' of the structural layer 420b and the second surface 412b" of the cap layer 412b can be adjacent to one another or otherwise in contact with one another. In some aspects, first surface 412a' of cap layer 412a and/or first surface 412b' of cap layer 412b can independently optionally be an outer surface of article 407.

In an aspect, during the foaming process, at least a portion of the first solid foamable material of the cap layer 412a and/or 412b and, in instances where the structural layer 420a and/or 420b comprises or consists essentially of a third solid foamable material, and/or the tic layer 424a and/or 424b comprises or consists essentially of a fourth solid foamable material, and/or where the core layer 416 comprises or consists essentially of a second solid foamable material, optionally at least a portion of the third solid foamable material of structural layer 420_a_ and/or 420_b_, and/or at least a portion of the fourth solid foamable material of tic layer 424_a_ and/or 424_b_, and/or at least a portion of the second solid foamable material of core layer 416, expands to have a foam structure, thereby increasing its volume. The increase in volume of the foamed material increases at least one dimension (length, width, or thickness) of the foamed article. In examples where the length and width of the article are significantly larger than its thickness, and/or wherein the first, second, third, and/or fourth solid foamable material is constrained in the length-wise and/or width-wise dimension, such as by being bonded to another material, the change in volume following foaming will have a larger impact on its thickness.

After undergoing the foaming process, in the foamed article, thickness 410_a_ of the cap layer 412_a_ and/or thickness 410_b_ of the cap layer 412_b_ is increased as compared to before foaming. In aspects where the structural layers 420_a_ and 420_b_ comprise a third foamable material, the third foamable material can also expand and foam, increasing the thickness 418_a_ of the structural layer 420_a_ and/or thickness 418_b_ of the structural layer 420_b_ as compared to its thickness before foaming. Alternatively, the structural layers 420_a_ and/or 420_b_ may not foam during the foaming process, and thus their thickness 418_a_ and/or 418_b_ will stay substantially the same before and after undergoing the foaming process. In aspects where the tie layers 424_a_ and 424_b_ comprise a fourth foamable material, the fourth foamable material can also expand and foam, increasing the thickness 422_a_ of the tie layer 424_a_ and/or thickness 422_b_ of the tie layer 424_b_ as compared to their thickness before foaming. Alternatively, the tie layers 424_a_ and/or 424_b_ may not foam during the foaming process, and thus their thickness 422_a_ and/or 422_b_ will stay substantially the same before and after undergoing the foaming process. In aspects where the core layer 416 comprises a second foamable material, the second foamable material can also expand and foam, increasing the thickness 414 of the core layer 416 of the core layer 416 as compared to its thickness before foaming. Alternatively, the core layer 416 may not foam during the foaming process, and thus its thickness 414 will stay substantially the same before and after undergoing the foaming process.

In one aspect, when exemplary structure 407 forms one wall of a sealed chamber or bladder, surface 412_a_' is exposed on the outermost surface of the sealed chamber or bladder and at least a portion of cap layer 412_a_ foams during the foaming process disclosed herein, while surface 412_b_' is situated on the inside surface of the sealed chamber or bladder and cap layer 412_b_ may not foam during the foaming process disclosed herein. Further in this aspect, when structural layer 420_a_ and/or tie layer 424_a_ independently comprise or consist essentially of solid foamable materials, at least a portion of structural layer 420_a_ and/or tic layer 424_a_ may foam during the foaming process disclosed herein, while structural layer 420_b_ and/or tic layer 424_b_ may not foam during the foaming process disclosed herein.

Layers and Composition Thereof. In any of the disclosed aspects, the article can comprise a barrier layer comprising or consisting essentially of a barrier material as disclosed herein. In another aspect, the barrier material can be an additional material as described herein.

Protective Layers. In one aspect, the article can comprise one or more protective layers, each of the one or more protective layers individually comprising or consisting essentially of a protective material, wherein each of the one or more protective layers is adjacent to a core layer and has a protective layer thickness, wherein a combination of the one or more protective layers and the adjacent core layer has a minimum curve radius which is greater than a minimum curve radius that causes cracking of the core layer, or of one or more individual layers within the core layer, optionally wherein the protective material is a solid foamable material as disclosed herein, optionally wherein the solid foamable material is a recycled material.

Barrier Layers and/or Regions. In one aspect, the foamed article comprises a barrier layer or a barrier region, and the barrier layer or the barrier region comprises or consists essentially of a barrier material. Further in this aspect, the barrier material can be an additional material as disclosed herein.

Foamable Articles Comprising Microlayers

In one aspect, the article comprises a plurality of microlayers. In one aspect, the plurality of microlayers comprises from about 5 to about 1000 microlayers, optionally about 10 to about 1000 microlayers, from about 30 to about 500 microlayers, from about 50 to about 200 microlayers, or from about 20 to about 100 microlayers. In one aspect, the average thickness of each independent microlayer of the plurality is from about 0.01 micron to about 2.5 microns, optionally from about 0.01 micron to about 1 micron, or from about 0.05 microns to about 1 micron. In another aspect, the average thickness of each of the one or more layers comprising the plurality of alternating layers is from about 100 microns to about 0.5 centimeters, or from about 100 microns to about 0.1 centimeters.

In one aspect, at least one of the three or more layers of the series comprises the plurality of alternating layers, wherein each of the series of alternating layers individually comprises a first alternating layer material or a second alternating layer material, optionally wherein the plurality of alternating layers comprise from about 3 to about 50 individual layers, or from about 3 to about 25 individual layers, or from about 3 to about 7 individual layers, and optionally wherein the plurality of alternating layers form at least one of the one or more core layers of the layered structure. In an aspect, the plurality of alternating layers can be microlayers as described herein.

In an aspect, the first alternating layer material can be a thermoplastic material, optionally a thermoplastic elastomeric material as disclosed herein. In another aspect, the first alternating layer material can be a solid material, optionally a solid thermoplastic material, optionally a solid thermoplastic elastomeric material as disclosed herein. In an alternative aspect, the thermoplastic material can optionally be a barrier material, and optionally the barrier material is a barrier material as described elsewhere herein.

In another aspect, the second alternating layer can be a thermoplastic material, optionally an additional material, optionally wherein the additional material is a barrier material as disclosed herein.

In some aspects, the article can be configured as a series of layers comprising at least one layer of the foamable material in contact with the second material. In some aspects, the article is a sheet comprising a plurality of layers or a plurality of alternating layers including at least one layer of the foamable material and at least one layer of the second material.

In one aspect, the article comprises a plurality of microlayers. In one aspect, the plurality of microlayers comprises from about 5 to about 1000 microlayers, optionally about 10 to about 1000 microlayers, from about 30 to about 500 microlayers, from about 50 to about 200 microlayers, or from about 20 to about 100 microlayers. In one aspect, the average thickness of each independent microlayer of the plurality is from about 0.01 micron to about 2.5 microns, optionally from about 0.01 micron to about 1 micron, or from about 0.05 microns to about 1 micron. In another aspect, the average thickness of each of the one or more layers comprising the plurality of alternating layers is from about 100 microns to about 0.5 centimeters, or from about 100 microns to about 0.1 centimeters.

In another aspect, the average thickness of the core layer is from about 100 microns to about 0.5 centimeters, optionally from about 100 microns to about 0.1 centimeter.

In one aspect, thermoplastic barrier films and/or sheets can be flexed due to their inherent thinness but may not have sufficient elasticity for some applications. Further in this aspect, an alternating plurality of first microlayers and second microlayers having different compositions (e.g., thermoplastic elastomeric layers and thermoplastic barrier films and/or sheets) can provide the mix of properties (e.g., elasticity, flexibility, low gas transmission rate, and recovery of original shape after removal of a deforming force) required for applications in fields such as footwear, athletic apparel, and sporting goods.

Foamable Articles Comprising Textiles

In one aspect, the article comprises or is a textile. In some aspects, when the article comprises a sheet, the textile can form a layer of the sheet. In one aspect, the textile can form an inner layer of the sheet. In another aspect, the textile can form an outer layer of the sheet.

In one aspect, the textile can be a spacer textile having a first textile face, a second textile face, and a textile thickness extending from the first textile face to the second textile face, wherein the textile thickness is from about 0.3 centimeters to about 3 centimeters, or from about 0.5 centimeters to about 1 centimeter, optionally wherein a fiber density of the first textile face and the second textile face is at least 25 percent greater, at least 50 percent greater, or at least 75 percent greater than a fiber density between the first textile face and the second textile face.

In another aspect, the textile can be constructed from fibers or yarns, wherein the fibers or yarns of the textile comprise or consist essentially of synthetic fibers or yarns formed from one or more thermoplastic materials, optionally wherein the thermoplastic materials of the synthetic fibers or yarns comprise or consist essentially of a thermoplastic elastomeric material. In another aspect, the melting temperature of the thermoplastic material of the synthetic fibers or yarns is within 20 degrees Celsius of a melting temperature of a thermoplastic material forming an outer layer of the article.

In one aspect, the article comprises a layered sheet, and a polymeric component of the thermoplastic material of the synthetic fibers or yarns is substantially the same as a polymeric component of a thermoplastic material of one or more layers of the layered sheet, and optionally the polymeric component of the thermoplastic material of the synthetic fibers or yarns is substantially the same as a polymeric component of a thermoplastic material of a cap layer or of a structural layer of the layered sheet.

In one aspect, the thermoplastic material of the synthetic fibers or yarns is a solid foamable material, and optionally the solid foamable material can be a recycled material. In an alternative aspect, the thermoplastic material of the synthetic fibers or yarns can be a foamed material, optionally wherein the foamed material comprises or consists essentially of a recycled material.

In another aspect, the article can comprise or is a sheet. In another aspect, the sheet can be from about 300 micrometers thick to about 1 centimeter thick, optionally from about 500 micrometers thick to about 1 centimeter thick, or from about 500 micrometers to about 750 micrometers thick.

Sealed Bladders and Cavities

In one aspect, disclosed herein are foamed articles made by the methods disclosed herein. In one aspect, the foamed article comprises a first sheet and a second sheet and a second side of the first sheet faces a second side of the second sheet, and the first sheet and the second sheet are bonded together to form an internal cavity in a space between the second side of the first sheet and the second side of the second sheet, wherein the bond extends around at least a portion of a perimeter of the internal cavity, optionally wherein the bond is contiguous around only one or more portions of the perimeter of the internal cavity, and includes one or more apertures capable of admitting a fluid to the internal cavity, forming an open cavity, or wherein the bond is contiguous around an entire perimeter of the internal cavity, forming a sealed bladder capable of retaining a fluid in the internal cavity at a pressure above or below atmospheric pressure. In another aspect, a first side of the first sheet and/or a first side of the second sheet can be an outermost surface of the foamed articles.

In some aspects, the article comprises one or more internal cavities, optionally at least two internal cavities, wherein each one of the one or more internal cavities is an open cavity, or each one of the one or more internal cavities is a sealed bladder, or the one or more internal cavities include at least one open cavity and at least one sealed bladder.

In another aspect, the first sheet and the second sheet are adhesively bonded or are thermally bonded, optionally wherein the first sheet and the second sheet include a thermal bond formed by radio frequency (RF) welding.

In an aspect, the article includes one or more sealed bladders, and at least one layer of the first sheet or of the second sheet comprises the foamed material, optionally wherein the first sheet and the second sheet include one or more barrier layers comprising or consisting essentially of a barrier material, and a depth of the at least one layer comprising the foamed material is less than a depth of the one or more barrier layers, wherein the depth is determined from an exterior surface of the sheet.

In another aspect, the second side of the first sheet and second side of the second sheet comprise or consist essentially of solid material, and optionally one or more layers of the first sheet or the second sheet comprise or consist essentially of the foamed material, optionally wherein the one or more layers comprising or consisting essentially of the foamed material are positioned in the first sheet and in the second sheet at depths less than the depths of the one or more barrier layers.

In one aspect, the foamed article includes one or more open cavities. In another aspect, one or more additional layers of the first sheet or the second sheet both comprise or consist essentially of the foamed material. In still another aspect, the internal cavity can be a sealed bladder, and optionally the sealed bladder comprises fluid that can optionally be a pressurized fluid. In one aspect, the fluid can be nitrogen gas or air. In still another aspect, the sealed bladder can have an initial internal pressure of from about 20 pounds per square inch (137.9 kilopascals) to about 22 pounds per square inch (151.7 kilopascals) upon inflation, optionally of about 21 pounds per square inch (144.8 kilopascals) to about 22 pounds per square inch (151.7 kilopascals). In one aspect, after 2 years of use, the sealed bladder can have an internal pressure of at least 70 percent to about 80 percent of the initial internal pressure, optionally about 70 percent to about 75 percent or of about 75 to about 80 percent of the initial internal pressure.

In one aspect, the component, optionally wherein the component is a sealed bladder, can have a nitrogen gas transmission rate of less than about 10 cubic centimeters per square meter per atmosphere per day (about 0.099 cubic centimeters per square meter per kilopascal per day), optionally less than about 5 cubic centimeters per square meter per atmosphere per day (about 0.049 cubic centimeters per square meter per kilopascal per day), less than about 3 cubic centimeters per square meter per atmosphere per day (about 0.030 cubic centimeters per square meter per kilopascal per day), or less than about 2 cubic centimeters per square meter per atmosphere per day (about 0.020 cubic centimeters per square meter per kilopascal per day).

In one aspect, disclosed herein is a component, wherein the component is an open cavity or a sealed bladder as disclosed herein. In another aspect, the component is a sealed bladder and has a nitrogen gas transmission rate of less than about 10 cubic centimeters per square meter per atmosphere per day, optionally less than about 3 cubic centimeters per square meter per atmosphere per day, or less than about 2 cubic centimeters per square meter per atmosphere per day.

In another aspect, the sealed bladder or component can be a cushioning element for an article of apparel, footwear, or sporting equipment. In one aspect, the cushioning element can be a cushioning element for an article of footwear, optionally wherein the cushioning element is a midsole or a component of a midsole for an article of footwear.

In some aspects, the foamed article can be a thermoformed foamed article. In another aspect, the foamed article can be a sheet, optionally wherein the sheet is a layered sheet comprising one or more foamed layers, optionally wherein the layered sheet comprises at least one unfoamed cap layer, optionally wherein the layered sheet comprises one or more foamed inner layers and two unfoamed cap layers. In some aspects, the sheet can be from about 300 micrometers thick to about 1 centimeter thick, optionally from about 500 micrometers thick to about 1 centimeter thick, or from about 500 micrometers thick to about 750 micrometers thick.

In any of these aspects, the foamed article can be a component of an article of apparel, footwear, or sporting equipment.

In conventional manufacturing for sized articles such as articles of footwear, different equipment is required for thermoforming or otherwise shaping components for different shoe sizes. In one aspect, since the foamed articles disclosed herein can be thermoformed prior to foaming and retain their initial geometries and topographies after foaming, less equipment must be purchased and maintained to produce foamed components for a range of footwear sizes. In a further aspect, fewer foamable components must be kept in stock, since a single size of existing stock can be foamed under controlled conditions to produce foamed articles of desired sizes in response to consumer demand.

In an aspect, the article comprises an initial geometry or topography prior to foaming, and wherein the foamed article substantially retains the initial geometry or topography but has at least a portion of the foamed article expanded in one or more of width, length, and height, as compared to the article prior to the step of placing. In a further aspect, because the polymeric material expands in all dimensions, less polymeric material is required to make the same size of foamed article, resulting in a lighter component and using a lower amount of thermoplastic elastomeric material.

Also disclosed herein are articles of apparel, articles of footwear, and articles of sporting equipment comprising the bladders disclosed herein.

Properties of the Foamed Materials and Foamed Articles

In one aspect, in the foamed article, the foamed material has a density of from about 0.01 gram per cubic centimeter to about 3.0 grams per cubic centimeter, optionally of from about 0.01 gram per cubic centimeter to about 0.1 gram per cubic centimeter, from about 0.01 gram per cubic centimeter to about 0.05 grams per cubic centimeter, from about 0.01 gram per cubic centimeter to about 0.025 grams per cubic centimeter, from about 0.05 grams per cubic centimeter to about 0.1 gram per cubic centimeter, from about 0.1 gram per cubic centimeter to about 3.0 grams per cubic centimeter, from about 0.2 grams per cubic centimeter to about 2.0 grams per cubic centimeter, from about 0.3 grams per cubic centimeter to about 1.5 grams per cubic centimeter, from about 0.3 grams per cubic centimeter to about 1.2 grams per cubic centimeter, or from about 0.4 grams per cubic centimeter to about 1.0 grams per cubic centimeter.

In one aspect, following foaming, the foamed article is substantially opaque. In a further aspect, opacity of the foamed article eliminates the need for adding pigments to the thermoplastic elastomeric material in order to make it white.

In one aspect, the foamed material, the foamed article, or both, have a split-tear value of from about 2.5 kilograms per centimeter to about 3.0 kilograms per centimeter, optionally of about 2.5 kilograms per centimeter to about 2.7 kilograms per centimeter, about 2.5 kilograms per centimeter to about 2.6 kilograms per centimeter, about 2.7 kilograms per centimeter to about 3.0 kilograms per centimeter, or about 2.8 kilograms per centimeter to about 3.0 kilograms per centimeter, as measured using the Split-Tear Test Protocol.

Method of Manufacturing an Article Comprising a Foamed Article

In one aspect, disclosed herein is a method for manufacturing an article, the method comprising affixing a first component to a second component, wherein the first component is a foamed article made by the method disclosed herein. In some aspects, the first component can be a first component of an article of apparel, the second component can be a component of an article of apparel, and the article to be manufactured is an article of apparel.

In other aspects, the first component can be a first component of an article of footwear, the second component can be a second component of an article of footwear, and the article to be manufactured is an article of footwear. Further in these aspects, the first component can be a cushioning element and the second component can be a sole component or an upper component.

In still other aspects, the first component can be a first component of an article of sporting equipment, the second component can be a component of an article of sporting equipment, and the article to be manufactured is an article of sporting equipment.

Foamable Material

The solid foamable material of the articles as described herein is a thermoplastic elastomeric material, meaning that the material is a polymeric material having thermoplastic properties as well as elastomeric properties. The solid foamable material is a polymeric material comprising or consisting essentially of one or more first thermoplastic elastomers. In some aspects, the solid foamable material comprises one or more additional thermoplastic polymers, where the one or more additional thermoplastic polymers may be thermoplastic elastomers, or may be thermoplastic but not elastomeric. In some aspects, the solid foamable material comprises additional non-polymeric ingredients. In many of the disclosed foamed articles described herein, the foamed material is a thermoplastic elastomeric material, meaning that, following the expanding, the foamed material retains thermoplastic and elastomeric properties.

In any of the disclosed aspects, the foamable material can be described as comprises a polymeric component, wherein the polymeric component includes all of the polymers present in the foamable material. In this regard, the polymeric component can consist essentially of one or more first thermoplastic elastomers, meaning that, in such an aspect, essentially all the polymers present in the foamable material are thermoplastic elastomers. In one aspect, the one or more first thermoplastic elastomers of the foamable material comprise one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyether homopolymers or copolymers, one or more thermoplastic elastomeric polycarbonate homopolymers or copolymers, one or more thermoplastic elastomeric polyacrylate homopolymers or copolymers, one or more thermoplastic elastomeric polyurethane homopolymers or copolymers, one or more thermoplastic elastomeric styrenic homopolymers or copolymers, or any combination thereof. Similarly, the polymeric component of the foamable material can consist essentially of one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyether homopolymers or copolymers, one or more thermoplastic elastomeric polycarbonate homopolymers or copolymers, one or more thermoplastic elastomeric polyacrylate homopolymers or copolymers, one or more thermoplastic elastomeric polyurethane homopolymers or copolymers, one or more thermoplastic elastomeric styrenic homopolymers or copolymers, or any combination thereof.

In one aspect, the one or more first thermoplastic elastomers of the foamable material comprise one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyurethane homopolymers or copolymers, one or more thermoplastic elastomeric styrenic homopolymers or copolymers, or any combination thereof. Similarly, the polymeric component of the foamable material can consist essentially of one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyurethane homopolymers or copolymers, one or more thermoplastic elastomeric styrenic homopolymers or copolymers, or any combination thereof.

In one aspect, thermoplastic materials, including thermoplastic elastomeric materials, are advantageous for use in articles described herein, since thermoplastic materials can be reclaimed and reformed into new articles, thus reducing waste and promoting recycling. In another aspect, both foamed and unfoamed thermoplastic materials can be recycled for use in the articles and methods described herein.

In one aspect, when the one or more first thermoplastic elastomers comprises or consists essentially of one or more thermoplastic elastomeric polyolefin homopolymers or copolymers, the one or more first thermoplastic elastomers comprise or consist essentially of thermoplastic elastomeric polypropylene homopolymers or copolymers; thermoplastic polyethylene homopolymers or copolymers, including thermoplastic elastomeric ethylene-vinyl acetate copolymers; thermoplastic elastomeric polybutylene homopolymers or copolymers; or any combination thereof. The polymeric component of the foamable material can consist essentially of one or more thermoplastic elastomeric polyolefin homopolymers or copolymers.

In one aspect, the one or more thermoplastic elastomeric polyolefin homopolymers or copolymers can comprise or consist essentially of one or more thermoplastic elastomeric ethylene-vinyl acetate copolymers. The polymeric component of the foamable material can consist essentially of one or more thermoplastic elastomeric ethylene-vinyl acetate copolymers. Further in this aspect, the thermoplastic ethylene-vinyl acetate copolymer can include from about 25 weight percent to about 50 weight percent vinyl acetate content, optionally from about 25 weight percent to about 40 weight percent vinyl acetate content, from about 25 weight percent to about 30 weight percent vinyl acetate content, or from about 35 weight percent to about 50 weight percent vinyl acetate content.

In another aspect, the foamable material can comprise one or more thermoplastic ethylene-vinyl alcohol copolymer. The polymeric component of the foamable material can comprise one or more thermoplastic ethylene-vinyl alcohol copolymers. Further in this aspect, the thermoplastic ethylene-vinyl alcohol copolymer can include from about 25 weight percent to about 50 weight percent vinyl alcohol content, optionally from about 25 weight percent to about 40 weight percent vinyl alcohol content, from about 25 weight percent to about 30 weight percent vinyl alcohol content, or from about 35 weight percent to about 50 weight percent vinyl alcohol content.

In another aspect, the one or more first thermoplastic elastomers of the foamable material comprises or consists essentially of one or more thermoplastic elastomeric polyamide homopolymers or copolymers. The polymeric component of the foamable material can consist essentially of the one or more thermoplastic elastomeric polyamide homopolymers or copolymers. The one or more thermoplastic elastomeric polyamide homopolymers or copolymers can comprise or consist essentially of thermoplastic elastomeric polyether block polyamide (PEBA) copolymer elastomers.

The one or more first thermoplastic elastomers can comprise or consist essentially of one or more thermoplastic elastomeric polyester homopolymers or copolymers. The polymeric component of the foamable material can consist essentially of the one or more thermoplastic elastomeric polyester homopolymers or copolymers. The thermoplastic elastomeric polyester homopolymer can include or consist essentially of one or more polyester terephthalate. The thermoplastic elastomeric polyester homopolymer or copolymer can include or consist essentially of one or more thermoplastic elastomeric copolyesters.

The one or more first thermoplastic elastomers can comprise or consist essentially of one or more thermoplastic elastomeric polyether homopolymers or copolymers. The polymeric component of the foamable material can consist essentially of the one or more thermoplastic elastomeric polyether homopolymers or copolymers.

The one or more first thermoplastic elastomers can comprise or consist essentially of one or more thermoplastic elastomeric polyether homopolymers or copolymers. The polymeric component of the foamable material can consist essentially of the one or more thermoplastic elastomeric polyether homopolymers or copolymers.

The one or more first thermoplastic elastomers can comprise or consist essentially of one or more thermoplastic elastomeric polycarbonate homopolymers or copolymers. The polymeric component of the foamable material can consist essentially of the one or more thermoplastic elastomeric polycarbonate homopolymers or copolymers.

The one or more first thermoplastic elastomers can comprise or consist essentially of one or more thermoplastic elastomeric polyacrylate homopolymers or copolymers, including polyacrylic acids, polymethacrylates, and the like. The polymeric component of the foamable material can consist essentially of the one or more thermoplastic elastomeric polyacrylate homopolymers or copolymers.

Thermoplastic elastomeric polyurethane homopolymers and copolymers have been found to be particularly useful in the methods and articles described herein. In an aspect, the one or more first thermoplastic elastomers comprise or consist of one or more thermoplastic elastomeric polyurethane homopolymers or copolymers, where a thermoplastic polyurethane homopolymer is understood to mean a polymer chain including only urethane segments, and a polyurethane copolymer is understood to mean a polymer chain including urethane segments as well as other types of segments, such as ester segments or ether segments or the like and combinations thereof. When the one or more first thermoplastic elastomers comprise one or more thermoplastic elastomeric polyurethane homopolymers or copolymers, the one or more thermoplastic elastomers can comprise or consist essentially of thermoplastic elastomeric polyester-polyurethane copolymers, thermoplastic elastomeric polyether-polyurethane copolymers, thermoplastic elastomeric polycarbonate-polyurethane copolymers, or combinations thereof. In some aspects, the one or more first thermoplastic elastomers of the foamable material comprises or consists essentially of one or more thermoplastic elastomeric polyester-polyurethane copolymers, optionally wherein the polymeric component of the foamable material consists of the one or more thermoplastic elastomeric polyester-polyurethane copolymers.

Thermoplastic polyurethanes can be produced via reaction of diisocyanates with difunctional compounds that are reactive toward isocyanates. In general, the difunctional compounds have two hydroxyl groups (diols) and can have a molar mass of from 62 Daltons (the molar mass of ethylene glycol) to about 10,000 Daltons, or from about 100 Daltons to about 5000 Daltons, or from about 500 Daltons to about 5000 Daltons, or from about 500 Daltons to about 2500 Daltons, or from about 2500 Daltons to about 10,000 Daltons, or from about 5000 Daltons to about 10,000 Daltons, or from about 5000 Daltons to about 7500 Daltons, or from about 7500 Daltons to about 10,000 Daltons although difunctional compounds having other isocyanate-reactive groups (e.g., secondary amines) can be used, generally in minor amounts, and a limited molar fraction of tri-functional and mono-functional isocyanate-reactive compounds can be used. In one example, the polyurethane is linear. Including difunctional compounds with molar masses of about 400 Daltons or greater introduces soft segments into the polyurethane. An increased ratio of soft segments to hard segments in the polyurethane can cause the polyurethane to become increasingly more flexible and eventually elastomeric. In one example, the one or more thermoplastic elastomeric materials include a thermoplastic polyurethane elastomer or a combination of thermoplastic polyurethane elastomers.

Suitable thermoplastic polyurethane elastomers include thermoplastic polyester-polyurethanes, polyether-polyurethanes, and polycarbonate-polyurethanes. Nonlimiting examples of these include polyurethanes polymerized using as diol reactants, polyesters diols prepared from diols and dicarboxylic acids or anhydrides, polylactone polyesters diols (for example polycaprolactone diols), polyester diols prepared from hydroxy acids that are monocarboxylic acids containing one hydroxyl group, polytetrahydrofuran diols, polyether diols prepared from alkylene oxides or combinations of alkylene oxides, and polycarbonate diols such as polyhexamethylene carbonate diol and poly(hexamethylene-co-pentamethylene) carbonate diols. The thermoplastic polyurethane elastomers can be prepared by reaction of one of these polymeric diols (polyester diol, polyether diol, polylactone diol, polytetrahydrofuran diol, or polycarbonate diol), one or more polyisocyanates, and optionally, one or more monomeric chain extension compounds. Chain extension compounds are compounds having two or more functional groups, for example two functional groups, reactive with isocyanate groups. In one example, the thermoplastic polyurethane elastomer(s) is substantially linear (i.e., all or substantially all of the reactants are di-functional).

In still another aspect, the one or more first thermoplastic elastomers comprise or consist essentially of one or more thermoplastic elastomeric styrene homopolymers or copolymers. The polymeric component of the foamable material can consist essentially of one or more thermoplastic elastomeric styrene homopolymers or copolymers. The one or more thermoplastic elastomeric styrenic homopolymers or copolymers can comprise or consist essentially of one or more styrene butadiene styrene (SBS) block copolymer elastomers, one or more styrene ethylene butylene styrene (SEBS) copolymer elastomers, one or more styrene acrylonitrile (SAN) copolymer elastomers, or any combination thereof.

In any of these aspects, the one or more first thermoplastic elastomers comprises or consists essentially of one or more recycled first thermoplastic elastomers. Similarly, the polymeric component of the foamable material can comprise or consist essentially of recycled thermoplastic polymers. In one aspect, the polymeric component of the foamable material comprises or consists essentially of one or more recycled thermoplastic elastomeric polymers. In another aspect, the polymeric component of the foamable material comprises one or more recycled thermoplastic polymers. In yet another aspect, the polymeric component of the foamable material comprises or consists essentially of one or more recycled thermoplastic elastomeric polymers, and one or more thermoplastic non-elastomeric polymers. In yet another aspect, the polymeric component of the foam consists essentially of one or more thermoplastic elastomeric polyurethanes, and one or more thermoplastic polyolefins.

In one aspect, the foamable material comprises a mixture of the polymeric component and a non-polymeric component consisting of one or more non-polymeric additives, optionally wherein the foamable material comprises from about 0.005 percent by weight to about 20 percent by weight of the non-polymeric component based on a total weight of the foamable material, optionally about 0.5 percent by weight to about 10 percent by weight, about 1 percent by weight to about 5 percent by weight, or about 1 percent by weight to about 2 percent by weight of the non-polymeric additive based on a total weight of the foamable material.

Other materials that can be used to form part of the composition of the foamable material include, without limitation, colorants including pigments and dyes; fillers such as clays, including nanoclays and halloysite clays; nanotubes, nucleating agents, emulsifiers, release agents including surfactant-based release agents, antioxidants, stabilizers, crosslinkers, and/or the like.

The foamable material can be a relatively soft material. In some examples, the foamable material has a Shore A hardness of from about 35 A to about 95 A. In other examples, the foamable material has a Shore A hardness of from about 70 A to about 95 A, optionally about 35 A to about 70 A, about 50 A to about 70 A, or about 55 A to about 90 A, as measured using the Shore A Hardness Test Protocol.

In any of these aspects, the foamable material does not melt and/or is not molten during the performance of the maintaining and holding step or the subjecting and expanding step of the methods disclosed herein. In accordance with the present disclosure, carbon dioxide is used to infuse at least a portion of the solid foamable material of the article, and the solid foamable material remains as a solid during the infusing. The infused solid foamable material of the article remains in the solid state up until the point that it is expanded by the infused carbon dioxide phase transitioning to a gas, imparting a multi-cellular structure to the foamed material without the foamable material being melted or in a molten state during the expanding. While it is possible to conduct additional processing steps on the foamed article which may melt a portion or a region of the solid foamable material or the foamed material, it is to be understood that any steps involving melting the solid foamable material or melting the foamed material are conducted either before the maintaining an holding step, or after the subjecting and expanding step. In some aspects, the foamed material of the foamed articles is a physically expanded solid material formed without melting the solid material. The avoidance of melting the thermoplastic elastomeric material during the foaming process reduces the "thermal history" of the thermoplastic elastomeric material, i.e., the number of heating and cooling cycles to which the thermoplastic elastomeric material is exposed, which reduces or prevents thermal degradation of the thermoplastic elastomeric material.

Blends. In one aspect, the foamable material can comprise or consist essentially of a blend of the one or more first thermoplastic elastomers and a second material. In some aspects, the second material comprises or consists essentially of one or more second polymers, optionally wherein the one or more second polymers comprise or consist essentially of one or more second thermoplastics. In such aspects, the polymeric component of the foamable material comprises or consists essentially of the one or more first thermoplastic elastomers, and the one or more second thermoplastics.

In another aspect, the one or more second thermoplastics can comprise or consist essentially of one or more thermoplastic polyolefin homopolymers or copolymers, one or more thermoplastic polyamide homopolymers or copolymers, one or more thermoplastic polyester homopolymers or copolymers, one or more thermoplastic polyether homopolymers or copolymers, one or more thermoplastic polycarbonate homopolymers or copolymers, one or more thermoplastic polyacrylate homopolymers or copolymers, one or more thermoplastic polyurethane homopolymers or copolymers, one or more thermoplastic styrenic homopolymers or copolymers, or any combination thereof. In some aspects, the one or more second thermoplastic polyolefin homopolymers or copolymers comprise or consist essentially of thermoplastic polypropylene homopolymers or copolymers, thermoplastic polyethylene homopolymers or copolymers, thermoplastic polybutylene homopolymers or copolymers, or any combination thereof. In one aspect, the one or more second thermoplastics comprise or consist essentially of one or more thermoplastic polyethylene copolymers, including one or more thermoplastic ethylene-vinyl alcohol copolymers or one or more thermoplastic ethylene-vinyl acetate copolymers. In one aspect, the polymeric component of the foamable material consists essentially of a blend of the one or more first thermoplastic elastomers and the one or more second thermoplastics, optionally wherein the blend foams during the steps of subjecting and expanding. In such an aspect, the one or more second thermoplastics can include one or more thermoplastic polyolefin homopolymers or copolymers. In another aspect, the polymeric component of the foamable material consists essentially of a blend of the one or more first thermoplastic elastomeric polyurethane homopolymers or copolymers and one or more second thermoplastic ethylene-vinyl alcohol copolymers. Further in this aspect, the polymeric component can consist essentially of one or more first thermoplastic elastomeric polyester-polyurethane homopolymers or copolymers and one or more second thermoplastic ethylene-vinyl alcohol copolymers.

In one aspect, the blend can comprise one or more recycled first thermoplastic elastomers, one or more recycled second thermoplastics, or both. The one or more recycled first thermoplastic elastomers can include one or more recycled thermoplastic elastomeric polyurethane copolymers, such as one or more recycled thermoplastic elastomeric polyurethane-polyester copolymer, or one or recycled thermoplastic elastomeric polyurethane-polyether copolymer. The one or more recycled second thermoplastics can include one or more recycled thermoplastic polyolefin, such as one or more recycled polyethylene copolymer.

Recycled materials. In one aspect, the recycled materials useful in the methods disclosed herein can comprise foamable material that is an unfoamed material (i.e., the foamable material has not previously been foamed). For example, the recycled material can be obtained by recycling (e.g., by regrinding or another method) foamable material that has not been foamed, such as scrap or waste material. In another aspect, the recycled foamable material can be obtained by recycling articles comprising the foamable material before the articles have been foamed (e.g., by recycling defective articles that have been rejected prior to foaming).

In one aspect, the blend comprises a phase-separated blend of the one or more first thermoplastic elastomers and the one or more second thermoplastics. In some aspects, the phase-separated blend includes one or more phase-separated regions including interfaces between the one or more first thermoplastic elastomers and the one or more second thermoplastics. Without wishing to be bound by theory, the one or more first thermoplastic elastomers and the one or more second thermoplastics can phase separate, or when the one or more first thermoplastic elastomers comprise at least one copolymer having hard and soft segments, the hard and/or soft segments may have affinity for the second thermoplastic; thus, in some aspects, the phase-separated blend can include some polymeric entanglements in addition to interfaces between portions of the one or more first thermoplastic elastomers and the one or more second thermoplastics. During the step of subjecting and expanding, the presence of one or more interfaces, such as an interface between phase-separated regions, or between different polymeric materials within the article, can act as nucleating site for forming gas bubbles, and so the presence of such nucleating sites in the article can increase the uniformity of the cell structures in the foamed material.

The blend can comprise at least 50 weight percent of the one or more first thermoplastic elastomers, and less than 50 weight percent of the one or more second thermoplastics based on a total weight of the blend. The blend can comprise at least 70 weight percent of the one or more first thermoplastic elastomers, and less than 30 weight percent of the one or more second thermoplastics based on a total weight of the blend. The blend can comprise at least 80 weight percent of the one or more first thermoplastic elastomers and less than 20 weight percent of the one or more second thermoplastics based on a total weight of the blend. In an exemplary aspect, the blend comprises about 95 percent by weight of the one or more first thermoplastic elastomers and about 5 percent by weight of the one or more second thermoplastics based on a total weight of the blend.

In some aspects, the solubility of carbon dioxide can vary in the different polymeric materials making up the foamable material, such as when the foamable material is a blend of a first thermoplastic elastomeric material with a second, non-elastomeric thermoplastic material, or a blend of reground and virgin materials, as the reground and virgin materials have different thermal histories. In some aspects, the solubility of the carbon dioxide is greater in the one or more thermoplastic elastomers than in the one or more non-elastomeric thermoplastics. In one aspect, the carbon dioxide is soluble in the one or more first thermoplastic elastomers at a concentration of from about 1 weight percent to about 30 weight percent, optionally from about 5 weight percent to about 20 weight percent, from about 5 weight percent to about 10 weight percent, or from about 10 weight percent to about 20 weight percent, based on a total weight of the one or more first thermoplastic elastomers present in the foamable material. In another aspect, the carbon dioxide is soluble in the one or more second thermoplastics at a concentration of less than 1 weight percent, optionally less than 0.5 weight percent, less than 0.25 weight percent, or less than 0.1 weight percent, based on a total weight of the one or more second thermoplastic present in the foamable material. In some aspects, the carbon dioxide is substantially insoluble in the one or more second thermoplastics. The solubility of carbon dioxide in the one or more first thermoplastic elastomers and the one or more second thermoplastics can be determined gravimetrically be infusing carbon dioxide into separate samples of the first thermoplastic elastomers and the second thermoplastics at the first temperature.

Foamed Material

In an aspect, disclosed herein is a foamed material. In one aspect, the foamed material can be the product of expanding any of the foamable materials described above. In another aspect, the foamed material can be a thermoplastic material. In still another aspect, the foamed material can be partially or fully crosslinked. In one aspect, when the foamed material is crosslinked, the crosslinking may fully or partially crosslink the foamed material. In some aspects, when the foamed material is partially crosslinked, it may retain some thermoplastic characteristics so that the foam can thermally soften. In an alternative aspect, the foamed material may be crosslinked to the point that it becomes a thermoset foamed material.

In one aspect, the foamed material can be crosslinked during or following the steps of subjecting and expanding. In another aspect, the crosslinking can be actinically initiated. In one exemplary aspect, the crosslinking can be initiated using thermal radiation, light (e.g., UV radiation), an electron beam, or any combination thereof.

In some aspects, the foamable material further comprises a crosslinking agent such as, for example, a thermally-initiated crosslinking agent or a light-initiated crosslinking agent.

In one aspect, the foamed material has a Shore A hardness of from about 35 A to about 95 A. In other examples, the foamed material has a Shore A hardness of from about 70 A to about 95 A, optionally about 35 A to about 70 A, about 50 A to about 70 A, or about 55 A to about 90 A, as measured using the Shore A Hardness Test Protocol.

In another aspect, the foamed material can have an Asker C hardness of from about 10 to about 50, optionally of about 15 to about 5-, about 15 to about 45, about 20 to about 45, or about 20 to about 40, as measured using the Asker C Hardness Test Protocol.

In some aspects, the article, prior to foaming, can be optically clear and colorless). After foaming, the article can be opaque, depending upon the placement and thickness of the foamed material.

Additional Material

In one aspect, the article comprises an additional material i.e., another material in addition to the solid foamable material. Optionally, the additional material can be an additional thermoplastic material, optionally an additional thermoplastic elastomeric material, optionally wherein the additional thermoplastic elastomeric material is an additional (i.e., second) foamable material. In another aspect, the additional material can be an additional foamable material and, during the expanding step, the additional foamable material expands into an additional foamed material. In a further aspect, in the foamed article, a density of the first foamed material differs from a density of the additional foamed material by at least 5 percent, optionally at least 10 percent, or at least 20 percent.

In one aspect, the article comprises an additional material, wherein the additional material is a separate material from the foamable material. In one aspect, the additional material and the foamable material can be bonded to one another or can interface with one another. In another aspect, the additional material and the foamable material may can have some polymer chains that intermingle at the interface (for example, if the foamable material and additional material are heat-bonded). In another aspect, the additional material comprises or consists essentially of one or more polymers and includes an additional material polymeric component consisting of all the polymers present in the additional material. In an optional aspect, the additional material comprises or consists essentially of a second material, optionally wherein the second material is a thermoplastic material. Still further in this aspect, the additional material can optionally comprise the additional material polymeric component mixed with an additional material non-polymeric component consisting of all non-polymeric components present in the additional material.

In some aspects, the article comprises one or more first portions of the foamable material, and one or more second portions of the additional material, wherein the one or more first portions are distinct from the one or more second portions.

In one aspect, the additional material is separate from the foamable material and/or is not a component of the foamable material. Further in this aspect, the additional material can be present in the article as a distinct element that is separate from the foamable material but which may be in contact with at least a portion of the foamable material. In other aspects, the additional material can be a component of the foamable material, e.g., as part of a blend further comprising the first material.

In one aspect, the additional material comprises a barrier material comprising one or more barrier materials, the barrier material comprising a barrier polymeric component consisting of all polymers present in the barrier material. In some aspects, during the expanding step, the additional material remains substantially unfoamed.

In some aspects, the additional material can be a recycled material comprising one or more recycled polymers, optionally wherein the one or more recycled polymers comprise one or more recycled thermoplastics, optionally wherein the one or more recycled thermoplastic comprise one or more recycled thermoplastic elastomers, optionally wherein the recycled material comprises a recycled material polymeric component consisting of one or more recycled thermoplastics, optionally wherein the recycled material polymeric component consists of one or more recycled thermoplastic elastomers. In some aspects, the recycled material comprises one or more recycled first thermoplastic elastomers. Optionally, in another aspect, the one or more recycled first thermoplastic elastomers comprise one or more reground first thermoplastic elastomers. Optionally, further in this aspect, the one or more recycled or reground first thermoplastic elastomers include a thermoplastic elastomer as described herein.

In another aspect, the recycled material further comprises one or more recycled second thermoplastics. Optionally, in an aspect, the one or more recycled second thermoplastics comprise one or more reground second thermoplastics. Optionally, further in this aspect, the one or more recycled or reground second thermoplastics includes a thermoplastic according to any one of the preceding aspects. In some aspects, the recycled material comprises one or more recycled or reground thermoplastic polyurethane elastomers or one or more recycled thermoplastic ethylene-vinyl alcohol copolymers or both.

In one aspect, the recycled material can comprise a blend of the one or more recycled or reground thermoplastic elastomers and one or more second thermoplastics, or can comprise a blend of one or more thermoplastic elastomers and one or more recycled thermoplastics, or one or more recycled second thermoplastics. Optionally, in one aspect, the blend can be a phase-separated blend, optionally wherein the phase separated blend comprises one or more interfaces between the one or more first thermoplastic elastomers and the one or more second thermoplastics.

In another aspect, the recycled material can comprise from about 99 percent to about 90 percent by weight of the one or more first thermoplastic elastomers and from about 1 percent to about 10 percent by weight of the second thermoplastics, based on a total weight of the recycled material, optionally from about 99 percent to about 93 percent by weight of the one or more first thermoplastic elastomers and from about 1 percent to about 7 percent by weight of the one or more second thermoplastics, or about 90 percent to about 95 percent by weight of the one or more first thermoplastic elastomers and from about 1 percent to about 5 percent by weight of the one or more second thermoplastic elastomers.

In some aspects, the recycled material comprises about 99 percent to about 50 percent by weight of recycled or reground polymers based on a total weight of recycled material, optionally from about 99 percent to about 75 percent by weight of recycled or reground polymers.

In any of these aspects, the carbon dioxide is soluble in the recycled material at a concentration of from about 1 weight percent to about 30 weight percent based on a total weight of the recycled material, optionally from about 5 weight percent to about 20 weight percent. In another aspect, the carbon dioxide is soluble in the one or more recycled or reground thermoplastic elastomers at a concentration of from about 1 weight percent to about 30 weight percent based on a total weight of the one or more recycled or reground thermoplastic elastomers, optionally from about 5 weight percent to about 20 weight percent. In still another aspect, the carbon dioxide can be soluble in the one or more recycled or reground second thermoplastics at less than 1 weight percent, optionally less than 0.5 weight percent, less than 0.25 weight percent, or less than 0.1 weight percent, based on a based on a total weight of the one or more recycled or reground second thermoplastics, or optionally wherein the carbon dioxide is substantially insoluble in the one or more recycled or reground second thermoplastics.

In an aspect, the recycled material comprises a recycled foamed article produced by the methods disclosed herein, optionally wherein the recycled foamed article is a reground foamed article. In some aspects, the recycled material comprises foamable material, wherein the foamable material is an unfoamed material. In another aspect, the recycled material further comprises one or more virgin first thermoplastic elastomers, optionally wherein the one or more virgin first thermoplastic elastomers includes one or more virgin thermoplastic polyurethane elastomers. In still another aspect, the recycled material includes one or more nucleating agents or nucleating sites for foaming the recycled material, optionally wherein the one or more nucleating sites include one or more interfaces between phase-separated polymers.

In one aspect, the barrier material has a hardness of at least 10 Shore A units greater than the foamable material, optionally at least 20 Shore A units greater, at least 30 Shore A units greater, or at least 40 Shore A units greater than the foamable material, as measured using the Shore A Hardness Test Protocol.

In any of these aspects, the additional material can be a barrier material having a nitrogen gas transmission rate of less than or equal to 10 cubic centimeters per square meter per 24 hours, or less than or equal to 1 cubic centimeter per square meter per 24 hours. In some aspects, although the second material can stretch or deform slightly during the foaming process, gas transmission rates, gas barrier properties, and durability of this layer remain substantially the same after foaming.

In another aspect, the barrier material has a nitrogen gas transmission rate at least 50 percent lower than a nitrogen gas transmission rate of the foamable material, optionally less than or equal to 10 cubic centimeters per square meter per 24 hours, or less than or equal to 1 cubic centimeter per square meter per 24 hours.

In some aspects, the barrier polymeric component of the barrier material consists of one or more barrier polymers, each individually having a nitrogen gas transmission rate less than or equal to 30 cubic centimeters per square meter per 24 hours, or less than or equal to 10 cubic centimeters per square meter per 24 hours, or less than or equal to 1 cubic centimeter per square meter per 24 hours.

In one aspect, at the first temperature and the first pressure, the carbon dioxide is soluble in the foamable material at a first concentration, the carbon dioxide is soluble in the barrier material at a second concentration, and the first concentration is at least 20 percent greater than the second concentration, optionally at least 50 percent greater than the second concentration, or at least 70 percent greater than the second concentration. In one aspect, the second concentration is less than 1 weight percent, optionally less than 0.5 weight percent, less than 0.25 weight percent, or less than 0.1 weight percent, or optionally the carbon dioxide is substantially insoluble in the barrier material.

In one aspect, the barrier material comprises one or more ethylene-vinyl alcohol copolymers, optionally wherein the one or more ethylene-vinyl alcohol copolymers are thermoplastic, optionally wherein the one or more ethylene-vinyl alcohol thermoplastic copolymers include one or more thermoplastic elastomeric copolymers. In one aspect, the barrier polymeric component consists of one or more ethylene-vinyl alcohol copolymers, optionally wherein the one or more ethylene-vinyl alcohol copolymers are thermoplastic, optionally wherein the one or more ethylene-vinyl alcohol copolymers include one or more thermoplastic elastomeric copolymers. In some aspects, the barrier polymeric component optionally consists of one or more thermoplastic polyolefin homopolymers or copolymers, optionally one or more thermoplastic polyolefin copolymers, or one or more thermoplastic polyethylene copolymers.

In one aspect, the additional material has a higher degree of crystallinity than the foamable material. In another aspect, the one or more barrier polymers of the additional material comprise or consist essentially of one or more vinylidene chloride polymers, one or more acrylonitrile polymers or copolymers, one or more polyamides, one or more epoxy resins, one or more amine polymers or copolymers, one or more thermoplastic polyolefin homopolymers or copolymers, one or more thermoplastic polyolefin copolymers, or one or more thermoplastic polyethylene copolymers, or one or more thermoplastic ethylene-vinyl alcohol copolymers, or one or more thermoplastic elastomeric ethylene-vinyl alcohol copolymers.

In some aspects, the additional material further comprises a plasticizer.

Third Material

In some aspects, the article further comprises a third material. In a further aspect, the third material can optionally be a recycled material. In one aspect, the recycled material comprises a reground thermoplastic elastomeric material. In some aspects, the recycled material further comprises a reground second thermoplastic material. In one aspect, the reground thermoplastic elastomeric material comprises one or more thermoplastic polyurethanes and the reground second thermoplastic material comprises one or more ethylene-vinyl alcohol copolymers.

In some aspects, the recycled material comprises a phase-separated blend of the one or more reground thermoplastic elastomeric materials and the one or more reground second thermoplastics. Further in this aspect, the phase-separated blend comprises one or more phase-separated regions including interfaces between the one or more first thermoplastic elastomers and the one or more second thermoplastics. In one aspect, the recycled material comprises about 95 percent by weight of the reground thermoplastic elastomeric material and about 5 percent by weight of the second thermoplastics.

In some aspects, the carbon dioxide has different solubilities in the reground thermoplastic elastomeric material and the reground second thermoplastic material. In one aspect, the carbon dioxide is soluble in the reground thermoplastic elastomeric material at a concentration of from about 1 weight percent to about 30 weight percent, optionally from about 5 weight percent to about 20 weight percent, from about 5 weight percent to about 10 weight percent, or from about 10 weight percent to about 20 weight percent. In another aspect, the carbon dioxide is soluble in the reground second thermoplastic material at less than 1 weight percent, optionally less than 0.5 weight percent, less than 0.25 weight percent, or less than 0.1 weight percent. In some aspects, the carbon dioxide is substantially insoluble in the reground second thermoplastic material.

In one aspect, the recycled material comprises a reground foamed article produced by the method disclosed herein. In an alternative aspect, the recycled material comprises an article comprising a foamable material, wherein the foamable material has not previously been foamed. In some aspects, the recycled material further comprises a virgin or pristine thermoplastic polyurethane elastomer.

In any of these aspects, the one or more interfaces serve as nucleation sites for foaming in the thermoplastic elastomeric material.

Barrier Material

In some aspects, the additional material comprises a barrier material comprising one or more barrier polymers, the barrier material comprising a barrier polymeric component consisting of all polymers present in the barrier material. In some aspects, the additional material comprises a plasticizer. In one aspect, in the foamed article, the additional material is substantially unfoamed.

In one aspect, in the foamed article, the barrier material has a hardness of at least 10 Shore A units greater than the thermoplastic elastomeric material in solid form, or optionally at least 20 Shore A units greater, at least 30 Shore A units greater, or at least 40 Shore A units greater than the thermoplastic elastomeric material in solid form as measured using the Shore A Hardness Test Protocol.

In one aspect, the barrier material has a nitrogen gas transmission rate at least 50 percent lower than a nitrogen gas transmission rate of the thermoplastic elastomeric material in solid form, optionally less than or equal to 10 cubic centimeters per square meter per 24 hours, or less than or equal to 1 cubic centimeter per square meter per 24 hours. In another aspect, the barrier polymeric component of the barrier material consists of one or more barrier polymers each individually having a nitrogen gas transmission rate of less than or equal to 30 cubic centimeters per square meter per 24 hours, or less than or equal to 10 cubic centimeters per square meter per 24 hours, or less than or equal to 1 cubic centimeter per square meter per 24 hours.

In any of these aspects, the one or more barrier polymers comprise or consist essentially of one or more vinylidene chloride polymers, one or more acrylonitrile polymers or copolymers, one or more polyamides, one or more epoxy resins, one or more amine polymers or copolymers, one or more thermoplastic polyolefin homopolymers or copolymers, one or more thermoplastic polyolefin copolymers, or one or more thermoplastic polyethylene copolymers, one or more thermoplastic ethylene-vinyl alcohol copolymers, or one or more thermoplastic elastomeric ethylene-vinyl alcohol copolymers.

In another aspect, at a first pressure of from about 0.05 pounds per square inch (0.345 kilopascals) to about 6000 pounds per square inch (41,300 kilopascals) and a first temperature of from about −57 degrees Celsius to about 31 degrees Celsius, the carbon dioxide is soluble in the thermoplastic elastomeric material at a first concentration and the carbon dioxide is soluble in the barrier material at a second concentration. In one aspect, the first concentration is at least 20 percent greater than the second concentration, optionally at least 50 percent greater than the second concentration or at least 70 percent greater than the second concentration. In another aspect, the second concentration is less than 1 weight percent, optionally less than 0.5 weight percent, less than 0.25 weight percent, or less than 0.1 weight percent, based on a total weight of the one or more second thermoplastic present in the foamable material, or optionally at a first pressure of from about 0.05 pounds per square inch (0.345 kilopascals) to about 6000 pounds per square inch (41,300 kilopascals) and a first temperature of from about −57 degrees Celsius to about 31 degrees Celsius, the carbon dioxide is substantially insoluble in the barrier material.

In an aspect, the barrier material comprises one or more ethylene-vinyl alcohol copolymers, optionally wherein the one or more ethylene-vinyl alcohol copolymers are thermoplastic, optionally wherein the one or more ethylene-vinyl alcohol copolymers include one or more thermoplastic elastomeric copolymers, optionally wherein the barrier polymeric component consists of one or more ethylene-vinyl alcohol copolymers, optionally wherein the one or more ethylene-vinyl alcohol copolymers are thermoplastic, optionally wherein the one or more ethylene-vinyl alcohol thermoplastic copolymers include one or more thermoplastic elastomeric copolymers.

Second Foamed Material

In one aspect, the foamed articles disclosed herein comprise the foamed material, wherein the foamed material is a first foamed material, and the foamed articles further comprise a second foamed material, wherein the second foamed material comprises or consists essentially of the additional material. In the foamed article, in one aspect, the density of the first foamed material can differ from the density of the second foamed material by at least 5 percent, at least 10 percent, or at least 20 percent. In an aspect, the second foamed material can be a second physically-expanded foam.

In one aspect, the second physically-expanded foam is a product of placing the unfoamed article comprising the solid additional material in carbon dioxide, infusing the solid additional material with the carbon dioxide, and expanding the infused solid additional material by phase transitioning the infused carbon dioxide into a gas under conditions that do not soften the solid additional material, thereby forming the foamed additional material of the foamed article.

Recycled Material

In another aspect, the foamable materials and foamable articles disclosed herein can comprise or consist essentially of a recycled material. In a further aspect, the additional material as disclosed herein can be a recycled material. In any of these aspects, the recycled material comprises one or more recycled polymers, optionally wherein the one or more recycled polymers comprise one or more recycled thermoplastics, optionally wherein the one or more recycled thermoplastics comprise one or more recycled thermoplastic elastomers, optionally wherein the recycled material comprises a recycled material polymeric component consisting of one or more recycled thermoplastics, optionally wherein the recycled material polymeric component consists of one or more recycled thermoplastic elastomers. In another aspect, the recycled material comprises one or more recycled first thermoplastic elastomers, optionally wherein the one or more recycled first thermoplastic elastomers are one or more reground first thermoplastic elastomers. In another aspect, the one or more recycled or reground first thermoplastic elastomers include a thermoplastic elastomer as disclosed herein.

In a further aspect, the recycled material can further comprise one or more recycled second thermoplastics, optionally wherein the one or more recycle second thermoplastic comprise one or more reground second thermoplastics, optionally wherein the one or more recycled or reground second thermoplastics include a thermoplastic as disclosed herein.

In another aspect, in the foamed articles disclosed herein, the recycled material comprises one or more recycled or reground thermoplastic polyurethane elastomers, one or more recycled or reground thermoplastic ethylene-vinyl alcohol copolymers, or both.

In still another aspect, the recycled material can comprise a blend of the one or more recycled or reground thermoplastic elastomers and one or more second thermoplastics, or can comprise a blend of one or more thermoplastic elastomers and one or more recycled thermoplastics or one or more recycled second thermoplastics. Optionally, in this aspect, the blend can be a phase-separated blend, optionally wherein a phase-separated blend comprises one or more interfaces between the one or more first thermoplastic elastomers and the one or more second thermoplastics.

In any of these aspects, the recycled material can comprise from about 99 percent to about 90 percent by weight of the one or more first thermoplastic elastomers and about 1 percent to about 10 percent by weight of the second thermoplastics based on a total weight of the recycled material, optionally wherein the recycled material comprises about 99 percent to about 93 percent by weight of the one or more first thermoplastic elastomers and about 1 percent to about 7 percent by weight of the one or more second thermoplastics, or from about 99 percent to about 95 percent by weight of the one or more first thermoplastic elastomers and from about 1 percent to about 5 percent by weight of the one or more second thermoplastic elastomers.

In some aspects, the recycled material can comprise from about 99 percent to about 50 percent by weight of recycled or reground polymers based on a total weight of recycled material, optionally from about 99 percent to about 75 percent by weight of recycled or reground polymers.

In any of these aspects, at a first pressure of from about 0.05 pounds per square inch (0.345 kilopascals) to about 6000 pounds per square inch (41,300 kilopascals) and a first temperature of from about −57 degrees Celsius to about 31 degrees Celsius, the carbon dioxide is soluble in the recycled material at a concentration of from about 1 weight percent to about 30 weight percent based on a total weight of the recycled material, optionally from about 5 weight percent to about 20 weight percent.

In another aspect, at a first pressure of from about 0.05 pounds per square inch (0.345 kilopascals) to about 6000 pounds per square inch (41,300 kilopascals), optionally about 15 pounds per square inch (103.4 kilopascals) to about 5500 pounds per square inch (37,900 kilopascals), from about 100 pounds per square inch (689.5 kilopascals) to about 5000 pounds per square inch (34,500 kilopascals), from about 500 pounds per square inch (3450 kilopascals) to about 2000 pounds per square inch (13,790 kilopascals) or from about 1000 pounds per square inch (6895 kilopascals) to about 1500 pounds per square inch (10,300 kilopascals) and a first temperature of from about −57 degrees Celsius to about 31 degrees Celsius, optionally from about −40 degrees Celsius to about 25 degrees Celsius, or from about −40 degrees Celsius to about 0 degrees Celsius, the carbon dioxide is soluble in the foamed material or in the solid foamable material, or in both, at a concentration of from about 1 weight percent to about 30 weight percent, optionally from about 5 weight percent to about 20 weight percent, from about 5 weight percent to about 10 weight percent, or from about 10 weight percent to about 20 weight percent.

In another aspect, at a first pressure of from about 0.05 pounds per square inch (0.345 kilopascals) to about 6000 pounds per square inch (41,300 kilopascals) and a first temperature of from about −57 degrees Celsius to about 31 degrees Celsius, the carbon dioxide is soluble in the one or more recycled or reground second thermoplastics at less than 1 weight percent, optionally less than 0.5 weight percent, less than 0.25 weight percent, or less than 0.1 weight percent, based on a total weight of the one or more second thermoplastic present in the foamable material based on a total weight of the one or more recycled or reground second thermoplastics, or optionally wherein the carbon dioxide is substantially insoluble in the one or more recycled or reground second thermoplastics.

In another aspect, at a first pressure of from about 0.05 pounds per square inch (0.345 kilopascals) to about 6000 pounds per square inch (41,300 kilopascals), optionally about 15 pounds per square inch (103.4 kilopascals) to about 5500 pounds per square inch (37,900 kilopascals), from about 100 pounds per square inch (689.5 kilopascals) to about 5000 pounds per square inch (34,500 kilopascals), from about 500 pounds per square inch (3450 kilopascals) to about 2000 pounds per square inch (13,790 kilopascals) or from about 1000 pounds per square inch (6895 kilopascals) to about 1500 pounds per square inch (10,300 kilopascals) and a first temperature of from about −57 degrees Celsius to about 31 degrees Celsius, optionally from about −40 degrees Celsius to about 25 degrees Celsius, or from about −40 degrees Celsius to about 0 degrees Celsius, the carbon dioxide is soluble in the foamed material or in the solid foamable material, or in both, at a concentration of from about 1 weight percent to about 30 weight percent, optionally from about 5 weight percent to about 20 weight percent, from about 5 weight percent to about 10 weight percent, or from about 10 weight percent to about 20 weight percent.

In any of these aspects, the recycled material can be a recycled foamed article, optionally wherein the recycled foamed article is a reground foamed article as disclosed herein. In some aspects, the recycled material can comprise a solid material, wherein the solid material can be a thermoplastic elastomeric material. In another aspect, the recycled material can further comprise one or more virgin first thermoplastic elastomers, optionally wherein the one or more first virgin thermoplastic elastomers includes one or more virgin thermoplastic polyurethane elastomers.

In an aspect, the recycled material can include one or more nucleating agents and/or one or more interfaces between phase-separated polymers. In another aspect, in the foamed articles disclosed herein, the thermoplastic elastomeric material can be a recycled material, or comprises a recycled material, or consists essentially of a recycled material.

Exemplary Aspects of Articles of Footwear, Articles of Apparel, and Articles of Sporting Equipment FIGS. 1A-1M illustrate footwear, apparel, athletic equipment, containers, electronic equipment, and vision wear that include the structure (e.g., the foamed article) of the present disclosure.

Figures 1N, 1O:
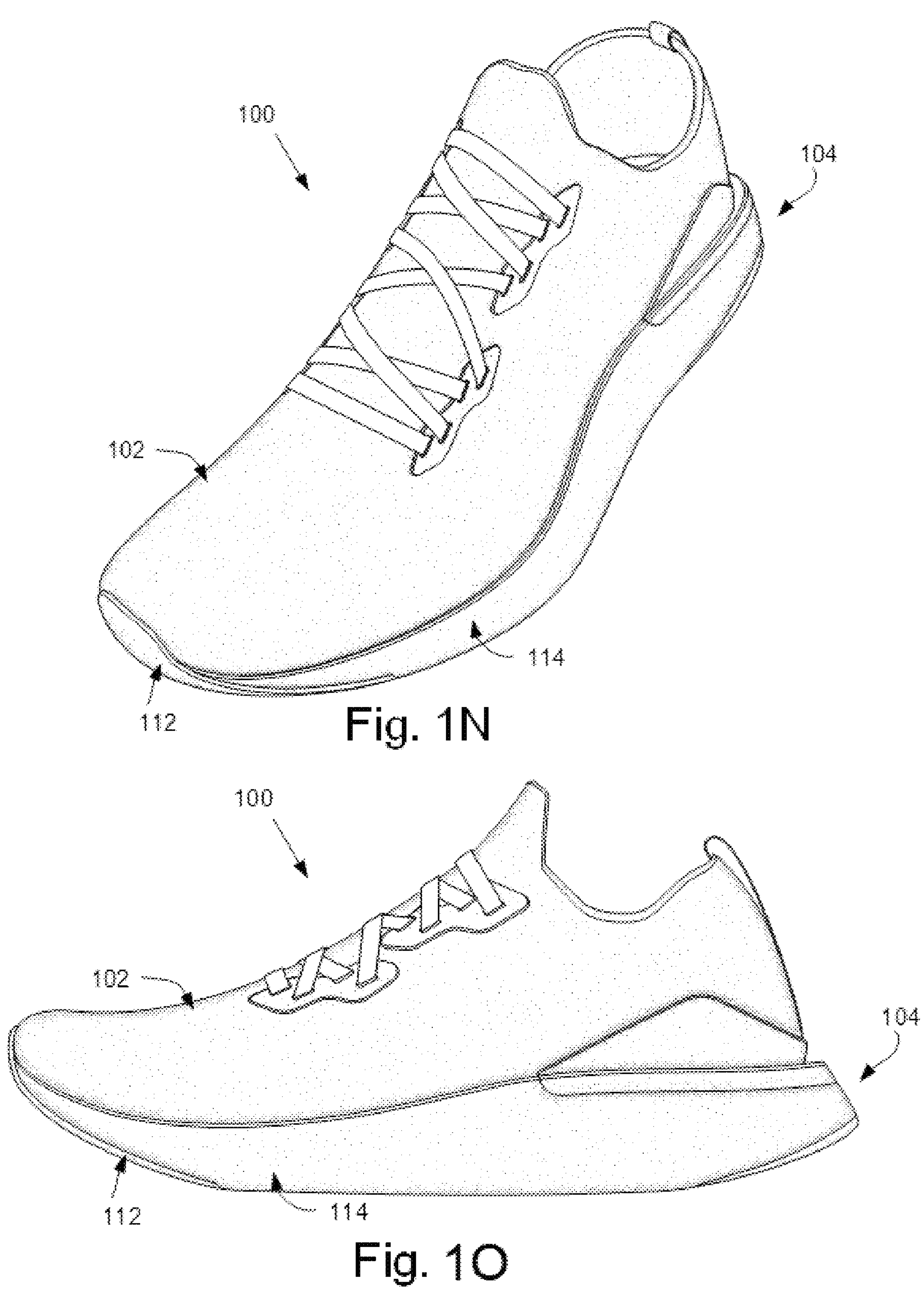
FIGS. 1N-1Y illustrate additional details regarding different types of footwear.

FIGS. 1N-1O illustrate a perspective view and a side view of an article of footwear 100 that include a sole structure 104 and an upper 102. The sole structure 104 is secured to the upper 102 and extends between the foot and the ground when the article of footwear 100 is worn. The primary elements of the sole structure 104 are a midsole 114 and an outsole 112. The midsole 114 is secured to a lower area of the upper 102 and can be formed of a polymer foam or another appropriate material. In other configurations, the midsole 114 can incorporate fluid-filled chambers, plates, moderators, and/or other elements that further attenuate forces, enhance stability, or influence motions of the foot. The outsole 112 is secured to a lower surface of the midsole 114 and can be formed from a wear-resistant rubber material that is textured to impart traction, for example. The upper 102 can be formed from various elements (e.g., lace, tongue, collar) that combine to provide a structure for securely and comfortably receiving a foot. Although the configuration of the upper 102 can vary significantly, the various elements generally define a void within the upper 102 for receiving and securing the foot relative to sole structure 104. Surfaces of the void within upper 102 are shaped to accommodate the foot and can extend over the instep and toe areas of the foot, along the medial and lateral sides of the foot, under the foot, and around the heel area of the foot. The upper 102 can be made of one or more materials such as textiles, a polymer foam, leather, synthetic leather, and the like that are stitched or bonded together. Although this configuration for the sole structure 104 and the upper 102 provides an example of a sole structure that can be used in connection with an upper, a variety of other conventional or nonconventional configurations for the sole structure 104 and/or the upper 102 can also be utilized. Accordingly, the configuration and features of the sole structure 104 and/or the upper 102 can vary considerably.

Figures 1P, 1Q:
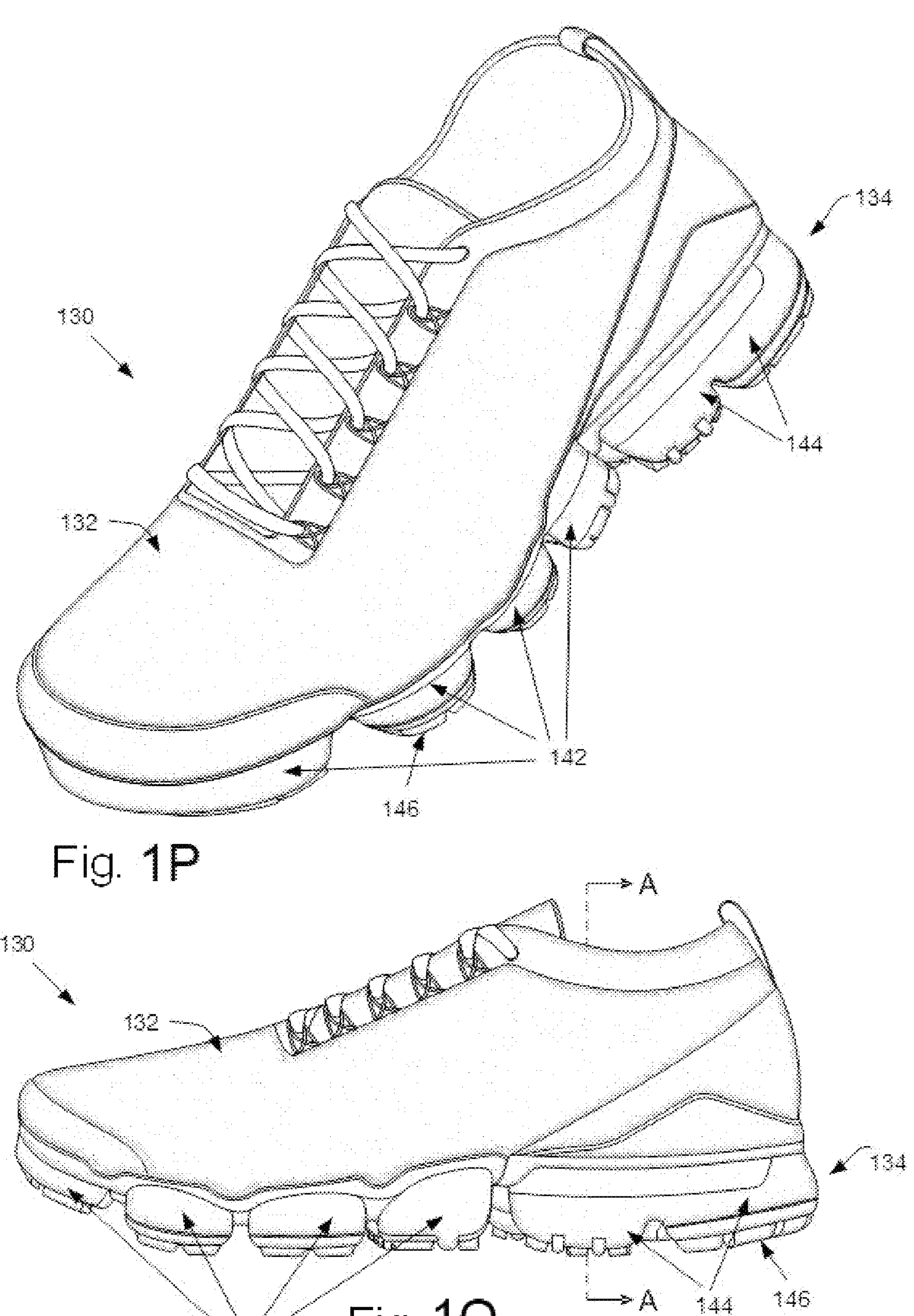

FIGS. 1P-1Q illustrate a perspective view and a side view of an article of footwear 130 that include a sole structure 134 and an upper 132. The sole structure 134 is secured to the upper 132 and extends between the foot and the ground when the article of footwear 130 is worn. The upper 132 can be formed from various elements (e.g., lace, tongue, collar) that combine to provide a structure for securely and comfortably receiving a foot. Although the configuration of the upper 132 can vary significantly, the various elements generally define a void within the upper 132 for receiving and securing the foot relative to the sole structure 134. Surfaces of the void within the upper 132 are shaped to accommodate the foot and can extend over the instep and toe areas of the foot, along the medial and lateral sides of the foot, under the foot, and around the heel area of the foot. The upper 132 can be made of one or more materials such as textiles including natural and synthetic leathers, molded polymeric components, polymer foam and the like that are stitched or bonded together.

The primary elements of the sole structure 134 are a forefoot component 142, a heel component 144, and an outsole 146. Each of the forefoot component 142 and the heel component 144 are directly or indirectly secured to a lower area of the upper 132 and formed from a polymer material that encloses a fluid, which can be a gas, liquid, or gel. During walking and running, for example, the forefoot component 142 and the heel component 144 compress between the foot and the ground, thereby attenuating ground reaction forces. That is, the forefoot component 142 and the heel component 144 are inflated and can be pressurized with the fluid to cushion the foot. The outsole 146 is secured to lower areas of the forefoot component 142 and the heel component 144 and can be formed from a wear-resistant rubber material that is textured to impart traction. The forefoot component 142 can be made of one or more polymers (e.g., layers of one or more polymers films) that form a plurality of chambers that includes a fluid such as a gas. The plurality of chambers can be independent or fluidically interconnected. Similarly, the heel component 144 can be made of one or more polymers (e.g., layers of one or more polymers films) that form a plurality of chambers that includes a fluid such as a gas and can also be independent or fluidically interconnected. In some configurations, the sole structure 134 can include a foam layer, for example, that extends between the upper 132 and one or both of the forefoot component 142 and the heel component 144, or a foam element can be located within indentations in the lower areas of the forefoot component 142 and the heel component 144. In other configurations, the sole structure 134 can incorporate plates, moderators, lasting elements, or motion control members that further attenuate forces, enhance stability, or influence the motions of the foot, for example. Although the depicted configuration for the sole structure 134 and the upper 132 provides an example of a sole structure that can be used in connection with an upper, a variety of other conventional or nonconventional configurations for the sole structure 134 and/or the upper 132 can also be utilized. Accordingly, the configuration and features of the sole structure 134 and/or the upper 132 can vary considerably.

Figure 1R:
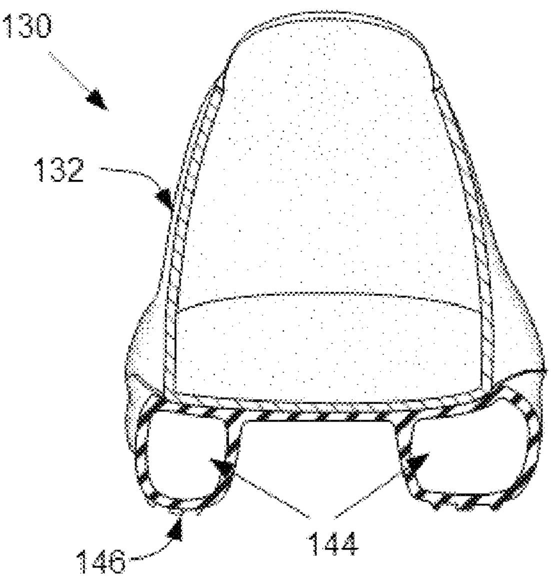

FIG. 1R is a cross-sectional view of A-A that depicts the upper 132 and the heel component 144.

Figure 1S:
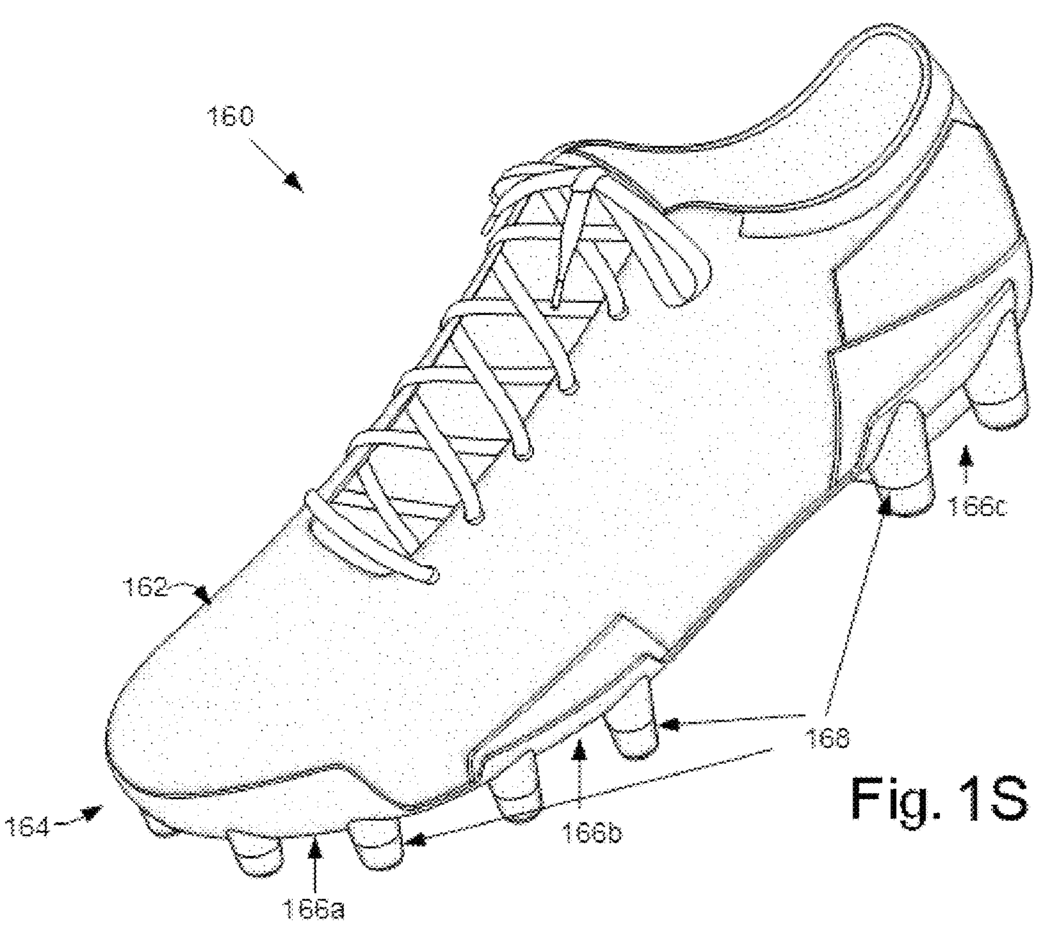
Figure 1T:
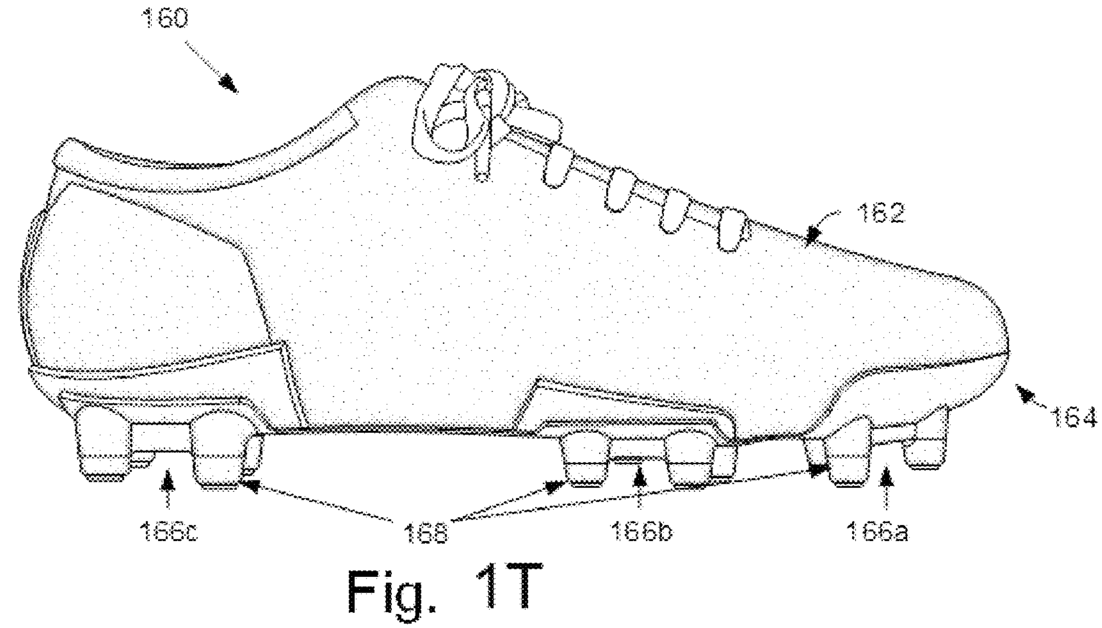

FIGS. 1S-1T illustrate a perspective view and a side view of an article of footwear 160 that includes traction elements 168. The article of footwear 160 includes an upper 162 and a sole structure 164, where the upper 162 is secured to the sole structure 164. The sole structure 164 can include one or more of a toe plate 166*a*, a mid-plate 166*b*, and a heel plate 166*c*. The plate can include one or more traction elements 168, or the traction elements can be applied directly to a ground-facing surface of the article of footwear. As shown in FIGS. 1S-1T, the traction elements 168 are cleats, but the traction elements can include lugs, cleats, studs, and spikes as well as tread patterns to provide traction on soft and slippery surfaces. In general, the cleats, studs and spikes are commonly included in footwear designed for use in sports such as global football/soccer, golf, American football, rugby, baseball, and the like, while lugs and/or exaggerated tread patterns are commonly included in footwear (not shown) including boots design for use under rugged outdoor conditions, such as trail running, hiking, and military use. The sole structure 164 is secured to the upper 162 and extends between the foot and the ground when the article of footwear 160 is worn. The upper 162 can be formed from various elements (e.g., lace, tongue, collar) that combine to provide a structure for securely and comfortably receiving a foot. Although the configuration of the upper 162 can vary significantly, the various elements generally define a void within the upper 162 for receiving and securing the foot relative to the sole structure 164. Surfaces of the void within upper 162 are shaped to accommodate the foot and extend over the instep and toe areas of the foot, along the medial and lateral sides of the foot, under the foot, and around the heel area of the foot. The upper 162 can be made of one or more materials such as textiles including natural and synthetic leathers, molded polymeric components, a polymer foam, and the like that are stitched or bonded together. In other aspects not depicted, the sole structure 164 can incorporate foam, one or more fluid-filled chambers, plates, moderators, or other elements that further attenuate forces, enhance stability, or influence the motions of the foot. Although the depicted configuration for the sole structure 164 and the upper 162 provides an example of a sole structure that can be used in connection with an upper, a variety of other conventional or nonconventional configurations for the sole structure 164 and/or the upper 162 can also be utilized. Accordingly, the configuration and features of the sole structure 164 and/or the upper 162 can vary considerably.

Figure 1U:
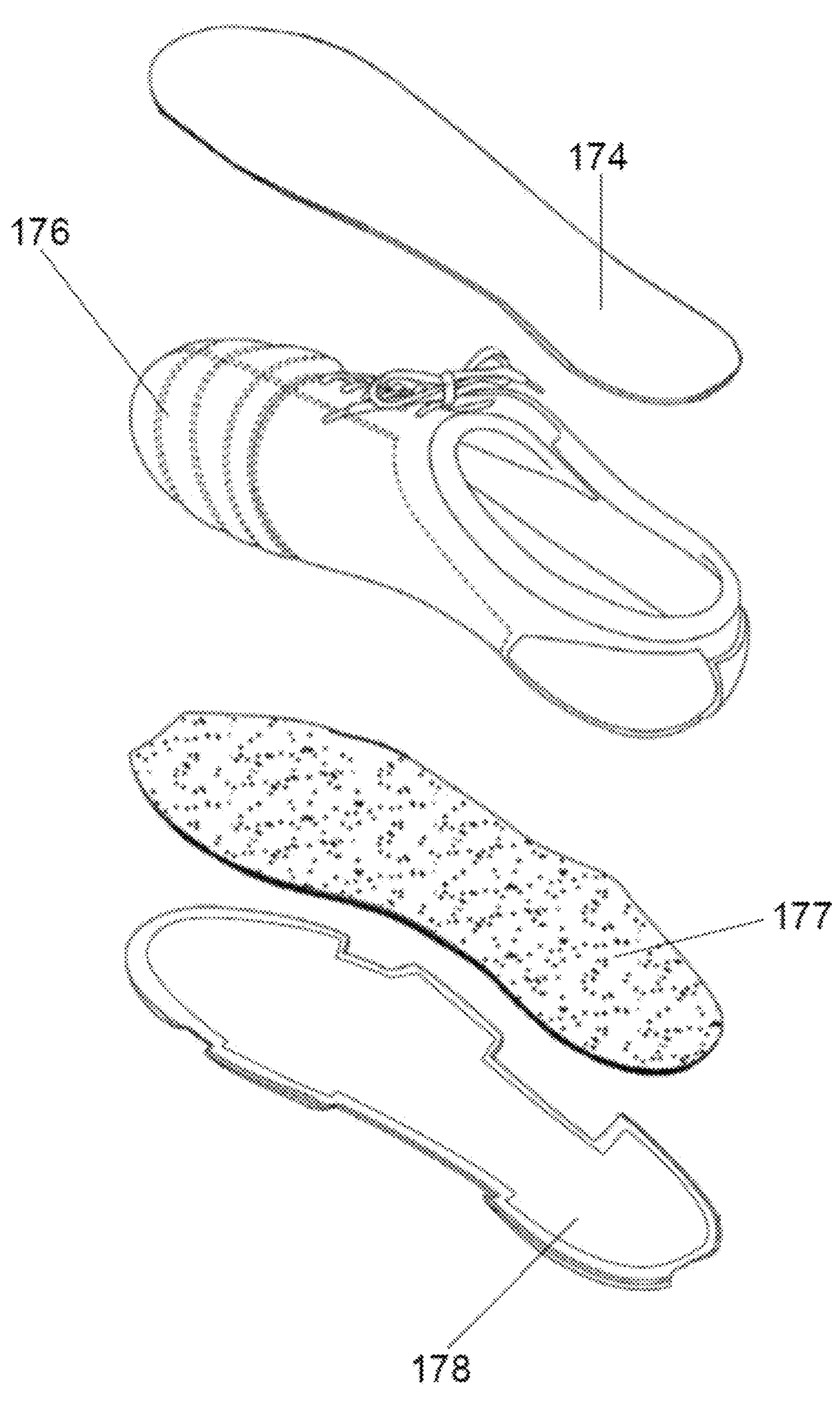
Figure 1V:
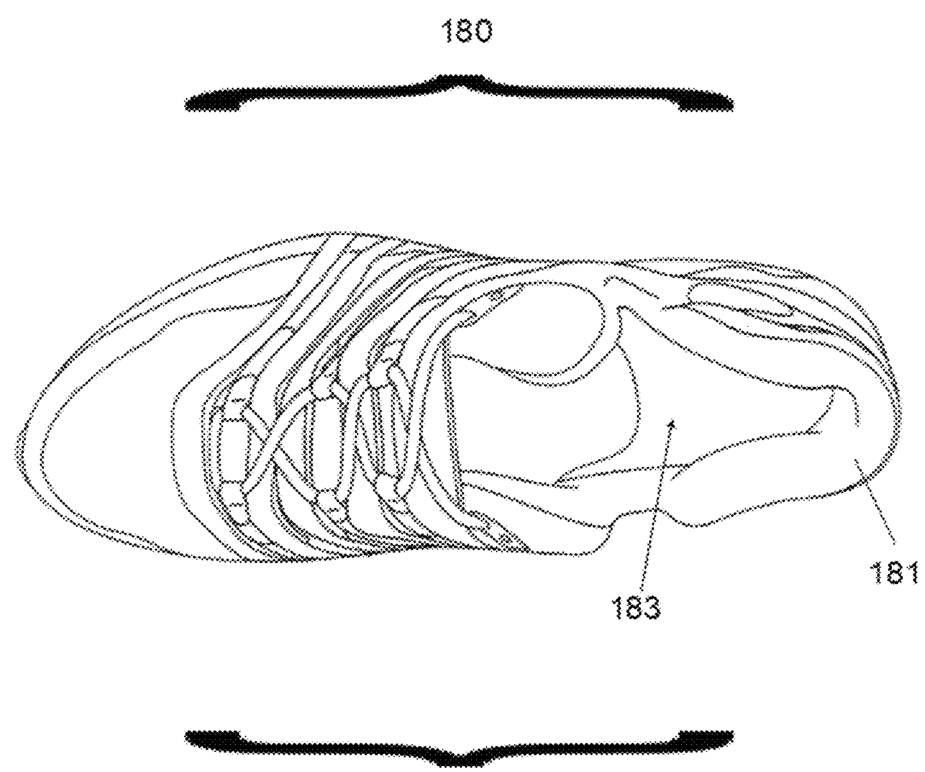
Figure 1W:
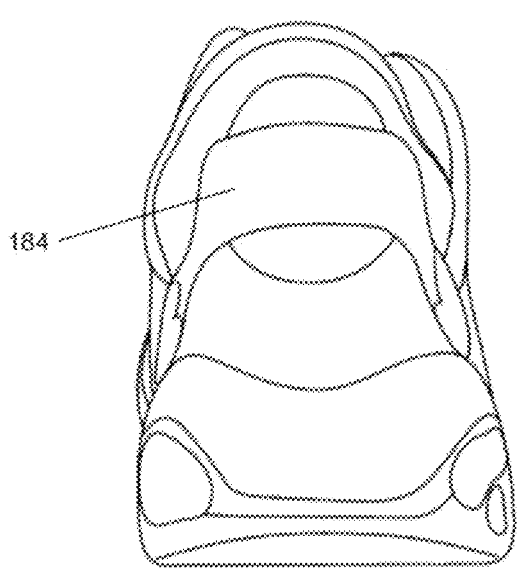
Figure 1X:
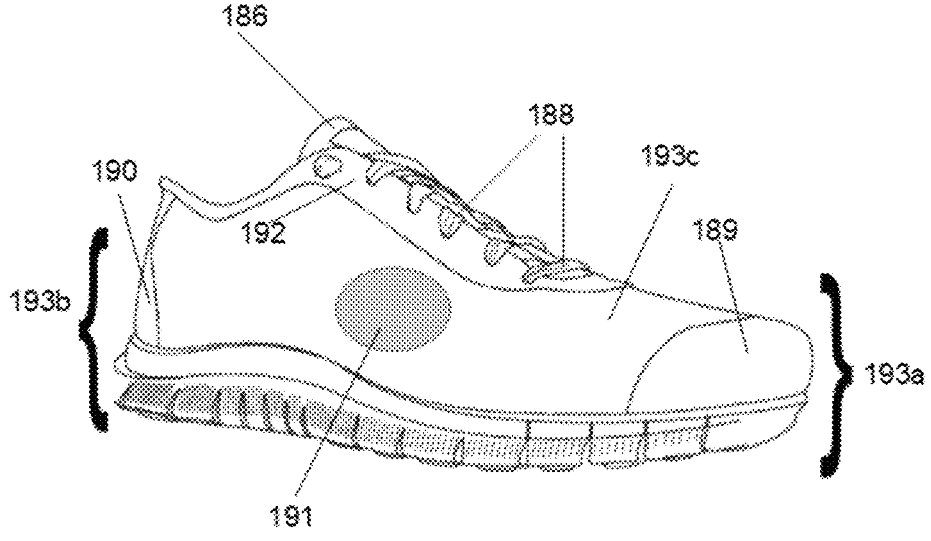
Figure 1Y:
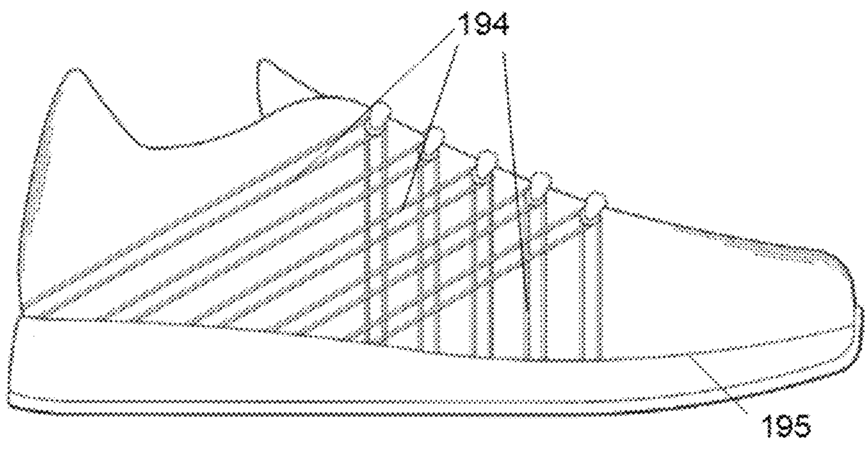

FIGS. 1U-1Y illustrate additional views of exemplary articles of athletic footwear including various configurations of upper 176. FIG. 1U is an exploded perspective view of an exemplary article of athletic footwear showing insole 174, upper 176, midsole or optional lasting board 177, and outsole 178. FIG. 1V is a top view of an exemplary article of athletic footwear indicating an opening 183 configured to receive a wearer's foot as well as cushioning material 181 around a wearer's ankle. Also illustrated are the lateral side 180 and medial side 179 of the exemplary article of athletic footwear. FIG. 1W is a back view of the article of footwear depicted in FIG. 1V, showing heel clip 184. FIG. 1X shows a side view of an exemplary article of athletic footwear, which can optionally also include a tongue 186, laces 188, a toe cap 189, a heel counter 190, a decorative element such as a logo 191, and/or eyestays for the laces 192. Toe area 193*a*, heel area 193*b*, and upper 193*c* are also shown. In some aspects, the heel counter 190 can be covered by a layer of knitted, woven, or nonwoven fabric, leather, synthetic leather, or other shoe upper material. In some aspects, the eyestays 192 are formed as one continuous piece; however, they can also comprise several separate pieces surrounding a single eyelet or a plurality of eyelets. While not depicted, foamed articles can be present on the eyestays 192 and/or the laces 188. In some configurations, the sole structure can include a midsole with a foam or airbag bladder in part or substantially all of the midsole and the foamed article can be disposed on midsole foam or the airbag bladder. FIG. 1Y is a side view of another exemplary article of athletic footwear. In certain aspects, the upper can comprise containment elements 194 such as mag wires or a molded plastic piece extending from the lace structure over portions of the medial and lateral sides of the exemplary article of athletic footwear to the top of the sole structure to provide lockdown of the foot to the sole structure, where the containment elements can have a foamed article (not shown) disposed thereon. Also depicted is a biteline 195 between the upper and the sole structure.

Exemplary Aspects of Disclosed Methods for Making Foamed Articles

Figure 2:
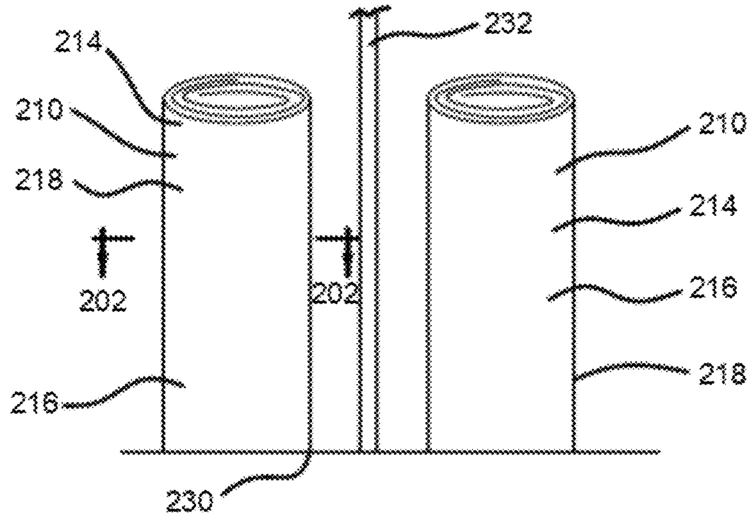
FIG. 2 illustrates, in a side view, a thermoplastic elastomeric material for forming a foamed thermoplastic elastomeric material during an early fabrication stage in accordance with an exemplary embodiment.

In one aspect, with reference to the figures, FIG. 2 illustrates a side view of an article comprising a solid foamable material as described herein. In one aspect, the solid foamable material comprises one or more thermoplastic elastomeric polyurethane copolymers.

Figure 7:
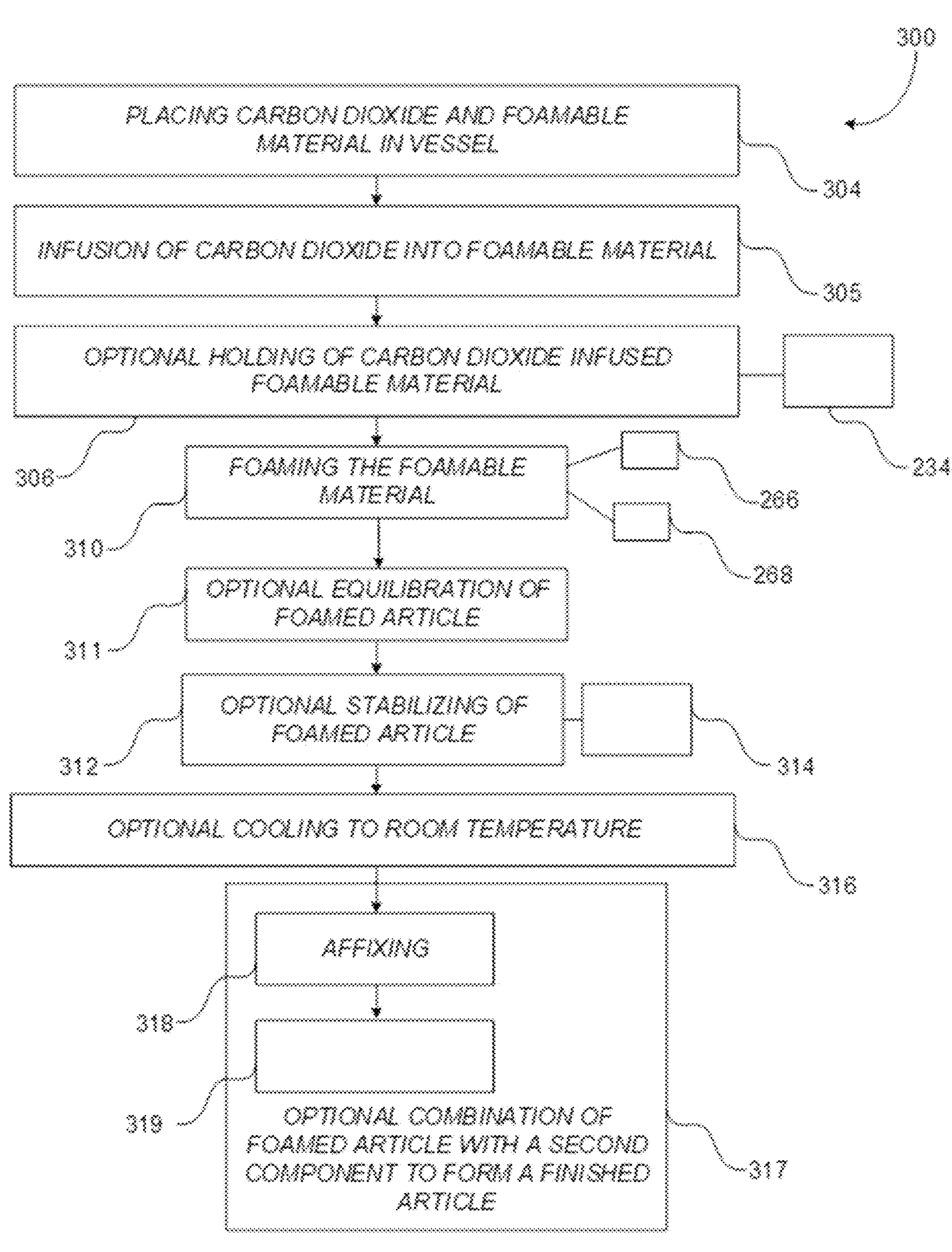
FIG. 7 illustrates a flow chart of a method for making a foamed article in accordance with an exemplary embodiment.

FIG. 7 illustrates a flow chart of a method 300 for making a foamed article as disclosed herein. Referring to FIGS. 2 and 7, optionally, in one aspect, the foamable material 210 is formed (optional step 302) into an article 214. In another aspect, optionally, the article 214 can be configured having a substantially two-dimensional (2-D) shape, or alternatively, the article 214 can be configured having a substantially three-dimensional (3-D) shape or a combination of 2-D and 3-D shapes.

Articles comprising the disclosed foamable materials can take various forms. In one non-limiting aspect, as illustrated, the article 214 can be configured as a sheet 216 that has been rolled or otherwise folded into a roll 218, or the article may not be a sheet, but can be, in some aspects, configured as a roll. In one example, the sheet 216 has a thickness of from about 0.5 millimeters to about 2 centimeters, or from about 0.5 millimeters to about 1 centimeter, or from about 0.5 millimeters to about 100 millimeters, optionally from about 0.5 millimeters to about 5 millimeters, for example about 1.5 millimeters.

Figure 3:
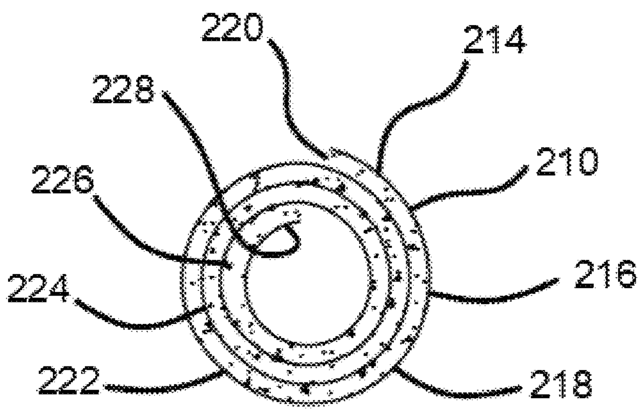
FIG. 3 illustrates, in cross-sectional view, the thermoplastic elastomeric material depicted in FIG. 2 along line 202-202.
Figure 4:
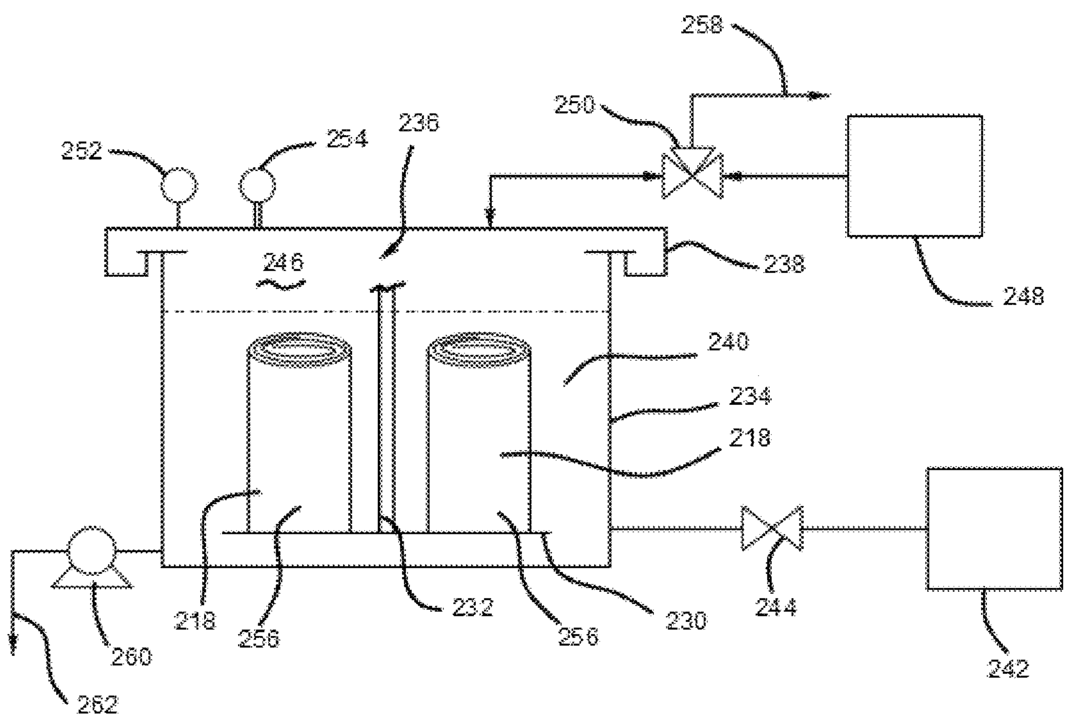
FIG. 4 illustrates, in a partial cross-sectional side view, a thermoplastic elastomeric material in a vessel for forming a foamed thermoplastic elastomeric material during an intermediate fabrication stage in accordance with an exemplary embodiment.

Referring also to FIG. 3, when the article is configured as a roll, an optional porous spacer 220 can be arranged in the roll 218 between adjacent roll sections 222, 224, 226, and 228 of the article 216 comprising the foamable material 210. In one aspect, as will be described in further detail below, the optional porous spacer 220 is sufficiently porous to allow carbon dioxide to advanced or pass through the porous spacer 220 (e.g., through the porous structure and/or along porous passageways) for contact with the foamable material 210. In one aspect, the optional porous spacer 220 is formed of a thermoplastic material, such as, for example, polyolefin (e.g., melt blown polyethylene) or the like. In an alternative aspect, the optional porous spacer 220 can be formed of a non-thermoplastic material, such as, for example, paper or a cellulose product, a fiber product (e.g., natural or synthetic fiber product), a fabric product, or the like. In one example, the optional porous spacer 220 is formed of a recyclable material. In another aspect, the article 216 and the optional porous spacer 220 can be any desired thickness, for example, so that the sheet 216 and/or article 218 can be arranged in a vessel 234 as discussed in further detail below. The optional porous spacer 220 can have a thickness of from about 0.1 millimeters to about 2 millimeters, or from about 0.1 millimeters to about 1 millimeter, or from about 0.1 millimeters to about 0.5 millimeters, for example about 0.25 millimeters. In one example, the optional porous spacer 220 has a porosity such that the diffusion rate of carbon dioxide (e.g., liquid phase) through the porous spacer 220 is higher or greater than the diffusion rate of carbon dioxide (e.g., liquid phase) through the foamable material 210. In other aspects, the article can be folded and the optional porous spacer placed between folded sections of the article, or a porous spacer can be incorporated between a plurality of discrete articles (e.g., multiple sheets of separate articles or bundles or stacks of separate articles, and the like).

In FIGS. 2-4 and 7, as illustrated, the rolls 218 including the solid foamable material 210 are arranged vertically on a base 230 that is operatively coupled to a rod 232 in one exemplary embodiment. The rolls 218 are positioned in the vessel 234 by maneuvering the rod 232 to lower the base 230 through an opening 236 and into the vessel 234. The opening 236 of the vessel 234 is then covered and sealed with a cover 238 (e.g., clam shell or other pressure-scaling cap). In other aspects (not shown), foamable articles in any suitable shape can be arranged on a base operatively coupled to a rod, where the rod can be maneuvered to lower the base through an opening and into the vessel. Further in this aspect, the opening of the vessel can then be covered and sealed with a cover.

Carbon dioxide 240 is provided or received (step 304) in the vessel 234 for contact with the foamable material 210. In one example, in the step of placing, the liquid carbon dioxide 240 is present in the vessel 234 prior to positioning the rolls 218, articles, or bundles of articles of the foamable material 210 in the vessel 234. In another example, in the step of placing, liquid or gas carbon dioxide 240 from a liquid or gas carbon dioxide source 242 is passed through a control valve 244 and introduced to the vessel 234 after the rolls, articles, or bundles of articles 218 of foamable material 210 are positioned in the vessel 234.

In another example, in the step of placing, rolls 218 of sheets comprising a foamable material 210, or in alternative aspects, articles, bundles of articles, or the like are positioned in the vessel 234 and the vessel 234 is sealed with the cover 238. Carbon dioxide liquid and/or gas 246 from a carbon dioxide liquid and/or gas source 248 is passed through a control valve 250 and is introduced to the vessel 234. In one aspect, the vessel 234 is charged with the carbon dioxide liquid and/or gas 246 to a pressure and temperature condition that is, for example, at a liquid/vapor equilibrium condition for carbon dioxide. The pressure and temperature of the vessel 234 can be monitored via a pressure measuring device 252 and a temperature measuring device 254, respectively. In one example, once charged with the carbon dioxide liquid and/or gas 246, the vessel 234 has a pressure of from about 0.05 pounds per square inch (0.345 kilopascals) to about 6000 pounds per square inch (41,300 kilopascals), optionally about 15 pounds per square inch (103.4 kilopascals) to about 5500 pounds per square inch (37,900 kilopascals), from about 100 pounds per square inch (689.5 kilopascals) to about 5000 pounds per square inch (34,500 kilopascals), from about 500 pounds per square inch (3450 kilopascals) to about 2000 pounds per square inch (13,790 kilopascals) or from about 1000 pounds per square inch (6895 kilopascals) to about 1500 pounds per square inch (10,300 kilopascals), and a temperature can be from about −57 degrees Celsius to about 31 degrees Celsius, optionally from about 0 degrees Celsius to about 23 degrees Celsius, or can be about ambient (e.g., from about 18 degrees Celsius to about 23 degrees Celsius) or greater as desired. After charging the vessel 234 with carbon dioxide liquid and/or gas, the liquid carbon dioxide 240 is introduced to the vessel 234 as described above.

As illustrated, the vessel 234 can be sufficiently filled with the liquid carbon dioxide 240 so that the rolls 218 and/or articles or bundles of articles including foamable material 210 are substantially or fully immersed in the liquid carbon dioxide 240. As briefly mentioned above, the liquid carbon dioxide 240 advances through the optional porous spacer 220 for contact with adjacent roll sections 222, 224, 226, and 228 of the sheets 216 of foamable material 210, or for contact with adjacent discrete articles or sections of folded articles (not pictured). While in contact with the liquid carbon dioxide 240, the foamable material 210 absorbs and/or otherwise takes up the liquid carbon dioxide 240 (e.g., by diffusion step 305) to form a carbon dioxide-infused article 256. In one example, during the steps of maintaining and holding at the first pressure and first temperature, the foamable material 210 is in contact with the carbon dioxide 240 for a time of from about 20 seconds to about 72 hours, optionally from about 30 minutes to about 30 hours, from about 1 hour to about 24 hours, from about 6 hours to about 12 hours, or from about 20 seconds to about 1 hour to form the carbon dioxide-infused article 256. Without being limited by theory, it is believed that during contact with the carbon dioxide 240, the foamable material 210 is solvated by the carbon dioxide 240 to form the carbon dioxide-infused article 256.

In one exemplary aspect, the process continues by discharging the vessel 234 of the carbon dioxide liquid and/or gas 246 through the control valve 250 and line 258. Preferably, the vessel 234 is discharged of the carbon dioxide liquid and/or gas 246 at a temperature that is sufficient to substantially prevent the liquid carbon dioxide-containing foamable material 256 from foaming. In one example, the temperature in the vessel 234 during discharge is from about −60 degrees Celsius to about −20 degrees Celsius, or from about −50 degrees Celsius to about −30 degrees Celsius, or from about −45 degrees Celsius to about −38 degrees Celsius. In another aspect, before, during, or after discharging the vessel 234 of the carbon dioxide liquid and/or gas 246, the liquid carbon dioxide 240 can be removed from the vessel 234 via a pump 260 and line 262.

Figure 5:
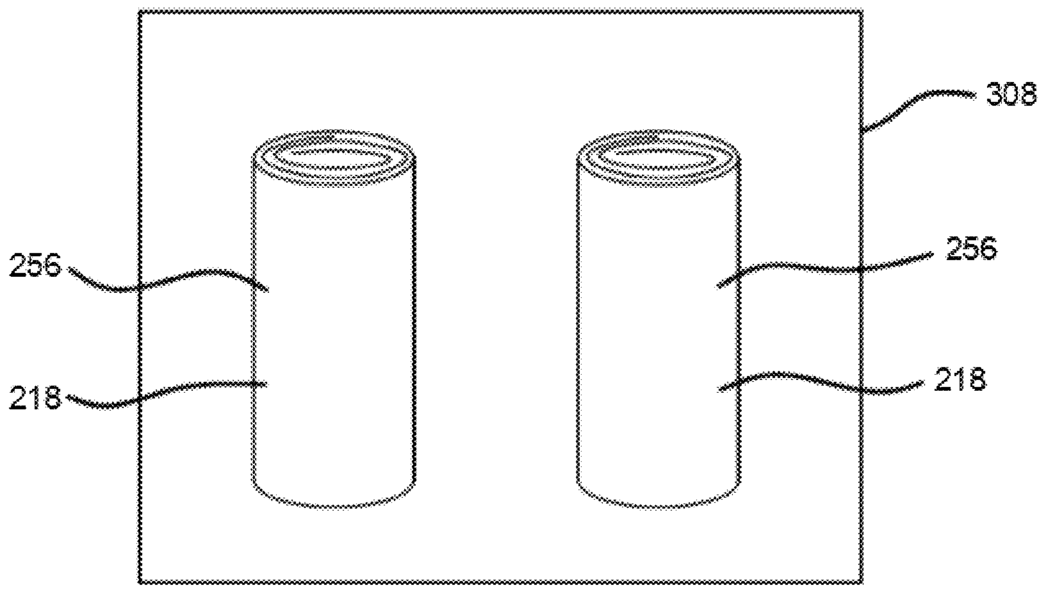
FIG. 5 illustrates, in a partial cross-sectional side view, a carbon dioxide-infused foamable article during exposing at a second temperature and second pressure in accordance with an exemplary embodiment.

The carbon dioxide-infused rolls 218 of carbon dioxide—256 or other carbon dioxide-infused articles or bundles of articles are removed from the vessel 234, for example, by removing the cover 238 and maneuvering the rod 232 to lift the base 230 through the opening 236. Optionally and as illustrated in FIG. 5, the carbon dioxide-infused rolls 218 of—or other carbon dioxide-infused articles or bundles of articles 256 can be temporarily exposed to the second pressure and second temperature (step 306) in a cooling zone 308 prior to heating and foaming the material 256. As used herein, the term “zone” refers to an area including one or more equipment items and/or one or more sub-zones. Equipment items can include for example one or more vessels, chambers, heaters, exchangers, coolers/chillers, pipes, pumps, compressors, controllers, and the like. Additionally, an equipment item can further include one or more zones or sub-zones. In one example, the rolls 218 of the carbon dioxide-infused article 256 are stored in the cooling zone 308 at a temperature of from about −100 degrees Celsius to about −20 degrees Celsius, optionally from about −60 degrees Celsius to about −20 degrees Celsius, or from −40 degrees Celsius to about −20 degrees Celsius.

Figure 6:
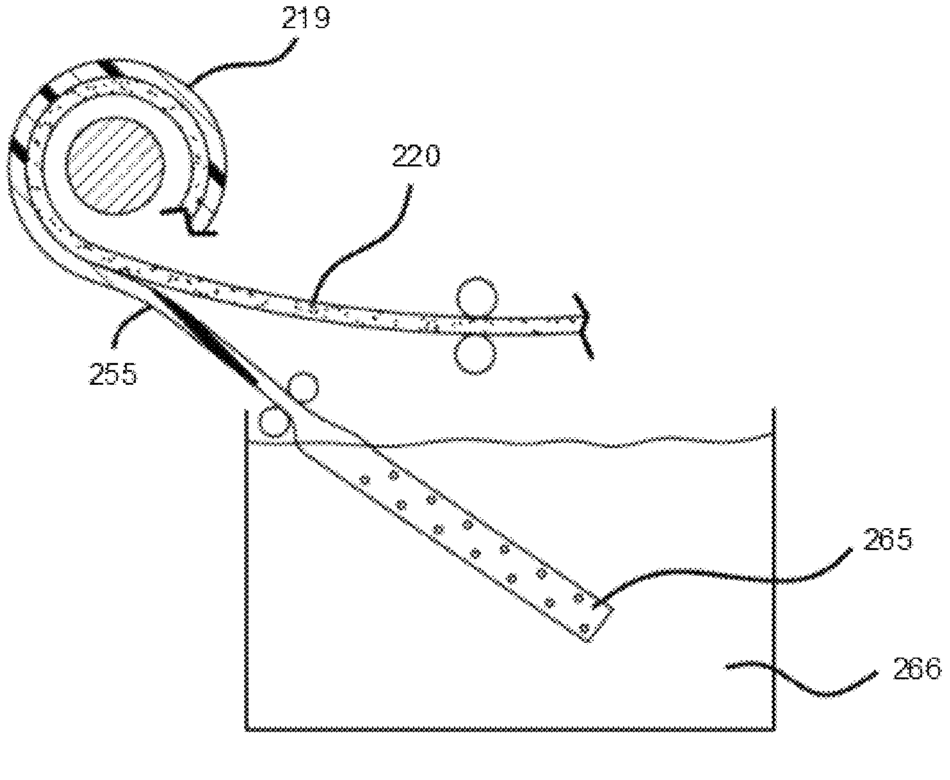
FIG. 6 illustrates, in a partial cross-sectional side view, a carbon dioxide-infused foamable article being introduced to a water bath for forming a foamed article during a subjecting step in accordance with an exemplary embodiment.

Referring to FIGS. 6 and 7, the process continues by subjecting the article comprising a foamable material 256 (step 310) to the third temperature and third pressure in order to cause expansion of the infused carbon dioxide, for example by causing a phase change of the carbon dioxide 240 infused in the foamable material. As the carbon dioxide expand, this expansion foams the foamable material 210 into a foamed material, e.g., a foamed material having a multi-cellular foam structure. In some aspects, nucleating sites within the article promote the formation of gas bubbles which expand and form foam cells. In one aspect, when the article includes a recycled material in the form phase-separated blend, the nucleating sites can be phase-separated interfaces between the one or more first thermoplastic elastomers and the one or more second thermoplastics in the blend. Other nucleating sites and/or nucleating agents are also contemplated and should be considered disclosed. In one example, the carbon dioxide-infused article 255 is subjected to a third temperature of from about 20 degrees Celsius to about 150 degrees Celsius, optionally from about 20 degrees Celsius to about 100 degrees Celsius, from about 40 degrees Celsius to about 80 degrees Celsius, from about 50 degrees Celsius to about 70 degrees Celsius, or at about 60 degrees Celsius, and, independently, for a time of from about 1 seconds to about 5 minutes, optionally from about 10 seconds to about 2 minutes, from about 30 seconds to about 90 seconds, or form about 45 seconds to about 60 seconds, to expand and foam the foamable material 210 and form the foamed article 265. In some aspects, following the subjecting and expanding, the article retains carbon dioxide gas in the cells of the foamed material, or solubilized carbon dioxide in the foamed article 265, or solubilized carbon dioxide in an additional polymeric material of the article.

In one example, during the subjecting step, the carbon dioxide-infused article 255 is heated by introducing the carbon dioxide-infused article 255 to a water bath 266. As illustrated in FIG. 6 for the case of rolled articles, the roll 219 of the carbon dioxide-infused article 255 is unrolled and the porous spacer 220 is removed to expose the carbon dioxide-infused article 255 for introduction to the water bath 266. Other methods of introducing articles, including articles that have not been rolled, are also contemplated and should be considered disclosed. In the water bath 266, the carbon dioxide-infused article 255 is in contact with water that is at a higher temperature than the carbon dioxide-infused article 255. As such, heat is transferred from the water bath 266 to the carbon dioxide-infused article 255 to cause a phase change of the carbon dioxide 240, thereby expanding and foaming the foamable material 210 to form to the foamed article 265. In one example, the water bath 266 is at a third temperature of from about 20 degrees Celsius to about 90 degrees Celsius, or from about 50 degrees Celsius to about 70 degrees Celsius, or about 60 degrees Celsius, and, independently, the carbon dioxide-infused article 255 is soaked in the water bath 266 for a time of from about 2 seconds to about 30 minutes, optionally from about 10 seconds to about 30 minutes, from about 30 seconds to about 20 minutes, from about 30 seconds to about 10 minutes, or from about 30 seconds to about 5 minutes, to form the foamed article 265. In an alternative example, water in the form of steam is used to heat the carbon dioxide-infused article 255. In particular, the temperature of the carbon dioxide-infused article 255 is increased by subjecting the carbon dioxide-infused article 255 to steam. In one example, steam is used to heat the carbon dioxide-infused article 255 to a third temperature of from about 60 degrees Celsius to about 150 degrees Celsius, optionally from about 60 degrees Celsius to about 100 degrees Celsius, or from about 75 degrees Celsius to about 90 degrees Celsius to cause a phase change of the carbon dioxide 240 to carbon dioxide gas, thereby expanding and foaming the foamable material 210 to form to the foamed article 265.

In another example, the carbon dioxide-infused article 255 can be heated by subjecting the carbon dioxide-infused article 255 to microwave energy using a microwave generating device or to radio frequency (RF) energy using an RF generating device 268 (schematically illustrated in FIG. 7). In particular, heat is generated in the carbon dioxide-infused article 255 by absorbing the microwave energy or RF energy to cause a phase change of the carbon dioxide 240, thereby expanding and foaming the foamable material 210 to form to the foamed article 265. In one example, the carbon dioxide-infused article 255 is heated by the microwave energy or RF energy to a third temperature of from about 60 to about 150 degrees Celsius, optionally from about 60 degrees Celsius to about 100 degrees Celsius, or from about 75 degrees Celsius to about 90 degrees Celsius, and, independently, for a time of from about 2 seconds to about 5 minutes, optionally from about 10 seconds to about 2 minutes, or from about 30 seconds to about 1 minute to form the foamed article 265.

Referring to FIG. 7, the process continues by optionally bringing (step 311) the foamed article 265 to a fourth temperature and fourth pressure and holding the foamed article at or below the fourth temperature, the fourth pressure, or both, to form a stabilized foamed thermoplastic article. The stabilized foamed article can be formed in a net shape or can be trimmed, machined, or otherwise tailored to a desired shape to define the shape of a foamed article. Removal of residual carbon dioxide (step 312) is accomplished by optionally holding the foamed article at a fifth temperature and fifth pressure, e.g., in an oven 314. Following removal of residual carbon dioxide, the foamed article can be cooled to room temperature (step 316) by any means including, but not limited to, removing the foamed article from oven 314 and allowing it to equilibrate with room temperature air.

Referring to FIG. 7, in one aspect, the foamed article can be used to manufacture an article, such as an article of sporting equipment, an article of apparel, or an article of footwear (optional step 317). In one aspect, the foamed article 319 can be combined with a second component (e.g., affixed, step 320) to form a finished article 317. In some aspects, the foamed article as described above can be a foamed footwear component. Further in this aspect, the foamed footwear component and a footwear upper 322 and/or a footwear outsole 324 can be affixed (step 320) to make a finished article of footwear.

In any of the above aspects wherein a core layer is present, the core layer can comprise a plurality of microlayers (not shown) as described and disclosed herein.

Property Analysis and Characterization Procedures

Specific Gravity/Density Test Protocol. The specific gravity (S.G.) or density is measured for samples taken using the Component Sampling Procedure as described herein, using a digital balance or a Densicom Tester (Qualitest, Plantation, Florida, USA). Each sample is weighed and then is submerged in a distilled water bath (at 22 degrees Celsius plus or minus 2 degrees Celsius). To avoid errors, air bubbles on the surface of the samples are removed, e.g., by wiping isopropyl alcohol on the sample before immersing the sample in water, or using a brush after the sample is immersed. The weight of the sample in the distilled water is recorded. The specific gravity is calculated using the following formula:

$$S.G. = \frac{\text{Weight of the sample in air (g)}}{\text{Weight of sample in air (g)} - \text{Weight of sample in water (g)}}$$

Melting Temperature, Glass Transition Temperature, and Enthalpy of Melting Test Protocol. The melting temperature and glass transition temperature are determined using a commercially available Differential Scanning calorimeter ("DSC") in accordance with ASTM D3418-97, using a sample prepared using the Material Sampling Procedure. Briefly, a 10-15 gram sample is placed into an aluminum DSC pan and then the lid is sealed with a crimper press. The DSC is configured to scan from −100 degrees Celsius to 225 degrees Celsius with a 20 degree Celsius per minute heating rate, hold at 225 degrees Celsius for 2 minutes, and then cool down to 25 degrees Celsius at a rate of −10 degrees Celsius per minute. The DSC curve created from this scan is then analyzed using standard techniques to determine the glass transition temperature and the melting temperature. The enthalpy of melting is calculated by integrating the area of the melting endotherm peak and normalizing by the sample mass.

Alternatively, glass transition temperature can be determined using Dynamic Mechanical Analysis (DMA). In this technique, a piece of the foamable material in the form of a film about 1 millimeter thick, about 5 millimeters to about 10 millimeters wide and about 20 millimeters long is mounted on a film tension fixture of a DMA apparatus. The sample is heated over a pre-determined temperature range at a fixed rate of, for example, about 1 degree Celsius to about 5 degrees Celsius per minute. During heating, the sample is tested at fixed frequency (e.g., about 1 Hertz) and a small oscillation amplitude (e.g. about 0.05 percent strain). The storage modulus (or complex shear) is recorded. In the DMA plot, G' is the storage modulus, and G" is the loss modulus. G' measures the energy stored and G" measures the energy lost/dissipated as heat. Tan delta is the ratio of G"/G' and the peak region in the tan delta curve is indicative of the glass transition temperature of the sample.

Shore A Hardness Test Protocol. The hardness of a material is determined according to the test protocol detailed in ASTM D-2240 Durometer Hardness, using a Shore A scale. The sample is prepared using the Material Sampling Procedure and/or the Component Sampling Procedure.

Asker C Hardness Test Protocol. For flat foams, the sample is a minimum of 6 millimeters thick for Asker C durometer testing. If necessary, foam samples are stacked to make up the minimum thickness. Foam samples are large enough to allow all measurements to be performed at a minimum of 12 millimeters from the edge of the sample and at least 12 millimeters from any other measurement. Regions tested are flat and parallel with an area at least 6 millimeters in diameter. Standard samples have dimensions of approximately 35 centimeters by 13 centimeters by 1.8 centimeters and a minimum of 5 hardness measurements are taken and tested using a 1 kilogram heat weight. The sample is prepared using the Material Sampling Procedure and/or the Component Sampling Procedure.

Split-Tear Test Protocol. The test protocol used to obtain the split-tear values for foam articles is as follows. The sample is prepared using the Material Sampling Procedure and/or the Component Sampling Procedure. Four die-cut, rectangular-shaped samples of slab sheet or molded foam are prepared, each measuring 2.54 centimeters by 15.24 centimeters by 10±1 millimeter (thickness). If the foam material to be tested had a skin or barrier layer, the skin or barrier layer is removed before preparing the four samples. A 3 centimeter long cut is made in the center from one end of the sample. Then, five successive 2 centimeter portions are marked on the sample.

The crosshead speed of the tensile test apparatus is set at 50 millimeters per minute. Each separated end of the sample is clamped in an upper grip and a lower grip of the test apparatus. The separation is placed in the middle between both grips. Each section of the sample is held in a clam in such a manner that the original adjacent cut edges forms a straight line joining the centers of the clamps.

As needed, the cut is aided with a sharp knife to keep separating the foam material in the center of the sample. Readings caused by cutting with the knife are discarded. The lowest values for each of the five portions of each sample are recorded in kilograms per centimeter. Five values are recorded for each sample and an average of the five values is then obtained and reported. If a portion of a sample includes a portion having an air bubble more than 2 millimeters in diameter, the value for the portion including the air bubble is not included in the average. If more than one portion of a sample is found to include air bubbles having a diameter greater than 2 millimeters, another sample is then tested.

Sampling Procedures

Using the Test Protocols described above, various properties of the materials disclosed herein and articles formed therefrom can be characterized using samples prepared with the following sampling procedures.

Material Sampling Procedure. The Material Sampling Procedure can be used to obtain a neat sample of a polymeric material or of a polymer, or, in some instances, a sample of a material used to form a polymeric material or a polymer. The material is provided in media form, such as flakes, granules, powders, pellets, or the like. If a source of the polymeric material or polymer is not available in a neat form, the sample can be cut from a component or element containing the polymeric material or polymer, such as a composite element or a sole structure, thereby isolating a sample of the material.

Component Sampling Procedure. This procedure can be used to obtain a sample of a material from a component of an article of footwear, an article of footwear, a component of an article of apparel, an article of apparel, a component of an article of sporting equipment, or an article of sporting equipment. A sample including the material in a non-wet state (e.g., at 25 degrees Celsius and 20 percent relative humidity) is cut from the article or component using a blade. If the material is bonded to one or more additional materials, the procedure can include separating the additional materials from the material to be tested.

The sample is taken at a location along the article or component that provides a substantially constant material thickness for the material as present on the article or component (within plus or minus 10 percent of the average material thickness). For many of the test protocols described above, a sample having a surface area of 4 square centimeters is used. The sample is cut into a size and shape (e.g., a dogbone-shaped sample) to fit into the testing apparatus. In cases where the material is not present on the article or component in any segment having a 4 square centimeter surface area and/or where the material thickness is not substantially constant for a segment having a 4 square centimeter surface area, sample sizes with smaller cross-sectional surface areas can be taken and the area-specific measurements are adjusted accordingly.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

All publications, patents, and patent applications cited in this specification are cited to disclose and describe the methods and/or materials in connection with which the publications are cited. All such publications, patents, and patent applications are herein incorporated by references as if each individual publication or patent were specifically and individually indicated to be incorporated by reference. Such incorporation by reference is expressly limited to the methods and/or materials described in the cited publications, patents, and patent applications and does not extend to any lexicographical definitions from the cited publications, patents, and patent applications. Any lexicographical definition in the publications, patents, and patent applications cited that is not also expressly repeated in the instant specification should not be treated as such and should not be read as defining any terms appearing in the accompanying claims.

This disclosure is not limited to particular aspects, embodiments, or examples described, and as such can, of course, vary. The terminology used herein serves the purpose of describing particular aspects, embodiments, and examples only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges can independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual aspects, embodiments and examples described and illustrated herein has discrete components and features which can be readily separated from or combined with the features of any of the other several aspects, embodiments, and examples without departing from the scope or spirit of the present disclosure. Any recited method can be carried out in the order of events recited or in any other order that is logically possible.

Although any methods and materials similar or equivalent to those described herein can also be used in the practice or testing of the present disclosure, the preferred methods and materials are now described. Functions or constructions well-known in the art cannot be described in detail for brevity and/or clarity. Aspects of the present disclosure will employ, unless otherwise indicated, techniques of nanotechnology, organic chemistry, materials science and engineering and the like, which are within the skill of the art. Such techniques are explained fully in the literature.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', 'less than y', and 'less than z'. Likewise, the phrase 'about x, y, z, or greater' should be interpreted to include the specific ranges of 'about x', 'about y', and 'about z' as well as the ranges of 'greater than x', 'greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1 percent to 5 percent" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

As used herein, the term "polymer" refers to a chemical compound formed of a plurality of repeating structural units referred to as monomers. Polymers often are formed by a polymerization reaction in which the plurality of structural units become covalently bonded together. When the monomer units forming the polymer all have the same chemical structure, the polymer is a homopolymer. When the polymer includes two or more monomer units having different chemical structures, the polymer is a copolymer. One example of a type of copolymer is a terpolymer, which includes three different types of monomer units. The co-polymer can include two or more different monomers randomly distributed in the polymer (e.g., a random co-polymer). Alternatively, one or more blocks containing a plurality of a first type of monomer can be bonded to one or more blocks containing a plurality of a second type of monomer, forming a block copolymer. A single monomer unit can include one or more different chemical functional groups.

Polymers having repeating units which include two or more types of chemical functional groups can be referred to as having two or more segments. For example, a polymer having repeating units of the same chemical structure can be referred to as having repeating segments. Segments are commonly described as being relatively harder or softer based on their chemical structures, and it is common for polymers to include relatively harder segments and relatively softer segments bonded to each other in a single monomeric unit or in different monomeric units. When the polymer includes repeating segments, physical interactions or chemical bonds can be present within the segments or between the segments or both within and between the segments. Examples of segments often referred to as "hard segments" include segments including a urethane linkage, which can be formed from reacting an isocyanate with a polyol to form a polyurethane. Examples of segments often referred to as "soft segments" include segments including an alkoxy functional group, such as segments including ether or ester functional groups, and polyester segments. Segments can be referred to based on the name of the functional group present in the segment (e.g., a polyether segment, a polyester segment), as well as based on the name of the chemical structure which was reacted in order to form the segment (e.g., a polyol-derived segment, an isocyanate-derived segment). When referring to segments of a particular functional group or of a particular chemical structure from which the segment was derived, it is understood that the polymer can contain up to 10 mole percent of segments of other functional groups or derived from other chemical structures. For example, as used herein, a polyether segment is understood to include up to 10 mole percent of non-polyether segments.

The terms "Material Sampling Procedure" and "Component Sampling Procedure" as used herein refer to the respective sampling procedures and test methodologies described in the Property Analysis and Characterization Procedure section. These sampling procedures and test methodologies characterize the properties of the recited materials, films, articles and components, and the like, and are not required to be performed as active steps in the claims.

The term "about," as used herein, can include traditional rounding according to significant figures of the numerical value. In some aspects, the term about is used herein to mean a deviation of 10 percent, 5 percent, 2.5 percent, 1 percent, 0.5 percent, 0.1 percent, 0.01 percent, or less from the specified value.

The articles "a" and "an," as used herein, mean one or more when applied to any feature in aspects of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and can have a singular or plural connotation depending upon the context in which it is used.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10 percent variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the phrase "consists essentially of" or "consisting essentially of" refer to the feature being disclosed as having primarily the listed feature without other active components (relative to the listed feature) and/or those that do not materially affect the characteristic(s) of the listed feature. For example, the foamable material can consist essentially of a foamable material, which means that foamable material can include fillers, colorants, etc. that do not substantially interact with or interact with the change the function or chemical characteristics of the foamable material. In another example, the foamable material can consist essentially of a thermoplastic polyurethane, which means that the thermoplastic polyurethane does not include a sufficient amount of another type of thermoplastic elastomer to alter the properties (e.g., melting temperature, surface energy of the mixture compared to the pure thermoplastic polyurethane, or the like) of the thermoplastic polyurethane. Further in this aspect, when the thermoplastic elastomer consists essentially of one polymer type (e.g., a thermoplastic polyurethane), it may contain less than 1 weight percent of another type of polymer.

As used herein, the terms "at least one" and "one or more of" an element are used interchangeably, and have the same meaning that includes a single element and a plurality of the elements, and can also be represented by the suffix "(s)" at the end of the element. For example, "at least one polyurethane", "one or more polyurethanes", and "polyurethane(s)" can be used interchangeably and have the same meaning.

As used herein, "gas" and "vapor" refer to fluid phases of a substance such as, for example, carbon dioxide, wherein the distance between adjacent molecules is large and there are few or no interactions between the atoms or molecules of the substance. Gases and vapors typically expand to fill containers in which they are placed. In some aspects, "vapor" can be used specifically to refer to a substance in the gas phase that is in equilibrium with or exists within a container alongside a solid or liquid phase of the same substance.

As used herein, a "sheet" or "film" refers to a flexible strip comprising one or more polymeric materials, the sheet or film having a thickness that is much smaller than its length and/or width.

As used herein, "physically-expanded" refers to foams, foamed materials, and foamed articles, that have been expanded from an initial solid, un-foamed state through the action of a physical expansion agent. In one aspect, the physically-expanded foams, foamed materials, and foamed articles become expanded when carbon dioxide infused in solid foamable materials is brought to temperature and pressure conditions wherein the carbon dioxide phase transitions to a gas, thereby physically expanding the solid foamable materials.

As used herein, "solid material" refers to a material in an unfoamed state, i.e., a material which is in its solid phase at room temperature and under atmospheric pressure, and which does not have a multi-cellular foam structure. The solid material may be a foamable material that has not been expanded through a foaming process, or may be a material that is not foamable using the methods described herein, such as, for example, a barrier material. Additionally the solid material can be a thermoplastic material which was previously foamed using a method disclosed herein or using a different foaming method, and which has subsequently been recycled by thermally softening or melting the foamed material to an extent that its foamed structure has fully collapsed. In one aspect, a foamable solid material does not melt during the foaming process. In another aspect, a foamable solid material does not thermally soften during the foaming process.

EXAMPLES

The present disclosure is more particularly described in the following examples that are intended as illustrations only, since numerous modifications and variations within the scope of the present disclosure will be apparent to those skilled in the art.

Figure 10A:
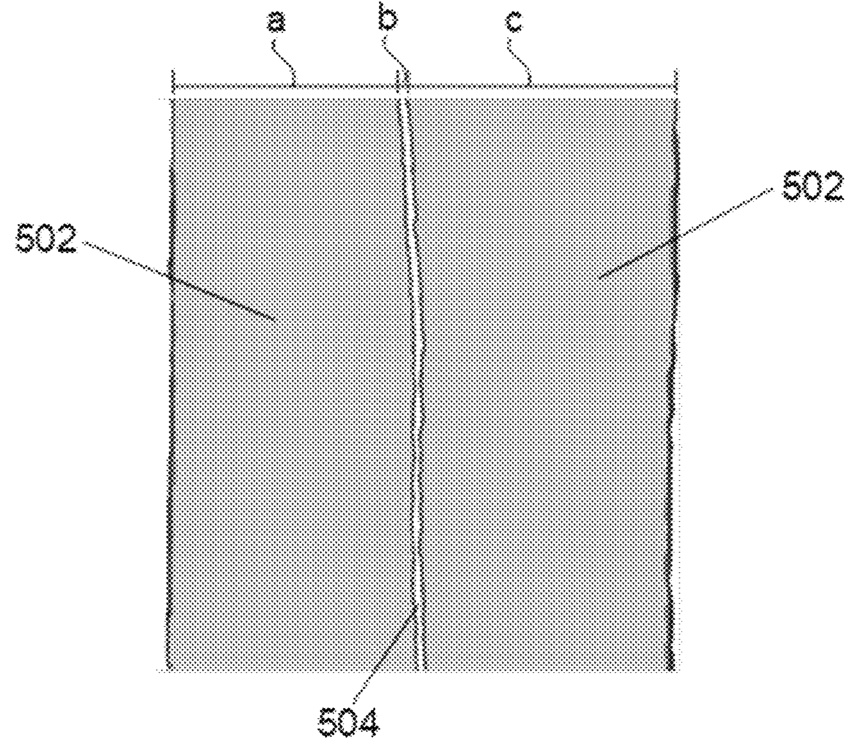
FIGS. 10A-10F are schematics of multilayered articles according to an exemplary embodiment, prior to foaming (FIGS. 10A, 10C, and 10E) and after foaming (FIGS. 10B, 10D, and 10F).
Figure 10B:
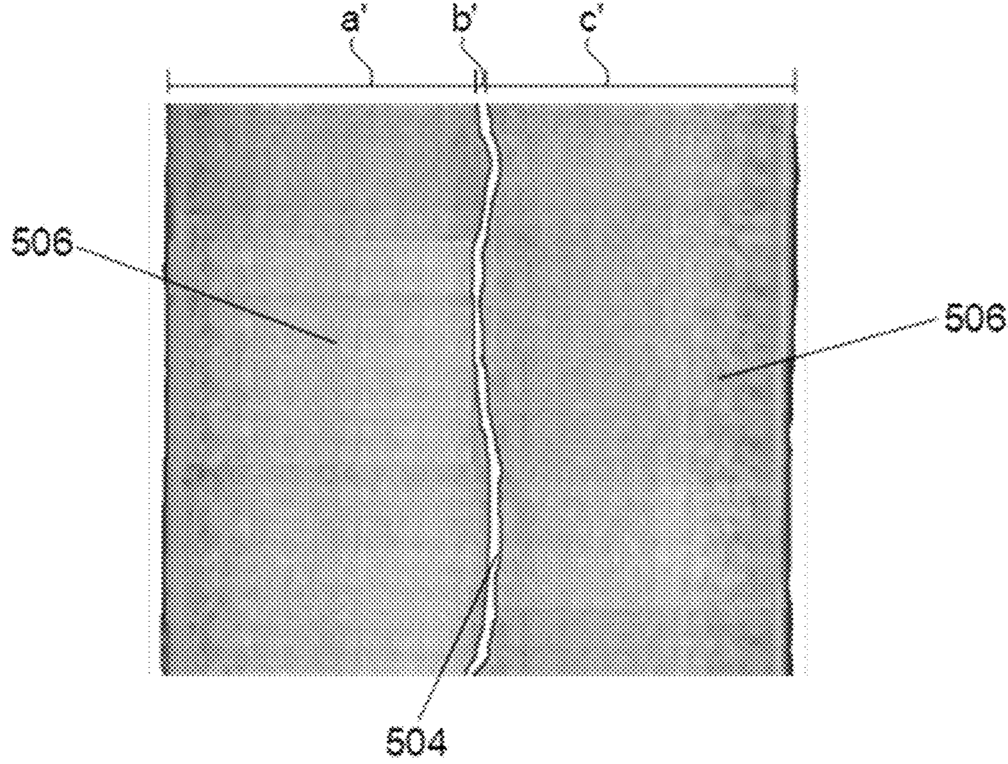

Change in Thickness of Foamable Material on Foaming. FIGS. 10A-10F are schematics of a cross-section of a sheet consisting of a central core of a barrier material 504 sandwiched between two layers of another material. FIG. 10A shows an exemplary sheet prior to undergoing a foaming process as described herein, while FIG. 10B shows the sheet after undergoing the foaming process, where the foamable material has expanded to foamed material 506, where a represents a thickness of a first layer of solid foamable material 502 prior to foaming, b represents a thickness of a barrier layer 504 prior to foaming, and c represents a thickness of a second layer of solid foamable material 502 prior to foaming. After foaming, thickness of the first layer of foamed material 506 is shown as a', thickness of the barrier material 504 is shown as b', and thickness of the second layer of foamed material 506 is shown as c', where a' and c' are greater than a and c, respectively, while b' is substantially unchanged compared to b. However, the surface geometry of barrier material 504 may or may not become distorted following foaming as the result of expansion of layers adjacent to barrier material 504 during the foaming process.

Figure 10C:
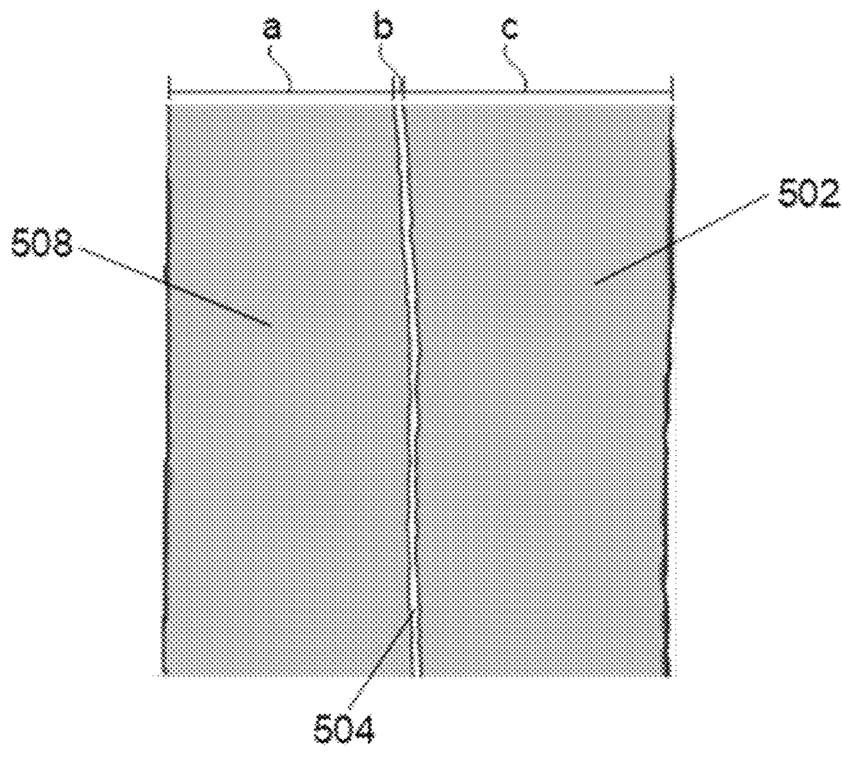
Figure 10D:
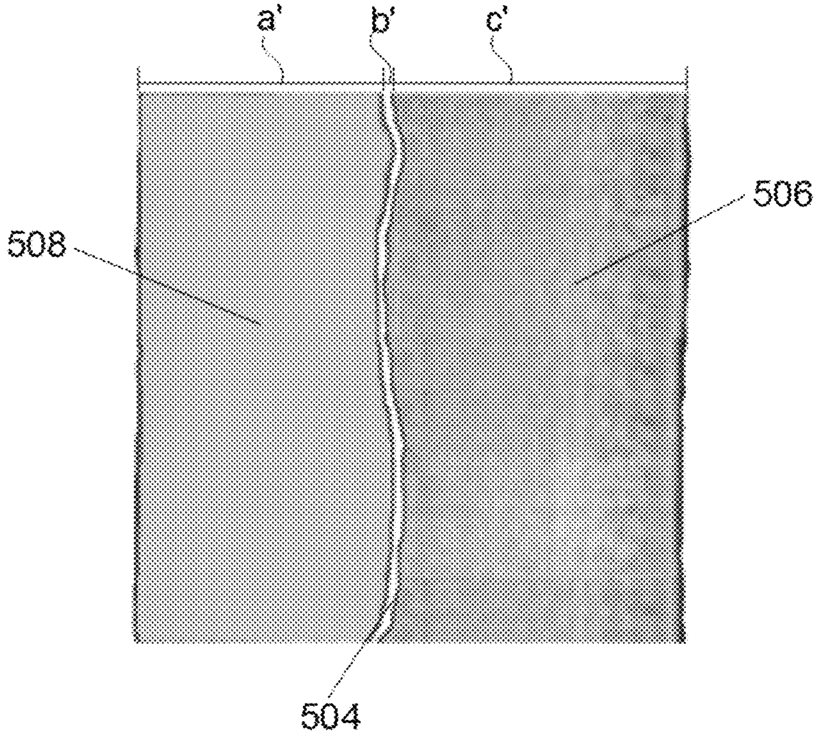

FIG. 10C shows another exemplary sheet prior to undergoing a foaming process as described herein, while FIG. 10D shows the sheet after undergoing the foaming process, where the foamable material has expanded to foamed material 506, where a represents a thickness of a first layer of material 508 prior to foaming, b represents a thickness of a barrier layer 504 prior to foaming, and c represents a thickness of a layer of solid foamable material 502 prior to foaming. Material 508 can be a foamable material not infused with carbon dioxide, a foamable material infused with carbon dioxide that fully dissipates prior to foaming, or a material with low carbon dioxide solubility. After foaming, thickness of the first layer of material 508 is shown as a', thickness of the barrier material 504 is shown as b', and thickness of the layer of foamed material 506 is shown as c', where c' is greater than c, while a' and b' are substantially unchanged compared to a and b, respectively. The surface geometry of barrier material 504 may or may not become distorted following foaming as the result of expansion of layers adjacent to barrier material 504 during the foaming process.

Figure 10E:
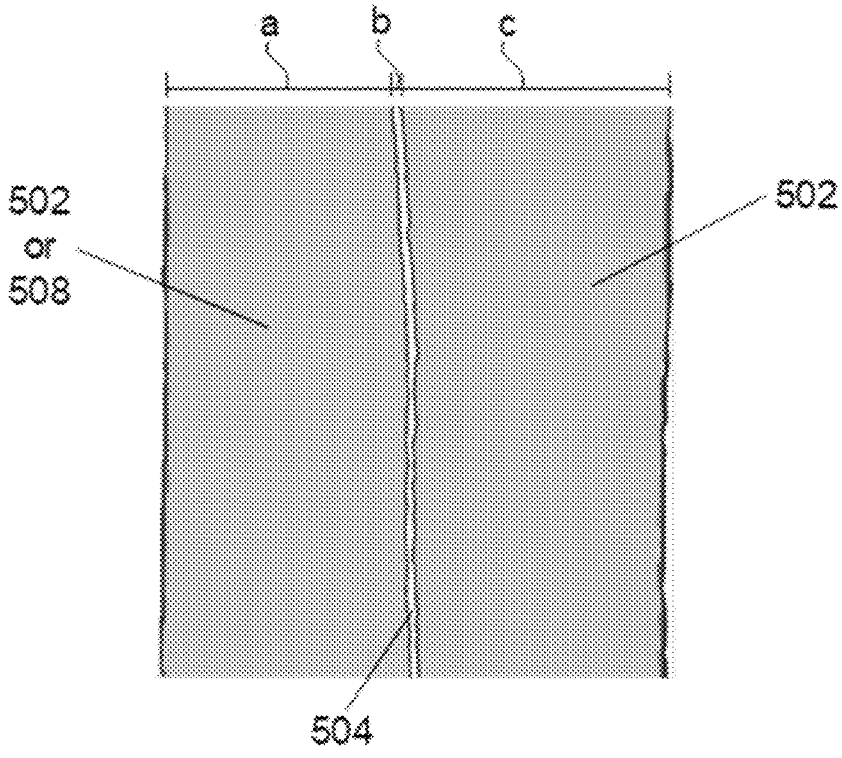
Figure 10F:
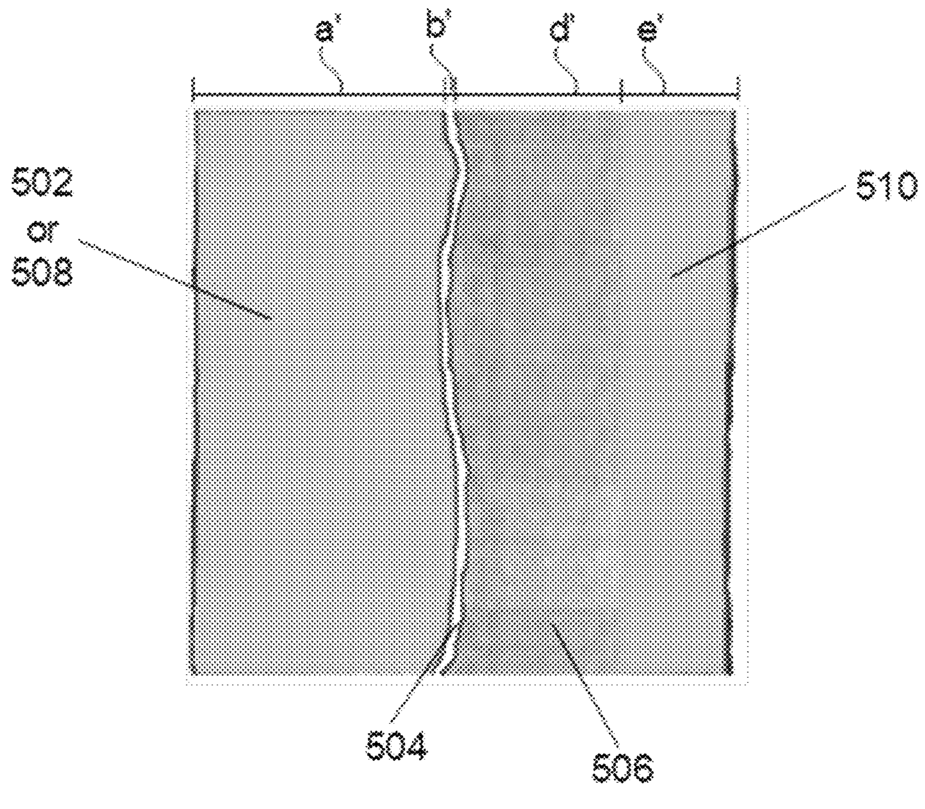

FIG. 10E shows another exemplary sheet prior to undergoing a foaming process as described herein, while FIG. 10F shows the sheet after undergoing the foaming process, where at least a portion the foamable material has expanded to foamed material 506, while another portion of the foamable material 510 does not expand to a foamed material due to dissipation of carbon dioxide from this portion of the foamable material prior to conducting the foaming process. In this instance, a represents a thickness of a first layer of material 502 or 508 prior to foaming, wherein 502 and 508 are consistent with the previous descriptions, b represents a thickness of a barrier layer 504 prior to foaming, and c represents a thickness of a layer of solid foamable material 502 prior to foaming. After foaming, thickness of the first layer of material 502 or 508 is shown as a', thickness of the barrier material 504 is shown as b', and the thickness of the layer of foamed material 506 is shown as d' and the thickness of the portion of the layer of foamable material from which carbon dioxide dissipates is shown as e', where the sum of d' and e' is greater than c, while a' and b' are substantially unchanged compared to a and b, respectively. The surface geometry of barrier material 504 may or may not become distorted following foaming as the result of expansion of layers adjacent to barrier material 504 during the foaming process.

Different foamable materials can expand in thickness by different amounts depending on experimental conditions. Conditions and results for exemplary systems as demonstrated in FIGS. 10A-10F are presented in Table 1 below, where barrier material 504 comprises ethylene vinyl alcohol ("EVOH") and the foamable material comprises a thermoplastic polyurethane ("TPU"):

TABLE 1

| Example Foaming Conditions | | |
|---|---|---|
| | Example System 1 | Example System 2 |
| Carbon Dioxide Infusion Temperature (degrees Celsius) | 25 | 25 |
| Carbon Dioxide Infusion Pressure (pounds per square inch) | 1500 | 1500 |
| Carbon Dioxide Infusion Time (hours) | 1 | 1 |
| Water Bath Temperature (degrees Celsius) | 40 | 60 |
| Water Bath Time (minutes) | 1 | 1 |
| Oven Temperature (degrees Celsius) | 50 | 50 |
| Oven Time (minutes) | 30 | 30 |
| Shrinkage of EVOH Layer Due to Stretching (micrometers) | <3 | <4 |
| Increase in Thickness of Thermoplastic Polyurethane Layers Due to Foaming (micrometers) | 26 (<5 percent) | 69 (<13 percent) |

Foaming Selected Portions of the Articles. FIGS. 11A-11K are schematics of a cross-section of a foamable article at various stages during the foaming process and illustrate several different scenarios for selectively foaming one or more portions of a foamable article while leaving other portions unfoamed. While these scenarios are illustrated using an article comprising a single solid foamable material (e.g., a first solid foamable material), it is to be understood that these scenarios apply to articles comprising one or more solid foamable materials (a first solid foamable material, a second solid foamable material, an additional solid foamable material, etc.), alone or in combination with non-foamable materials (e.g., a barrier material, an additional non-foamable material, etc.).

Figure 11A:
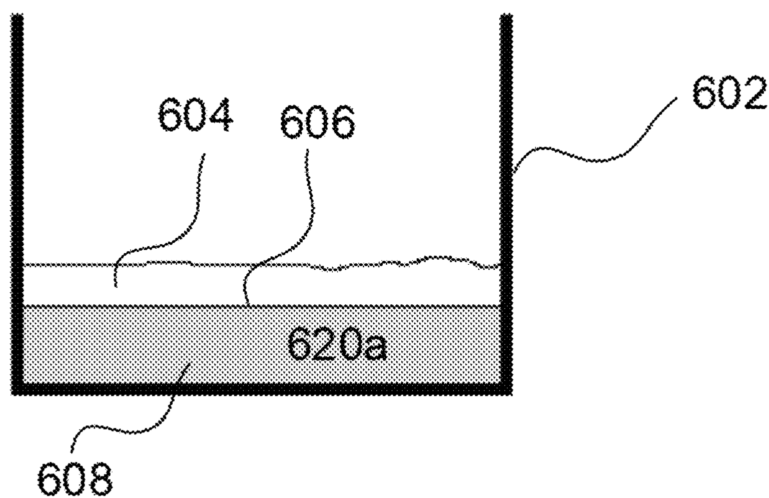
FIGS. 11A-11K are schematics of foamable articles according to an exemplary embodiment, wherein selected portions of foamable articles can be foamed through controlled infusion and diffusion of carbon dioxide into and/or out of all or part of the articles prior to performing the expanding step disclosed herein, while leaving other portions of the articles unfoamed.
Figure 11B:
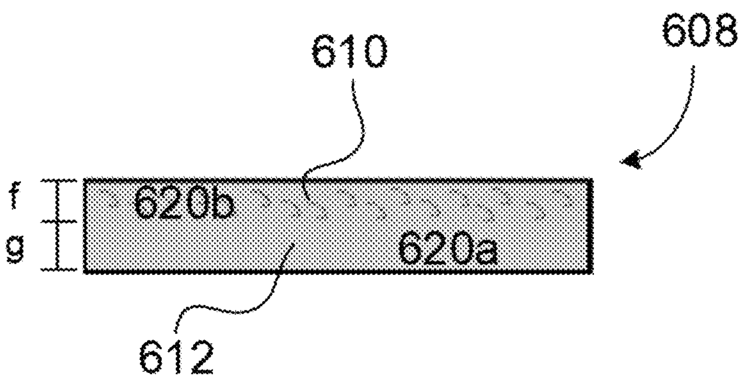
Figure 11C:
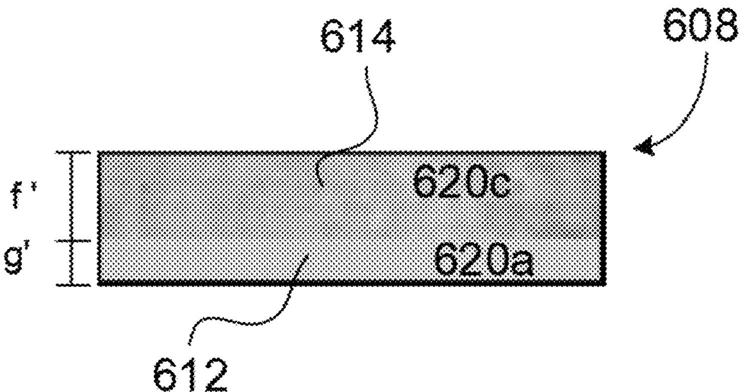
Figure 11D:
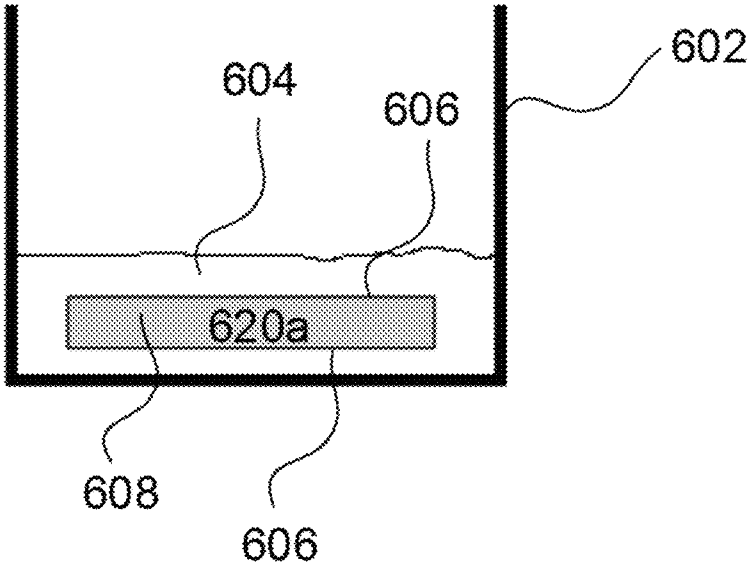
Figure 11E:
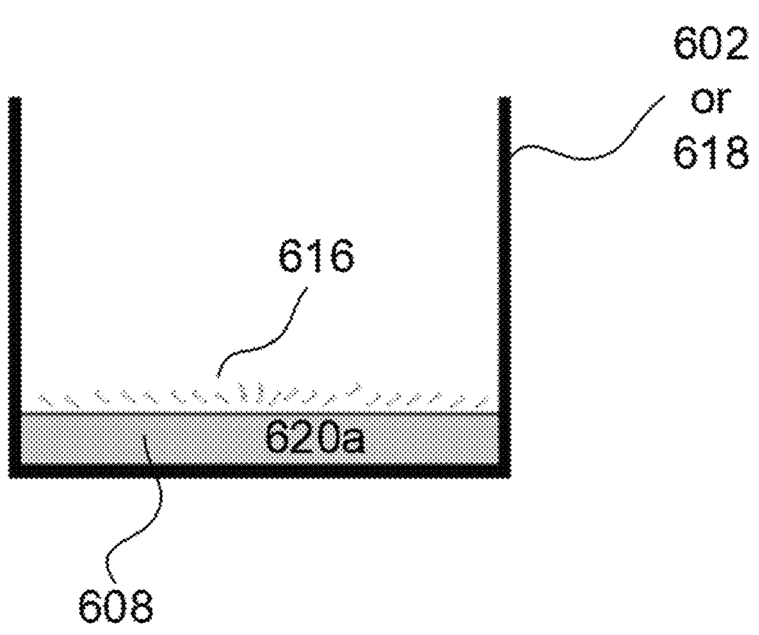

A first scenario is illustrated in FIGS. 11A-11C. In this scenario, as shown in FIG. 11A, a foamable article 608 comprising a solid foamable material 620*a* is placed at the bottom of a vessel 602, or against another surface of the vessel 602, which is then charged with carbon dioxide such that a single surface 606 of the article 608 including the solid foamable material 620*a* is exposed to liquid carbon dioxide 604. Since only one surface 606 on one side of the article 608 is exposed to the liquid carbon dioxide 604, only the exposed portion of the solid foamable material 620*a* of the article 608 becomes infused with carbon dioxide. FIG. 11B shows a cross section of the solid foamable material 620 of foamable article 608 of FIG. 11A at after the infusing and immediately prior to expanding the foamable material. In this stage, the solid foamable material 620*b* of foamable article 608 is partially infused with carbon dioxide and includes both infused 610 portion containing infused solid foamable material 620*b* and uninfused portions 612 containing uninfused solid foamable material 620*a*, where f represents a thickness of the infused portion 610 prior to foaming and g represents a thickness of the uninfused portion 612 prior to foaming. Finally, FIG. 11C shows a cross section of the same region of article 608 as shown in FIG. 11B after the step of expanding has been carried out, and the infused solid foamable material has become foamed material 620*c*, while the uninfused solid foamable material 620*a* remains unfoamed. The foamed material 620*c* of foamable article 608 that had been infused with carbon dioxide (portion 610 in FIG. 11B) 614 has expanded into a foamed state, with the foamed portion 614 having thickness f', where f' is greater than f, while the uninfused portion of the solid foamable material 620*a* of the article 612 remains solid and unfoamed, having a thickness g' which is substantially the same as thickness g.

Figure 11F:
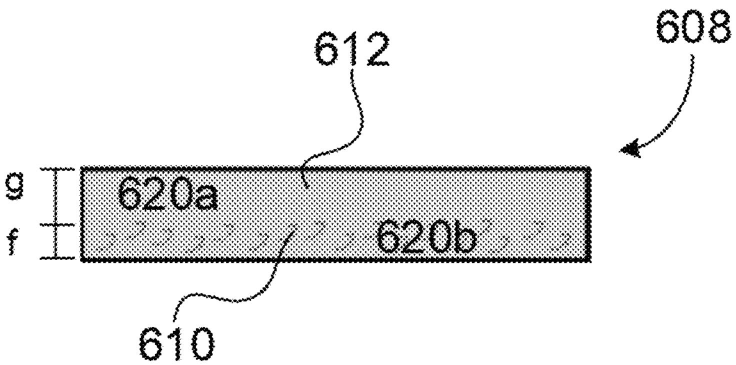
Figure 11G:
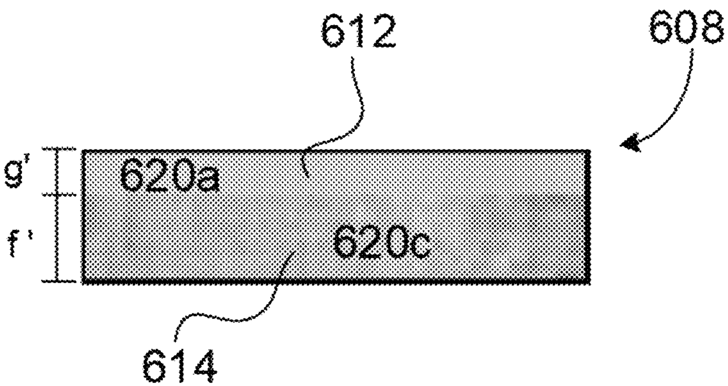

A second scenario is illustrated in FIGS. 11D-11G. In this second scenario, as illustrated in in FIG. 11D, a foamable article 608 comprising a solid foamable material 620*a* is placed in a vessel 602 which has been charged with carbon dioxide such that one or more exterior surfaces 606 of the article 608 comprising the solid foamable material 620*a* are exposed to liquid carbon dioxide 604 and become infused with carbon dioxide. The carbon dioxide can then be discharged from the vessel 602, or the foamable article 608 can be placed in an oven or other controlled environment 618 such that at least one surface of the article 608 is placed against the side of the vessel or oven, allowing carbon dioxide to diffuse 616 from one or more surfaces of the article 608 comprising the solid foamable material 620*a* that are not in contact with a side of the vessel 602 or oven 618, as in FIG. 11E. FIG. 11F shows a cross section of the foamable article 608 of FIGS. 11D-11E after the infusing and immediately prior to expanding the infused portion of the solid foamable material 620*b*. In this stage, the solid foamable material of the foamable article 608 is partially infused with carbon dioxide and includes both infused portion 610 containing infused solid foamable material 620*b* and uninfused portion 612 containing uninfused solid foamable material 620*a*, where f represents a thickness of the infused portion 610 prior to foaming and g represents a thickness of the uninfused portion 612 prior to foaming. Finally, FIG. 11G shows a cross section of the same region of article 608 from FIGS. 11D-11F after the step of expanding has been carried out, and the infused portion of the solid foamable material (620*b* in FIG. 11F) has been foamed, forming foamed material 620*c*. The portion of the solid foamable material 620*b* of the article that had been infused with carbon dioxide has expanded into a foamed material 620*c* in foamed portion 614 having thickness f', where f' is greater than f, while the uninfused portion of the solid foamable material 620*a* of article 612 remains solid and unfoamed, having a thickness g' which is substantially the same as thickness g.

Figure 11H:
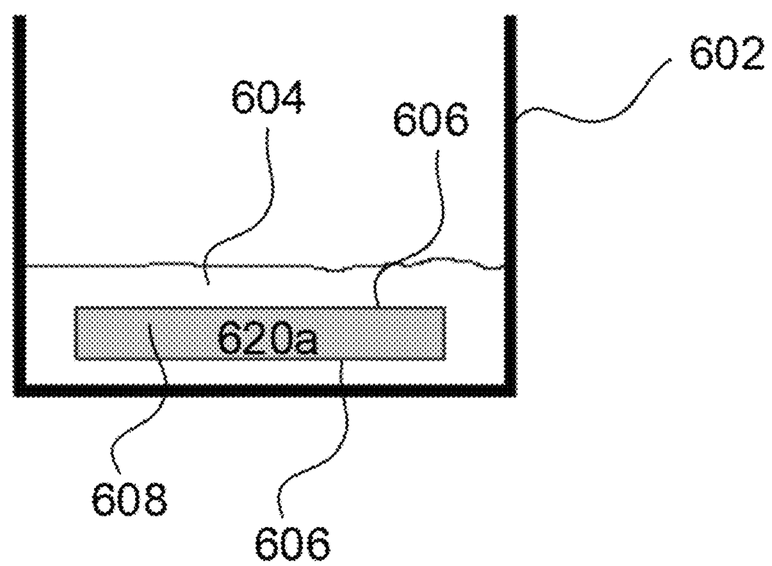
Figure 11I:
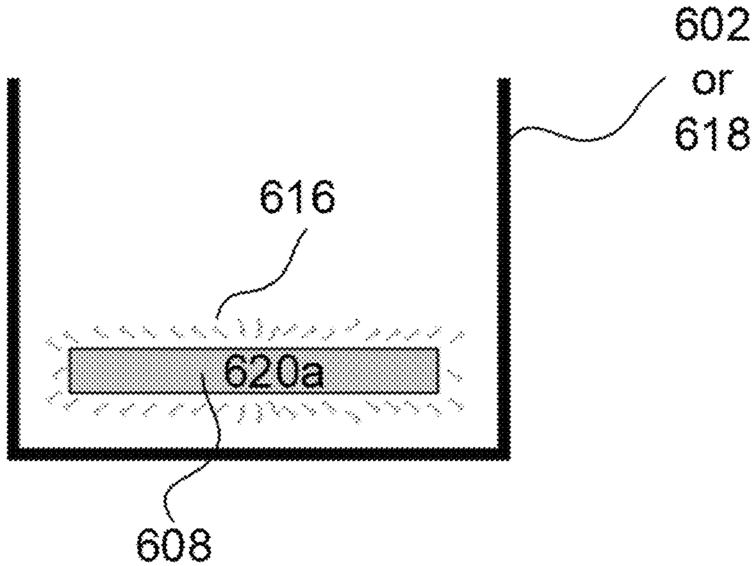
Figure 11J:
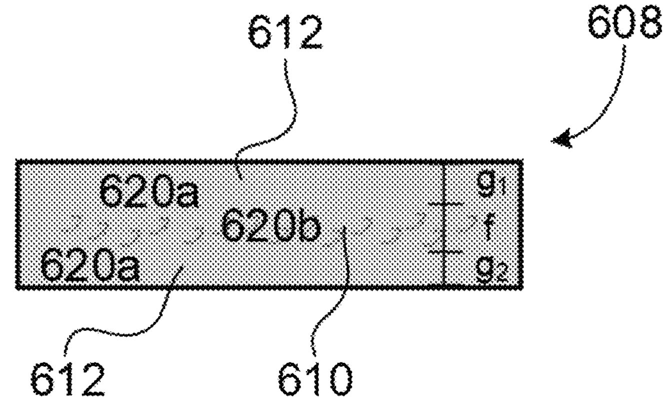
Figure 11K:
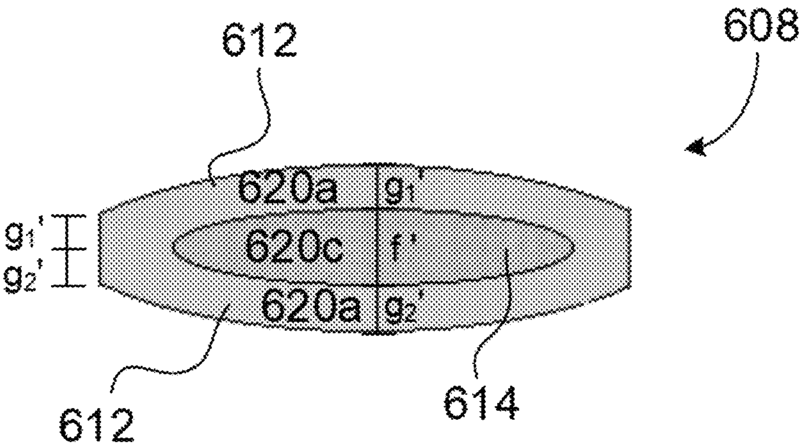

A third scenario is illustrated in FIGS. 11H-11K. In this third scenario, as illustrated in FIG. 11H, a foamable article 608 comprising a solid foamable material 620*a* is be placed in a vessel 602 which has been charged with carbon dioxide 604 such that the solid foamable material 620*a* on all exterior surfaces 606 of the article 608 are exposed to liquid carbon dioxide 604 and become infused with carbon dioxide. The carbon dioxide can then be discharged from the vessel 602, or the foamable article 608 can be placed in an oven or other controlled environment 618, allowing carbon dioxide to diffuse from the solid foamable material 620*a* on all surfaces of the article 608 that are not in contact with a side of the vessel 602 or oven 618, as in FIG. 11I. FIG. 11J shows a cross section of the foamable article 608 of FIGS. 11H-11I after infusing and immediately prior to expanding the carbon dioxide-infused solid foamable material 620*b*. In this stage, the article 608 is partially infused with carbon dioxide and includes both infused portion 610 containing infused solid foamable material 620*b* and uninfused portion 612 containing uninfused solid foamable material 620*a*, where f represents a thickness of the infused portion 610 prior to foaming and $g_1$ and $g_2$ represent thicknesses of the uninfused portions 612 surrounding the infused portion 610, prior to foaming. Finally, FIG. 11K shows a cross section of the same region of article 608 as FIGS. 11H-11J after the step of expanding the solid foamable material into a foamed material 620*c* has been carried out. The portion of the article 608 that had been infused 610 with carbon dioxide 614 has expanded into a foamed state 614 containing foamed material 620*c* having thickness f', where f' is greater than f, while the uninfused portions 612 of the solid foamable material 620*a* of article 608 remain solid and unfoamed, having thicknesses $g_1$' and $g_2$' which are substantially the same as thicknesses $g_1$ and $g_2$, respectively.

Combinations of the above scenarios are also envisioned. For example, a combination of the first scenario and the second scenario, where carbon dioxide 614 is first infused into two or more surfaces 606 of the article and then the carbon dioxide 614 is then dissipated from two or more surfaces 606 of the article 608, could result in an article comprising both foamed and unfoamed material having a cross section similar to that shown in FIG. 11K.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

What is claimed is:

1. An airbag bladder for an article of footwear, the airbag bladder having a wall that comprises:

a first structural layer comprising a foamed thermoplastic elastomeric composition;

a second structural layer comprising an unfoamed thermoplastic elastomeric composition; and one or more core layers disposed between the first structural layer and the second structural layer such that the first structural layer faces outside of the airbag bladder and the second structural layer faces inside of the airbag bladder, wherein the one or more core layers comprise a barrier material.

2. The airbag bladder of claim 1, wherein the one or more core layers prevents liquid carbon dioxide that is infused through the first structural layer from infusing into the second structural layer.

3. The airbag bladder of claim 1 further comprising a first cap layer and a second cap layer, wherein the first structural layer is disposed between the first cap layer and the one or more core layers, and wherein the second structural layer is disposed between the one or more core layers and the second cap layer.

4. The airbag bladder of claim 3, wherein the first cap layer comprises a second foamed thermoplastic elastomeric composition, and wherein the second cap layer comprises a second unfoamed thermoplastic elastomeric composition.

5. The airbag bladder of claim 1, wherein the foamed thermoplastic elastomeric composition comprises a physically-foamed thermoplastic elastomeric composition.

6. The airbag bladder of claim 1, wherein the foamed thermoplastic elastomeric composition comprises foamed thermoplastic polyurethane, and wherein the unfoamed thermoplastic elastomeric composition comprises unfoamed thermoplastic polyurethane.

7. The airbag bladder of claim 1, wherein the barrier material comprises ethylene-vinyl alcohol.

8. The airbag bladder of claim 1, wherein liquid carbon dioxide is substantially insoluble in the barrier material.

9. The airbag bladder of claim 1, wherein the barrier material of the one or more core layers has a nitrogen gas transmission rate of less than or equal to 30 cubic centimeters per square meter per 24 hours.

10. An airbag bladder for an article of footwear, the airbag bladder comprising:

a first sheet having a first side and a second side; and a second sheet having a first side and a second side, wherein the first side of the first sheet faces the second side of the second sheet, and wherein the first sheet and the second sheet are bonded together to form an internal cavity in a space between the first side of the first sheet and the second side of the second sheet, wherein the bond extends around at least a portion of a perimeter of the internal cavity, wherein at least one of the first sheet and the second sheet comprises:

an outer structural layer comprising a first thermoplastic elastomeric composition in a foamed state;

an inner structural layer comprising a second thermoplastic elastomeric composition in an unfoamed state; and one or more core layers disposed between the outer structural layer and the inner structural layer, wherein the one or more core layers are configured to prevent liquid carbon dioxide from infusing into the inner structural layer.

11. The airbag bladder of claim 10, wherein the at least one of the first sheet and the second sheet further comprises an outer cap layer and an inner cap layer, wherein the outer structural layer is disposed between the outer cap layer and the one or more core layers, and wherein the inner structural layer is disposed between the one or more core layers and the inner cap layer.

12. The airbag bladder of claim 10, wherein the first thermoplastic elastomeric composition and the second thermoplastic elastomeric composition each comprise thermoplastic polyurethane.

13. The airbag bladder of claim 10, wherein the one or more core layers comprise ethylene-vinyl alcohol.

14. The airbag bladder of claim 13, wherein the liquid carbon dioxide is soluble in the outer structural layer at a concentration of from about 1 weight percent to about 30 weight percent based on a total weight of the first thermoplastic elastomer composition, and wherein the liquid carbon dioxide is soluble in the one more core layers at a concentration of at less than 1 weight percent based on a total weight of the ethylene-vinyl alcohol of the one or more core layers.

15. An article of footwear comprising:

an upper; and a sole structure secured to the upper, wherein the sole structure includes an airbag bladder having a sealed wall defining an interior cavity, wherein the sealed wall comprises:

a first structural layer comprising a foamed thermoplastic elastomeric composition, wherein the first structural layer is substantially opaque;

a second structural layer comprising an unfoamed thermoplastic elastomeric composition; and one or more core layers disposed between the first structural layer and the second structural layer such that the second structural layer faces the interior cavity of the airbag bladder.

16. The article of footwear of claim 15, wherein the one or more core layers are configured to prevent liquid carbon dioxide from infusing into second structural layer.

17. The article of footwear of claim 15, further comprising a cap layer, wherein the first structural layer is disposed between the cap layer and the one or more core layers, and wherein the cap layer is substantially opaque.

18. The article of footwear of claim 15, wherein the foamed thermoplastic elastomeric composition and the unfoamed thermoplastic elastomeric composition each comprise thermoplastic polyurethane.

19. The article of footwear of claim 15, wherein the one or more core layers comprise ethylene-vinyl alcohol.

20. The article of footwear of claim 15, wherein the foamed thermoplastic elastomeric composition comprises a physically-foamed thermoplastic elastomeric composition.

* * * * *